US011398939B2

(12) United States Patent
Campos et al.

(10) Patent No.: US 11,398,939 B2
(45) Date of Patent: Jul. 26, 2022

(54) DIMENSIONING APPROACH FOR DATA NETWORKS

(71) Applicants: Luis Alberto Campos, Superior, CO (US); Joseph Padden, Boulder, CO (US)

(72) Inventors: Luis Alberto Campos, Superior, CO (US); Joseph Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1578 days.

(21) Appl. No.: 14/820,425

(22) Filed: Aug. 6, 2015

(65) Prior Publication Data

US 2021/0314207 A1 Oct. 7, 2021

(51) Int. Cl.

*H04L 27/26* (2006.01)
*H04L 41/14* (2022.01)
*H04L 5/00* (2006.01)

(52) U.S. Cl.

CPC ........ *H04L 27/2666* (2013.01); *H04L 5/0098* (2013.01); *H04L 27/2695* (2013.01); *H04L 41/145* (2013.01)

(58) Field of Classification Search

CPC . H04L 27/2666; H04L 41/145; H04L 5/0098; H04L 27/2695

See application file for complete search history.

(56) References Cited

U.S. PATENT DOCUMENTS 7,855,963 B2 * 12/2010 Ponnuswamy ....... H04L 1/0017 370/232
2005/0018697 A1 * 1/2005 Enns ................ H04N 21/26216 370/401
2008/0151751 A1 * 6/2008 Ponnuswamy ....... H04L 1/0017 370/232
2013/0121294 A1 * 5/2013 Cheng ............... H04W 72/0433 370/329
2020/0228301 A1 * 7/2020 Choi ......................... H04L 5/14

* cited by examiner

*Primary Examiner* — Jean B Corrielus
(74) *Attorney, Agent, or Firm* — David Daniel Smith

(57) ABSTRACT

A network dimensioning algorithm for networks, such as DOCSIS 3.1 networks, is described. The present system and method combines per-profile traffic characteristics, available bandwidth, legacy coexistence, and detail overhead contributions of cyclic prefix, pilots, excluded subcarriers, FEC, and bit loading among other parameters.

1 Claim, 66 Drawing Sheets

| | US FEC Efficiency Calculator | | | | | |
|---|---|---|---|---|---|---|
| **CW Types** | **CW Bits** | **Parity Bits** | **Payload Bits** | **Efficiency** | **Payload** | **Parity Bytes** |
| **Long** | **16200** | **1800** | **14400** | **0.888888889** | **1800** | **225** |
| **Medium** | **5940** | **900** | **5040** | **0.848484848** | **630** | **112.5** |
| **Short** | **1120** | **280** | **840** | **0.75** | **105** | **35** |

| Tx Payload Range in Bytes | | Codeword | | Tx Payload Range in bits | | Codeword |
|---|---|---|---|---|---|---|
| From | To | Types | Info Bits | From | To | Types |
| 1 | 105 | S | 840 | 1 | 840 | S |
| 106 | 210 | 2S | 1680 | 841 | 1680 | 2S |
| 211 | 315 | 3S | 2520 | 1681 | 2520 | 3S |
| 316 | 630 | M | 5040 | 2521 | 5040 | M |
| 631 | 735 | M+S | 5880 | 5041 | 5880 | M+S |
| 736 | 840 | M+2S | 6720 | 5881 | 6720 | M+2S |
| 841 | 945 | M+3S | 7560 | 6721 | 7560 | M+3S |
| 946 | 1260 | 2M | 10080 | 7561 | 10080 | 2M |
| 1261 | 1800 | L | 14400 | 10081 | 14400 | L |
| 1801 | 1905 | L+S | 15240 | 14401 | 15240 | L+S |
| 1906 | 2010 | L+2S | 16080 | 15241 | 16080 | L+2S |
| 2011 | 2115 | L+3S | 16920 | 16081 | 16920 | L+3S |
| 2116 | 2430 | L+M | 19440 | 16921 | 19440 | L+M |
| 2431 | 2535 | L+M+S | 20280 | 19441 | 20280 | L+M+S |
| 2536 | 2640 | L+M+2S | 21120 | 20281 | 21120 | L+M+2S |
| 2641 | 2745 | L+M+3S | 21960 | 21121 | 21960 | L+M+3S |
| 2746 | 3600 | 2L | 28800 | 21961 | 28800 | 2L |
| 3601 | 3705 | 2L+S | 29640 | 28801 | 29640 | 2L+S |
| 3706 | 3810 | 2L+2S | 30480 | 29641 | 30480 | 2L+2S |
| 3811 | 3915 | 2L+3S | 31320 | 30481 | 31320 | 2L+3S |
| 3916 | 4230 | 2L+M | 33840 | 31321 | 33840 | 2L+M |
| 4231 | 4335 | 2L+M+S | 34680 | 33841 | 34680 | 2L+M+S |
| 4336 | 4440 | 2L+M+2S | 35520 | 34681 | 35520 | 2L+M+2S |
| 4441 | 4545 | 2L+M+3S | 36360 | 35521 | 36360 | 2L+M+3S |
| 4546 | 5000 | 3L | 40000 | 36361 | 40000 | 3L |

FIG. 13

US FEC Efficiency Calculator

| CW Types | CW Bits | Parity Bits | Payload Bits | Efficiency | Payload Bytes | Parity Bytes |
|---|---|---|---|---|---|---|
| Long | 16200 | =C4-14400 | =C4-D4 | =E4/(C4) | =E4/8 | =D4/8 |
| Medium | 5940 | =C5-5040 | =C5-D5 | =E5/(C5) | =E5/8 | =D5/8 |
| Short | 1120 | =C6-840 | =C6-D6 | =E6/(C6) | =E6/8 | =D6/8 |

| Tx Payload Range in Bytes | | Codeword | | Tx Payload Range in bits | | Codeword |
|---|---|---|---|---|---|---|
| From | To | Types | Info Bits | From | To | Types |
| 1 | 105 | S | =C11*8 | 1 | 840 | S |
| 106 | 210 | 2S | =C12*8 | 841 | 1680 | 2S |
| 211 | 315 | 3S | =C13*8 | 1681 | 2520 | 3S |
| 316 | 630 | M | =C14*8 | 2521 | 5040 | M |
| 631 | 735 | M+S | =C15*8 | 5041 | 5880 | M+S |
| 736 | 840 | M+2S | =C16*8 | 5881 | 6720 | M+2S |
| 841 | 945 | M+3S | =C17*8 | 6721 | 7560 | M+3S |
| 946 | 1260 | 2M | =C18*8 | 7561 | 10080 | 2M |
| 1261 | 1800 | L | =C19*8 | 10081 | 14400 | L |
| 1801 | 1905 | L+S | =C20*8 | 14401 | 15240 | L+S |
| 1906 | 2010 | L+2S | =C21*8 | 15241 | 16080 | L+2S |
| 2011 | 2115 | L+3S | =C22*8 | 16081 | 16920 | L+3S |
| 2116 | 2430 | L+M | =C23*8 | 16921 | 19440 | L+M |
| =631+1800 | =735+1800 | L+M+S | =C24*8 | 19441 | 20280 | L+M+S |
| =736+1800 | =840+1800 | L+M+2S | =C25*8 | 20281 | 21120 | L+M+2S |
| =841+1800 | =945+1800 | L+M+3S | =C26*8 | 21121 | 21960 | L+M+3S |
| 2746 | 3600 | 2L | =C27*8 | 21961 | 28800 | 2L |
| 3601 | 3705 | 2L+S | =C28*8 | 28801 | 29640 | 2L+S |
| 3706 | 3810 | 2L+2S | =C29*8 | 29641 | 30480 | 2L+2S |
| 3811 | 3915 | 2L+3S | =C30*8 | 30481 | 31320 | 2L+3S |
| 3916 | 4230 | 2L+M | =C31*8 | 31321 | 33840 | 2L+M |
| 4231 | =735+3600 | 2L+M+S | =C32*8 | 33841 | 34680 | 2L+M+S |
| =736+3600 | =840+3600 | 2L+M+2S | =C33*8 | 34681 | 35520 | 2L+M+2S |
| =841+3600 | =945+3600 | 2L+M+3S | =C34*8 | 35521 | 36360 | 2L+M+3S |
| 4546 | 5000 | 3L | =C35*8 | 36361 | 40000 | 3L |

FIG. 14

| Codeword Bytes | Information Bits | Information Bytes | Efficiency | CW Type S | CW Type M | CW Type L |
|---|---|---|---|---|---|---|
| 36 | 8 | 1 | 0.027777778 | 1 | 0 | 0 |
| 37 | 16 | 2 | 0.054054054 | 1 | 0 | 0 |
| 38 | 24 | 3 | 0.078947368 | 1 | 0 | 0 |
| 39 | 32 | 4 | 0.102564103 | 1 | 0 | 0 |
| 40 | 40 | 5 | 0.125 | 1 | 0 | 0 |

| | A | B | C | D | E |
|---|---|---|---|---|---|
| 38 | | | | | |
| 39 | | | | | |
| 40 | | Codeword | Information | Information | |
| 41 | | Bytes | Bits | Bytes | Efficiency |
| 42 | | =(D42*8+F42*280+G42*900+H42*1800)/8 | =D42*8 | 1 | =D42*8/(D42*8+F42*280+G42*900+H42*1800) |
| 43 | | =(D43*8+F43*280+G43*900+H43*1800)/8 | =D43*8 | 2 | =D43*8/(D43*8+F43*280+G43*900+H43*1800) |
| 44 | | =(D44*8+F44*280+G44*900+H44*1800)/8 | =D44*8 | =D43+1 | =D44*8/(D44*8+F44*280+G44*900+H44*1800) |
| 45 | | =(D45*8+F45*280+G45*900+H45*1800)/8 | =D45*8 | =D44+1 | =D45*8/(D45*8+F45*280+G45*900+H45*1800) |
| 46 | | =(D46*8+F46*280+G46*900+H46*1800)/8 | =D46*8 | =D45+1 | =D46*8/(D46*8+F46*280+G46*900+H46*1800) |

| | F | G | H |
|---|---|---|---|
| 38 | | | |
| 39 | | | |
| 40 | CW Type | CW Type | CW Type |
| 41 | S | M | L |
| 42 | =IF((D42-L42*1800)<316,CEILING(I42/105,1),IF(I42>945,0,IF(I42>630,CEILING((D42-L42*1800-630)/105,1),0))) | =J42*K42 | =N42+L42 |
| 43 | =IF((D43-L43*1800)<316,CEILING(I43/105,1),IF(I43>945,0,IF(I43>630,CEILING((D43-L43*1800-630)/105,1),0))) | =J43*K43 | =N43+L43 |
| 44 | =IF((D44-L44*1800)<316,CEILING(I44/105,1),IF(I44>945,0,IF(I44>630,CEILING((D44-L44*1800-630)/105,1),0))) | =J44*K44 | =N44+L44 |
| 45 | =IF((D45-L45*1800)<316,CEILING(I45/105,1),IF(I45>945,0,IF(I45>630,CEILING((D45-L45*1800-630)/105,1),0))) | =J45*K45 | =N45+L45 |
| 46 | =IF((D46-L46*1800)<316,CEILING(I46/105,1),IF(I46>945,0,IF(I46>630,CEILING((D46-L46*1800-630)/105,1),0))) | =J46*K46 | =N46+L46 |

US FEC REFERENCE

| | CW | Parity | Payload | |
|---|---|---|---|---|
| L | 16200 | 1800 | 14400 | bits |
| L | 2025 | 225 | 1800 | Bytes |
| M | 5940 | 900 | 5040 | bits |
| M | 742.5 | 112.5 | 630 | Bytes |
| S | 1120 | 280 | 840 | bits |
| S | 140 | 35 | 105 | Bytes |

Field Packet Capture Sample

| Joey's Capture | Packet Size Bytes | Volume Bytes | Equiv. Volume Bytes | Equiv. Capture | Equiv. Joey's Capture |
|---|---|---|---|---|---|
| 0.33 | 8 | 2.64 | 2.64 | 0.33 | 0.0002453 |
| 0.17 | 64 | 10.88 | 10.88 | 0.17 | 0.0001264 |
| 0.05 | 128 | 6.4 | 6.4 | 0.05 | 3.717E-05 |
| 0.06 | 256 | 15.36 | 15.36 | 0.06 | 4.46E-05 |
| 0 | 512 | 0 | 0 | 0 | 0 |
| 0.09 | 1500 | 135 | 135 | 0.09 | 6.69E-05 |
| 0.07 | 2000 | 140 | 1175 | 0.5875 | 0.0004367 |
| 0.23 | 4500 | 1035 | | | |
| | | | SUM= | 1345.28 | 1.2875 |

| Req | 64 B | 128 B | 256 B | 512 B | 1500 B | 2000 B | 4500 B | Burst Type |
|---|---|---|---|---|---|---|---|---|
| 26.00% | 13.00% | 4.00% | 5.00% | 0.00% | 7.00% | 45.00% | 0.00% | % of Burst Tx by Size (Joey's Capture Equivalent) |

FIG. 19

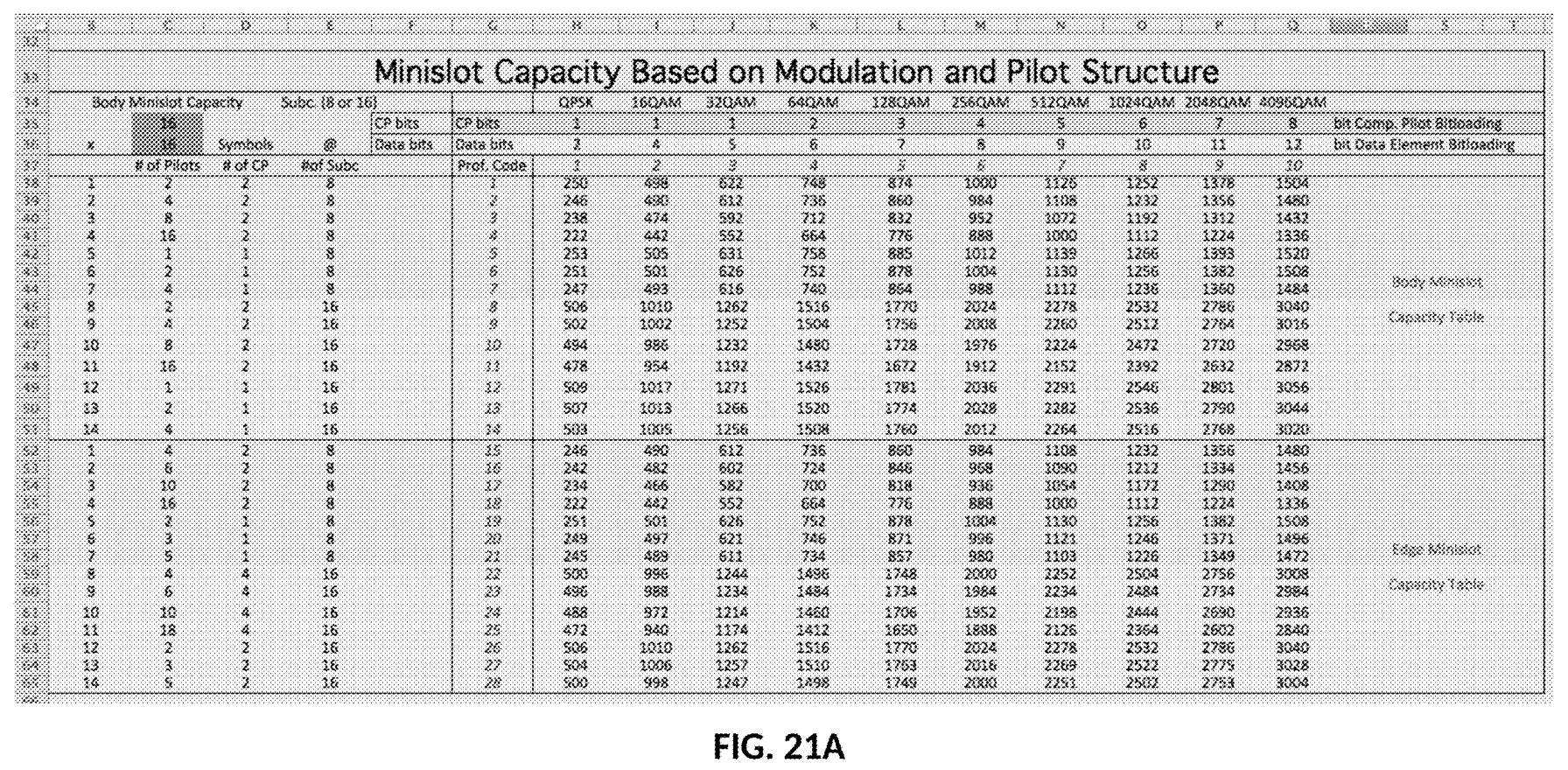

Minislot Capacity Based on Modulation and Pilot Structure

| | Body Minislot Capacity | | Subc. (8 or 16) | | | QPSK | 16QAM | 32QAM | 64QAM | 128QAM | 256QAM | 512QAM | 1024QAM | 2048QAM | 4096QAM | |
|---|---|---|---|---|---|---|---|---|---|---|---|---|---|---|---|---|
| | 16 | | | CP bits | CP bits | 1 | 1 | 1 | 2 | 3 | 4 | 5 | 6 | 7 | 8 | bit Comp. Pilot Bitloading |
| x | 16 | Symbols | @ | Data bits | Data bits | 2 | 4 | 5 | 6 | 7 | 8 | 9 | 10 | 11 | 12 | bit Data Element Bitloading |
| | # of Pilots | # of CP | #of Subc | | Prof. Code | 1 | 2 | 3 | 4 | 5 | 6 | 7 | 8 | 9 | 10 | |
| 1 | 2 | 2 | 8 | | 1 | 250 | 498 | 622 | 748 | 874 | 1000 | 1126 | 1252 | 1378 | 1504 | |
| 2 | 4 | 2 | 8 | | 2 | 246 | 490 | 612 | 736 | 860 | 984 | 1108 | 1232 | 1356 | 1480 | |
| 3 | 8 | 2 | 8 | | 3 | 238 | 474 | 592 | 712 | 832 | 952 | 1072 | 1192 | 1312 | 1432 | |
| 4 | 16 | 2 | 8 | | 4 | 222 | 442 | 552 | 664 | 776 | 888 | 1000 | 1112 | 1224 | 1336 | |
| 5 | 1 | 1 | 8 | | 5 | 253 | 505 | 631 | 758 | 885 | 1012 | 1139 | 1266 | 1393 | 1520 | |
| 6 | 2 | 1 | 8 | | 6 | 251 | 501 | 626 | 752 | 878 | 1004 | 1130 | 1256 | 1382 | 1508 | |
| 7 | 4 | 1 | 8 | | 7 | 247 | 493 | 616 | 740 | 864 | 988 | 1112 | 1236 | 1360 | 1484 | Body Minislot |
| 8 | 2 | 2 | 16 | | 8 | 506 | 1010 | 1262 | 1516 | 1770 | 2024 | 2278 | 2532 | 2786 | 3040 | |
| 9 | 4 | 2 | 16 | | 9 | 502 | 1002 | 1252 | 1504 | 1756 | 2008 | 2260 | 2512 | 2764 | 3016 | Capacity Table |
| 10 | 8 | 2 | 16 | | 10 | 494 | 986 | 1232 | 1480 | 1728 | 1976 | 2224 | 2472 | 2720 | 2968 | |
| 11 | 16 | 2 | 16 | | 11 | 478 | 954 | 1192 | 1432 | 1672 | 1912 | 2152 | 2392 | 2632 | 2872 | |
| 12 | 1 | 1 | 16 | | 12 | 509 | 1017 | 1271 | 1526 | 1781 | 2036 | 2291 | 2546 | 2801 | 3056 | |
| 13 | 2 | 1 | 16 | | 13 | 507 | 1013 | 1266 | 1520 | 1774 | 2028 | 2282 | 2536 | 2790 | 3044 | |
| 14 | 4 | 1 | 16 | | 14 | 503 | 1005 | 1256 | 1508 | 1760 | 2012 | 2264 | 2516 | 2768 | 3020 | |
| 1 | 4 | 2 | 8 | | 15 | 246 | 490 | 612 | 736 | 860 | 984 | 1108 | 1232 | 1356 | 1480 | |
| 2 | 6 | 2 | 8 | | 16 | 242 | 482 | 602 | 724 | 848 | 968 | 1090 | 1212 | 1334 | 1456 | |
| 3 | 10 | 2 | 8 | | 17 | 234 | 466 | 582 | 700 | 818 | 936 | 1054 | 1172 | 1290 | 1408 | |
| 4 | 16 | 2 | 8 | | 18 | 222 | 442 | 552 | 664 | 776 | 888 | 1000 | 1112 | 1224 | 1336 | |
| 5 | 2 | 1 | 8 | | 19 | 251 | 501 | 626 | 752 | 878 | 1004 | 1130 | 1256 | 1382 | 1508 | |
| 6 | 3 | 1 | 8 | | 20 | 249 | 497 | 621 | 746 | 871 | 996 | 1121 | 1246 | 1371 | 1496 | |
| 7 | 5 | 1 | 8 | | 21 | 245 | 489 | 611 | 734 | 857 | 980 | 1103 | 1226 | 1349 | 1472 | Edge Minislot |
| 8 | 4 | 4 | 16 | | 22 | 500 | 996 | 1244 | 1496 | 1748 | 2000 | 2252 | 2504 | 2756 | 3008 | |
| 9 | 6 | 4 | 16 | | 23 | 496 | 988 | 1234 | 1484 | 1734 | 1984 | 2234 | 2484 | 2734 | 2984 | Capacity Table |
| 10 | 10 | 4 | 16 | | 24 | 488 | 972 | 1214 | 1460 | 1706 | 1952 | 2198 | 2444 | 2690 | 2936 | |
| 11 | 18 | 4 | 16 | | 25 | 472 | 940 | 1174 | 1412 | 1650 | 1888 | 2126 | 2364 | 2602 | 2840 | |
| 12 | 2 | 2 | 16 | | 26 | 506 | 1010 | 1262 | 1516 | 1770 | 2024 | 2278 | 2532 | 2786 | 3040 | |
| 13 | 3 | 2 | 16 | | 27 | 504 | 1006 | 1257 | 1510 | 1763 | 2016 | 2269 | 2522 | 2775 | 3028 | |
| 14 | 5 | 2 | 16 | | 28 | 500 | 998 | 1247 | 1498 | 1749 | 2000 | 2251 | 2502 | 2753 | 3004 | |

FIG. 21A

| 67 | Profile Description Table | | | | | | | |
|---|---|---|---|---|---|---|---|---|
| 68 | Upstream Profile 1 | If Q=16 PL_STR>7 | Upstream Profile 2 | If Q=16 PL_STR> | Upstream Profile 3 | If Q=16 PL_STR>7 | Upstream Profile 4 | If Q=16 PL_STR>7 |
| 69 | Mod. Order | PL_STR | Mod. Order | PL_STR | Mod. Order | PL_STR | Mod. Order | PL_STR |
| 70 | 0% QPSK | 13 | 0% QPSK | 6 | ## QPSK | 9 | 100% QPSK | 2 |
| 71 | 0% 16QAM | 13 | 0% 16QAM | 6 | 0% 16QAM | 9 | 0% 16QAM | 2 |
| 72 | 0% 32QAM | 13 | 0% 64QAM | 6 | 0% 64QAM | 9 | 0% 64QAM | 2 |
| 73 | 0% 64QAM | 13 | 0% 256QAM | 6 | 0% 256QAM | 9 | 0% 256QAM | 2 |
| 74 | 0% 128QAM | 13 | 0% 512QAM | 6 | 0% 512QAM | 9 | 0% 512QAM | 2 |
| 75 | 100% 1024QAM | 12 | 0% 1024QAM | 6 | 0% 1024QAM | 9 | 0% 1024QAM | 2 |
| 76 | 0% 2048QAM | 13 | 0% 2048QAM | 6 | 0% 2048QAM | 9 | 0% 2048QAM | 2 |
| 77 | 0% 4096QAM | 13 | 100% 4096QAM | 6 | 0% 4096QAM | 9 | 0% 4096QAM | 2 |

FIG. 22A

| 67 | Profile Description Table | | | | | | | | | | | |
|---|---|---|---|---|---|---|---|---|---|---|---|---|
| 68 | Upstream Profile 1 | | If Q=16 PL_STR>7 | Upstream Profile 2 | | If Q=16 PL_STR>7 | Upstream Profile 3 | | If Q=16 PL_STR>7 | Upstream Profile 4 | | If Q=16 PL_STR>7 |
| 69 | Mod. Order | | PL_STR | Mod. Order | | PL_STR | Mod. Order | | PL_STR | Mod. Order | | PL_STR |
| 70 | 0 | QPSK | 13 | 0 | QPSK | 6 | 1 | QPSK | 9 | 1 | QPSK | 2 |
| 71 | 0 | 16QAM | 13 | 0 | 16QAM | 6 | 0 | 16QAM | 9 | 0 | 16QAM | 2 |
| 72 | 0 | 32QAM | 13 | 0 | 64QAM | 6 | 0 | 64QAM | 9 | 0 | 64QAM | 2 |
| 73 | 0 | 64QAM | 13 | 0 | 256QAM | 6 | 0 | 256QAM | 9 | 0 | 256QAM | 2 |
| 74 | 0 | 128QAM | 13 | 0 | 512QAM | 6 | 0 | 512QAM | 9 | 0 | 512QAM | 2 |
| 75 | 1 | 1024QAM | 12 | 0 | 1024QAM | 6 | 0 | 1024QAM | 9 | 0 | 1024QAM | 2 |
| 76 | 0 | 2048QAM | 13 | 0 | 2048QAM | 6 | 0 | 2048QAM | 9 | 0 | 2048QAM | 2 |
| 77 | 0 | 4096QAM | 13 | 1 | 4096QAM | 6 | 0 | 4096QAM | 9 | 0 | 4096QAM | 2 |

FIG. 22B (Don't Edit Me) Profile Bitloading/Pilot Pattern Automation helper (Don't Edit Me)

| | | | | | | | | |
|---|---|---|---|---|---|---|---|---|
| QPSK | 1 | 1 | 0 | profile 1 | | profile 2 | profile 3 | profile 4 |
| 16QAM | 2 | 2 | 10 | 121 | | 51 | 81 | 11 |
| 32QAM | 3 | 3 | 20 | 122 | | 52 | 82 | 12 |
| 64QAM | 4 | 4 | 30 | 123 | | 54 | 84 | 14 |
| 128QAM | 5 | 5 | 40 | 124 | | 56 | 86 | 16 |
| 256QAM | 6 | 6 | 50 | 125 | | 57 | 87 | 17 |
| 512QAM | 7 | 7 | 60 | 118 | | 58 | 88 | 18 |
| 1024QAM | 8 | 8 | 70 | 129 | | 59 | 89 | 19 |
| 2048QAM | 9 | 9 | 80 | 130 | | 60 | 90 | 20 |
| 4096QAM | 10 | 10 | 90 | | | | | |
| | | 11 | 100 | | | | | |
| | | 12 | 110 | | 1 | | | |
| | | 13 | 120 | | 2 | | | |
| | | 14 | 130 | | 3 | | | |
| | | | | | 4 | | | |

FIG. 23A

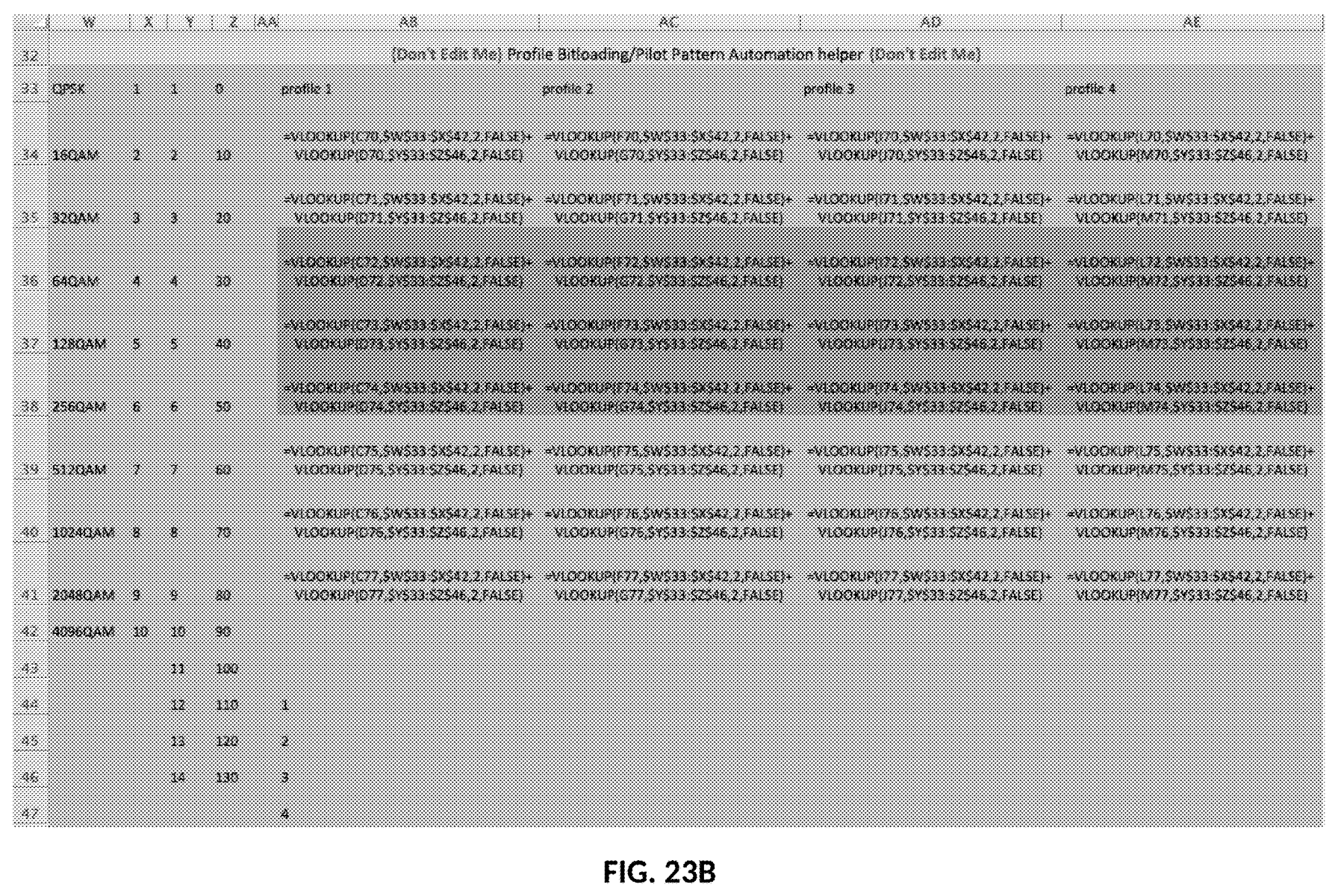

| | W | X | Y | Z | AA | AB | AC | AD | AE |
|---|---|---|---|---|---|---|---|---|---|
| 32 | | | | | | (Don't Edit Me) Profile Bitloading/Pilot Pattern Automation helper (Don't Edit Me) | | | |
| 33 | QPSK | 1 | 1 | 0 | | profile 1 | profile 2 | profile 3 | profile 4 |
| 34 | 16QAM | 2 | 2 | 10 | | =VLOOKUP(C70,$W$33:$X$42,2,FALSE)+ VLOOKUP(D70,$Y$33:$Z$46,2,FALSE) | =VLOOKUP(F70,$W$33:$X$42,2,FALSE)+ VLOOKUP(G70,$Y$33:$Z$46,2,FALSE) | =VLOOKUP(I70,$W$33:$X$42,2,FALSE)+ VLOOKUP(J70,$Y$33:$Z$46,2,FALSE) | =VLOOKUP(L70,$W$33:$X$42,2,FALSE)+ VLOOKUP(M70,$Y$33:$Z$46,2,FALSE) |
| 35 | 32QAM | 3 | 3 | 20 | | =VLOOKUP(C71,$W$33:$X$42,2,FALSE)+ VLOOKUP(D71,$Y$33:$Z$46,2,FALSE) | =VLOOKUP(F71,$W$33:$X$42,2,FALSE)+ VLOOKUP(G71,$Y$33:$Z$46,2,FALSE) | =VLOOKUP(I71,$W$33:$X$42,2,FALSE)+ VLOOKUP(J71,$Y$33:$Z$46,2,FALSE) | =VLOOKUP(L71,$W$33:$X$42,2,FALSE)+ VLOOKUP(M71,$Y$33:$Z$46,2,FALSE) |
| 36 | 64QAM | 4 | 4 | 30 | | =VLOOKUP(C72,$W$33:$X$42,2,FALSE)+ VLOOKUP(D72,$Y$33:$Z$46,2,FALSE) | =VLOOKUP(F72,$W$33:$X$42,2,FALSE)+ VLOOKUP(G72,$Y$33:$Z$46,2,FALSE) | =VLOOKUP(I72,$W$33:$X$42,2,FALSE)+ VLOOKUP(J72,$Y$33:$Z$46,2,FALSE) | =VLOOKUP(L72,$W$33:$X$42,2,FALSE)+ VLOOKUP(M72,$Y$33:$Z$46,2,FALSE) |
| 37 | 128QAM | 5 | 5 | 40 | | =VLOOKUP(C73,$W$33:$X$42,2,FALSE)+ VLOOKUP(D73,$Y$33:$Z$46,2,FALSE) | =VLOOKUP(F73,$W$33:$X$42,2,FALSE)+ VLOOKUP(G73,$Y$33:$Z$46,2,FALSE) | =VLOOKUP(I73,$W$33:$X$42,2,FALSE)+ VLOOKUP(J73,$Y$33:$Z$46,2,FALSE) | =VLOOKUP(L73,$W$33:$X$42,2,FALSE)+ VLOOKUP(M73,$Y$33:$Z$46,2,FALSE) |
| 38 | 256QAM | 6 | 6 | 50 | | =VLOOKUP(C74,$W$33:$X$42,2,FALSE)+ VLOOKUP(D74,$Y$33:$Z$46,2,FALSE) | =VLOOKUP(F74,$W$33:$X$42,2,FALSE)+ VLOOKUP(G74,$Y$33:$Z$46,2,FALSE) | =VLOOKUP(I74,$W$33:$X$42,2,FALSE)+ VLOOKUP(J74,$Y$33:$Z$46,2,FALSE) | =VLOOKUP(L74,$W$33:$X$42,2,FALSE)+ VLOOKUP(M74,$Y$33:$Z$46,2,FALSE) |
| 39 | 512QAM | 7 | 7 | 60 | | =VLOOKUP(C75,$W$33:$X$42,2,FALSE)+ VLOOKUP(D75,$Y$33:$Z$46,2,FALSE) | =VLOOKUP(F75,$W$33:$X$42,2,FALSE)+ VLOOKUP(G75,$Y$33:$Z$46,2,FALSE) | =VLOOKUP(I75,$W$33:$X$42,2,FALSE)+ VLOOKUP(J75,$Y$33:$Z$46,2,FALSE) | =VLOOKUP(L75,$W$33:$X$42,2,FALSE)+ VLOOKUP(M75,$Y$33:$Z$46,2,FALSE) |
| 40 | 1024QAM | 8 | 8 | 70 | | =VLOOKUP(C76,$W$33:$X$42,2,FALSE)+ VLOOKUP(D76,$Y$33:$Z$46,2,FALSE) | =VLOOKUP(F76,$W$33:$X$42,2,FALSE)+ VLOOKUP(G76,$Y$33:$Z$46,2,FALSE) | =VLOOKUP(I76,$W$33:$X$42,2,FALSE)+ VLOOKUP(J76,$Y$33:$Z$46,2,FALSE) | =VLOOKUP(L76,$W$33:$X$42,2,FALSE)+ VLOOKUP(M76,$Y$33:$Z$46,2,FALSE) |
| 41 | 2048QAM | 9 | 9 | 80 | | =VLOOKUP(C77,$W$33:$X$42,2,FALSE)+ VLOOKUP(D77,$Y$33:$Z$46,2,FALSE) | =VLOOKUP(F77,$W$33:$X$42,2,FALSE)+ VLOOKUP(G77,$Y$33:$Z$46,2,FALSE) | =VLOOKUP(I77,$W$33:$X$42,2,FALSE)+ VLOOKUP(J77,$Y$33:$Z$46,2,FALSE) | =VLOOKUP(L77,$W$33:$X$42,2,FALSE)+ VLOOKUP(M77,$Y$33:$Z$46,2,FALSE) |
| 42 | 4096QAM | 10 | 10 | 90 | | | | | |
| 43 | | | 11 | 100 | | | | | |
| 44 | | | 12 | 110 | 1 | | | | |
| 45 | | | 13 | 120 | 2 | | | | |
| 46 | | | 14 | 130 | 3 | | | | |
| 47 | | | | | 4 | | | | |

FIG. 23B

Minislot Distribution Across Packet Size

| | Q | R | S | T | U | V | W | X | Y | Z | AA | AC | AD |
|---|---|---|---|---|---|---|---|---|---|---|---|---|---|
| 92 | | | Total # of MiniSlots | 445 | | | | | | | | | |
| 93 | | | Effective Bw | 178.400 | MHz | 1 Req/Subslot | | | | | | | |
| 94 | | | MiniSlot Bw | 400 | KHz | Subslots/Minislots | | 8 | | | | | |
| 95 | | **Req** | **64 B** | **128 B** | **256 B** | **512 B** | **1500 B** | **2000 B** | **4500 B** | **Burst Type** | | | |
| 96 | | | 512 | 1024 | 2048 | 4096 | 12000 | 16000 | 36000 | bits | | | |
| 97 | | R | S | 2S | 3S | M | L | L+2S | 3L | | FEC Types/Burst (Selected by Grant Size) | | |
| 98 | | | 792 | 1584 | 2888 | 4936 | 13800 | 18360 | 41400 | bits | Bits/Burst Type | | |
| 99 | | 0.125 | 1 | 1 | 2 | 2 | 6 | 8 | 17 | minislots | # of Minislots/Burst Type for Profile 1 | | |
| 100 | | 0.125 | 1 | 2 | 2 | 4 | 10 | 13 | 28 | minislots | # of Minislots/Burst Type for Profile 2 | | |
| 101 | | 0.125 | 2 | 4 | 6 | 10 | 28 | 37 | 83 | minislots | # of Minislots/Burst Type for Profile 3 | | |
| 102 | Total MS | 0.125 | 4 | 7 | 12 | 21 | 57 | 75 | 169 | minislots | # of Minislots/Burst Type for Profile 4 | | |
| 103 | Per Profile | **26.00%** | **13.00%** | **4.00%** | **5.00%** | **0.00%** | **7.00%** | **45.00%** | **0.00%** | **% of Burst Tx by Size (Joey's Capture Equivalent)** | | | |
| 104 | 445 | 4 | 13 | 4 | 10 | 0 | 43 | 371 | 0 | Total Occupied MS/Burst Type for Profile 1 | | | |
| 105 | 446 | 3 | 8 | 5 | 6 | 0 | 45 | 379 | 0 | Total Occupied MS/Burst Type for Profile 2 | | | |
| 106 | 447 | 1 | 6 | 4 | 7 | 0 | 45 | 384 | 0 | Total Occupied MS/Burst Type for Profile 3 | | | |
| 107 | 446 | 1 | 6 | 3 | 7 | 0 | 45 | 384 | 0 | Total Occupied MS/Burst Type for Profile 4 | | | |
| 108 | | | | | | | | | | | | | |
| 109 | | 4 | 13 | 4 | 5 | 0 | 7 | 46 | 0 | Total Simultaneous Grants for Profile 1 | | 79 | |
| 110 | | 3 | 8 | 3 | 3 | 0 | 5 | 29 | 0 | Total Simultaneous Grants for Profile 2 | | 51 | 1 Edge Pilot MS /Grant |
| 111 | | 1 | 3 | 1 | 1 | 0 | 2 | 10 | 0 | Total Simultaneous Grants for Profile 3 | | 18 | |
| 112 | | 1 | 2 | 0 | 1 | 0 | 1 | 5 | 0 | Total Simultaneous Grants for Profile 4 | | 10 | |
| 113 | | | 0.75 | 0.75 | 0.75 | 0.848 | 0.889 | 0.872 | 0.889 | | Per Packet Size Effective Code Rate | | |

| | | Profile | Code Rate |
|---|---|---|---|
| 115 | | **Profile** | **Code Rate** |
| 116 | Per Profile Effective Code Rate | 1 | 0.858407 |
| 117 | Per Profile Effective Code Rate | 2 | 0.862657 |
| 118 | Per Profile Effective Code Rate | 3 | 0.867126 |
| 119 | Per Profile Effective Code Rate | 4 | 0.867388 |

Figure 25E:
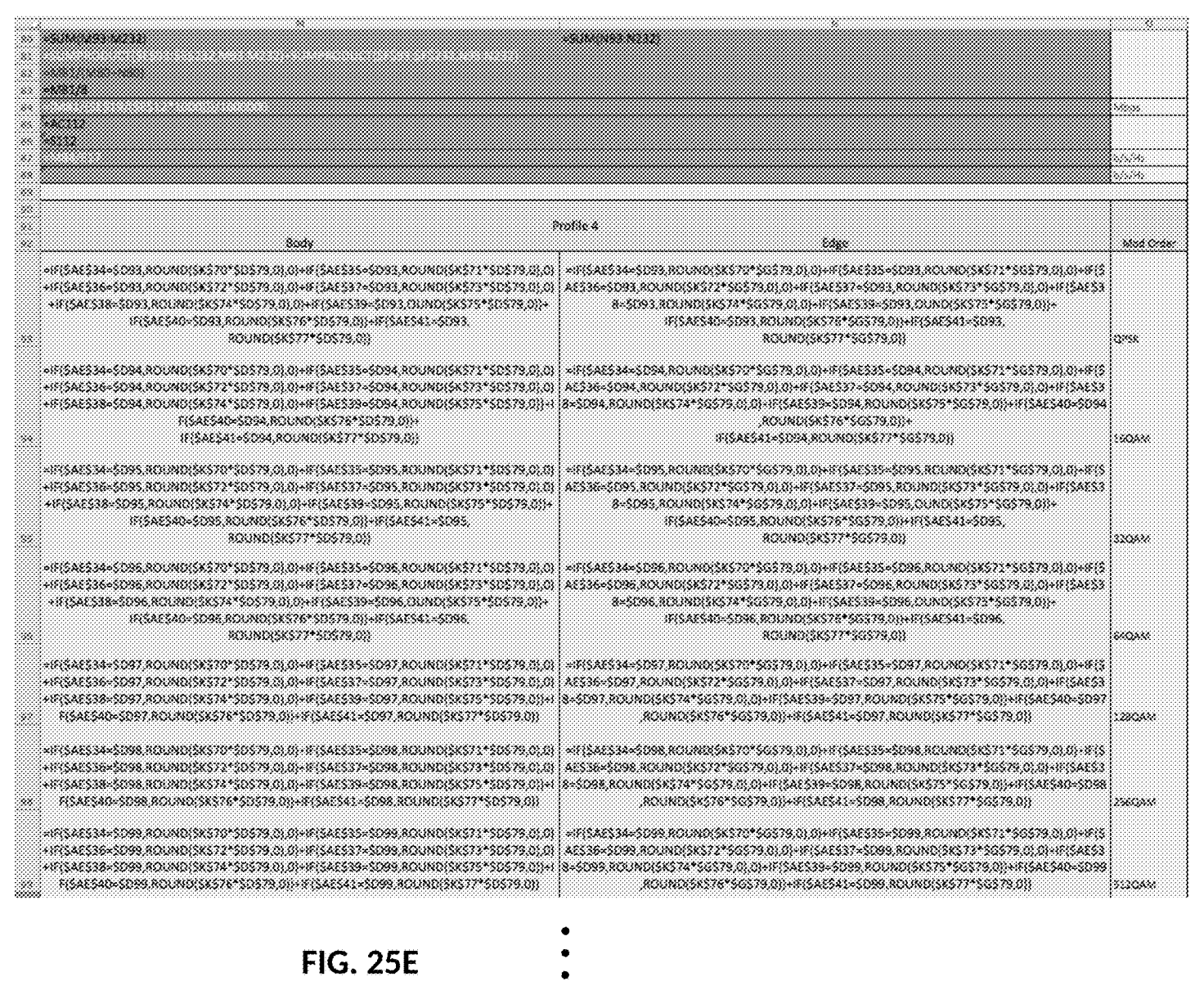

=SUM(Z93:Z232) =SUM(N93:N232)

=SUM(X80:X80)

=K81/8

$AC132

$S132

Profile 4

| Body | Edge | Mod Order |
| --- | --- | --- |
| =IF($AE$34=$D93,ROUND($K$70*$D$79,0),0)+IF($AE$35=$D93,ROUND($K$71*$D$79,0),0) +IF($AE$36=$D93,ROUND($K$72*$D$79,0),0)+IF($AE$37=$D93,ROUND($K$73*$D$79,0),0) +IF($AE$38=$D93,ROUND($K$74*$D$79,0),0)+IF($AE$39=$D93,OUND($K$75*$D$79,0))+ IF($AE$40=$D93,ROUND($K$76*$D$79,0))+IF($AE$41=$D93, ROUND($K$77*$D$79,0)) | =IF($AE$34=$D93,ROUND($K$70*$G$79,0),0)+IF($AE$35=$D93,ROUND($K$71*$G$79,0),0)+IF($ AE$36=$D93,ROUND($K$72*$G$79,0),0)+IF($AE$37=$D93,ROUND($K$73*$G$79,0),0)+IF($AE$3 8=$D93,ROUND($K$74*$G$79,0),0)+IF($AE$39=$D93,OUND($K$75*$G$79,0))+ IF($AE$40=$D93,ROUND($K$76*$G$79,0))+IF($AE$41=$D93, ROUND($K$77*$G$79,0)) | QPSK |
| =IF($AE$34=$D94,ROUND($K$70*$D$79,0),0)+IF($AE$35=$D94,ROUND($K$71*$D$79,0),0) +IF($AE$36=$D94,ROUND($K$72*$D$79,0),0)+IF($AE$37=$D94,ROUND($K$73*$D$79,0),0) +IF($AE$38=$D94,ROUND($K$74*$D$79,0),0)+IF($AE$39=$D94,ROUND($K$75*$D$79,0))+I F($AE$40=$D94,ROUND($K$76*$D$79,0))+ IF($AE$41=$D94,ROUND($K$77*$D$79,0)) | =IF($AE$34=$D94,ROUND($K$70*$G$79,0),0)+IF($AE$35=$D94,ROUND($K$71*$G$79,0),0)+IF($ AE$36=$D94,ROUND($K$72*$G$79,0),0)+IF($AE$37=$D94,ROUND($K$73*$G$79,0),0)+IF($AE$3 8=$D94,ROUND($K$74*$G$79,0),0)+IF($AE$39=$D94,ROUND($K$75*$G$79,0))+IF($AE$40=$D94 ,ROUND($K$76*$G$79,0))+ IF($AE$41=$D94,ROUND($K$77*$G$79,0)) | 16QAM |
| =IF($AE$34=$D95,ROUND($K$70*$D$79,0),0)+IF($AE$35=$D95,ROUND($K$71*$D$79,0),0) +IF($AE$36=$D95,ROUND($K$72*$D$79,0),0)+IF($AE$37=$D95,ROUND($K$73*$D$79,0),0) +IF($AE$38=$D95,ROUND($K$74*$D$79,0),0)+IF($AE$39=$D95,ROUND($K$75*$D$79,0))+ IF($AE$40=$D95,ROUND($K$76*$D$79,0))+IF($AE$41=$D95, ROUND($K$77*$D$79,0)) | =IF($AE$34=$D95,ROUND($K$70*$G$79,0),0)+IF($AE$35=$D95,ROUND($K$71*$G$79,0),0)+IF($ AE$36=$D95,ROUND($K$72*$G$79,0),0)+IF($AE$37=$D95,ROUND($K$73*$G$79,0),0)+IF($AE$3 8=$D95,ROUND($K$74*$G$79,0),0)+IF($AE$39=$D95,OUND($K$75*$G$79,0))+ IF($AE$40=$D95,ROUND($K$76*$G$79,0))+IF($AE$41=$D95, ROUND($K$77*$G$79,0)) | 32QAM |
| =IF($AE$34=$D96,ROUND($K$70*$D$79,0),0)+IF($AE$35=$D96,ROUND($K$71*$D$79,0),0) +IF($AE$36=$D96,ROUND($K$72*$D$79,0),0)+IF($AE$37=$D96,ROUND($K$73*$D$79,0),0) +IF($AE$38=$D96,ROUND($K$74*$D$79,0),0)+IF($AE$39=$D96,OUND($K$75*$D$79,0))+ IF($AE$40=$D96,ROUND($K$76*$D$79,0))+IF($AE$41=$D96, ROUND($K$77*$D$79,0)) | =IF($AE$34=$D96,ROUND($K$70*$G$79,0),0)+IF($AE$35=$D96,ROUND($K$71*$G$79,0),0)+IF($ AE$36=$D96,ROUND($K$72*$G$79,0),0)+IF($AE$37=$D96,ROUND($K$73*$G$79,0),0)+IF($AE$3 8=$D96,ROUND($K$74*$G$79,0),0)+IF($AE$39=$D96,OUND($K$75*$G$79,0))+ IF($AE$40=$D96,ROUND($K$76*$G$79,0))+IF($AE$41=$D96, ROUND($K$77*$G$79,0)) | 64QAM |
| =IF($AE$34=$D97,ROUND($K$70*$D$79,0),0)+IF($AE$35=$D97,ROUND($K$71*$D$79,0),0) +IF($AE$36=$D97,ROUND($K$72*$D$79,0),0)+IF($AE$37=$D97,ROUND($K$73*$D$79,0),0) +IF($AE$38=$D97,ROUND($K$74*$D$79,0),0)+IF($AE$39=$D97,ROUND($K$75*$D$79,0))+I F($AE$40=$D97,ROUND($K$76*$D$79,0))+IF($AE$41=$D97,ROUND($K$77*$D$79,0)) | =IF($AE$34=$D97,ROUND($K$70*$G$79,0),0)+IF($AE$35=$D97,ROUND($K$71*$G$79,0),0)+IF($ AE$36=$D97,ROUND($K$72*$G$79,0),0)+IF($AE$37=$D97,ROUND($K$73*$G$79,0),0)+IF($AE$3 8=$D97,ROUND($K$74*$G$79,0),0)+IF($AE$39=$D97,ROUND($K$75*$G$79,0))+IF($AE$40=$D97 ,ROUND($K$76*$G$79,0))+IF($AE$41=$D97,ROUND($K$77*$G$79,0)) | 128QAM |
| =IF($AE$34=$D98,ROUND($K$70*$D$79,0),0)+IF($AE$35=$D98,ROUND($K$71*$D$79,0),0) +IF($AE$36=$D98,ROUND($K$73*$D$79,0),0)+IF($AE$37=$D98,ROUND($K$73*$D$79,0),0) +IF($AE$38=$D98,ROUND($K$74*$D$79,0),0)+IF($AE$39=$D98,ROUND($K$75*$D$79,0))+I F($AE$40=$D98,ROUND($K$76*$D$79,0))+IF($AE$41=$D98,ROUND($K$77*$D$79,0)) | =IF($AE$34=$D98,ROUND($K$70*$G$79,0),0)+IF($AE$35=$D98,ROUND($K$71*$G$79,0),0)+IF($ AE$36=$D98,ROUND($K$72*$G$79,0),0)+IF($AE$37=$D98,ROUND($K$73*$G$79,0),0)+IF($AE$3 8=$D98,ROUND($K$74*$G$79,0),0)+IF($AE$39=$D98,ROUND($K$75*$G$79,0))+IF($AE$40=$D98 ,ROUND($K$76*$G$79,0))+IF($AE$41=$D98,ROUND($K$77*$G$79,0)) | 256QAM |
| =IF($AE$34=$D99,ROUND($K$70*$D$79,0),0)+IF($AE$35=$D99,ROUND($K$71*$D$79,0),0) +IF($AE$36=$D99,ROUND($K$72*$D$79,0),0)+IF($AE$37=$D99,ROUND($K$73*$D$79,0),0) +IF($AE$38=$D99,ROUND($K$74*$D$79,0),0)+IF($AE$39=$D99,ROUND($K$75*$D$79,0))+I F($AE$40=$D99,ROUND($K$76*$D$79,0))+IF($AE$41=$D99,ROUND($K$77*$D$79,0)) | =IF($AE$34=$D99,ROUND($K$70*$G$79,0),0)+IF($AE$35=$D99,ROUND($K$71*$G$79,0),0)+IF($ AE$36=$D99,ROUND($K$72*$G$79,0),0)+IF($AE$37=$D99,ROUND($K$73*$G$79,0),0)+IF($AE$3 8=$D99,ROUND($K$74*$G$79,0),0)+IF($AE$39=$D99,ROUND($K$75*$G$79,0))+IF($AE$40=$D99 ,ROUND($K$76*$G$79,0))+IF($AE$41=$D99,ROUND($K$77*$G$79,0)) | 512QAM |

| | B | C | D | E |
|---|---|---|---|---|
| 24 | | | | |
| 25 | FFT Block 1 | Subcarrier | Exclusion | Excluded |
| 26 | Subcarrier | Frequency | Bands | Subcarriers |
| 27 | Index | MHz | | |
| 28 | 0 | =IF($D$3+(B28)*$D$2>$D$4,0,$D$3+(B28)*$D$2) | =(IF(C28>0,1,0))*(IF(AND(C28<=$O$7,C28>=$L$7),0, IF(AND(C28<=$O$8,C28>=$L$8),0, IF(AND(C28<=$O$9,C28>=$L$9),0,IF(AND(C28<=$O$10,C28>=$L$10),0, IF(AND(C28<=$O$11,C28>=$L$11),0, IF(AND(C28<=$O$12,C28>=$L$12),0,IF(AND(C28<=$O$13,C28>=$L$13),0,1)))))))) | =1-(COUNTIF(R$7:R$98,C28)) |
| 29 | =B28+1 | =IF($D$3+(B29)*$D$2>$D$4,0,$D$3+(B29)*$D$2) | =(IF(C29>0,1,0))*(IF(AND(C29<=$O$7,C29>=$L$7),0, IF(AND(C29<=$O$8,C29>=$L$8),0,IF(AND(C29<=$O$9,C29>=$L$9),0, IF(AND(C29<=$O$10,C29>=$L$10),0,IF(AND(C29<=$O$11,C29>=$L$11),0, IF(AND(C29<=$O$12,C29>=$L$12),0,IF(AND(C29<=$O$13,C29>=$L$13),0,1)))))))) | =1-(COUNTIF(R$7:R$98,C29)) |
| 30 | =B29+1 | =IF($D$3+(B30)*$D$2>$D$4,0,$D$3+(B30)*$D$2) | =(IF(C30>0,1,0))*(IF(AND(C30<=$O$7,C30>=$L$7),0, IF(AND(C30<=$O$8,C30>=$L$8),0,IF(AND(C30<=$O$9,C30>=$L$9),0, IF(AND(C30<=$O$10,C30>=$L$10),0,IF(AND(C30<=$O$11,C30>=$L$11),0, IF(AND(C30<=$O$12,C30>=$L$12),0,IF(AND(C30<=$O$13,C30>=$L$13),0,1)))))))) | =1-(COUNTIF(R$7:R$98,C30)) |
| 31 | =B30+1 | =IF($D$3+(B31)*$D$2>$D$4,0,$D$3+(B31)*$D$2) | =(IF(C31>0,1,0))*(IF(AND(C31<=$O$7,C31>=$L$7),0, IF(AND(C31<=$O$8,C31>=$L$8),0,IF(AND(C31<=$O$9,C31>=$L$9),0, IF(AND(C31<=$O$10,C31>=$L$10),0,IF(AND(C31<=$O$11,C31>=$L$11),0, IF(AND(C31<=$O$12,C31>=$L$12),0,IF(AND(C31<=$O$13,C31>=$L$13),0,1)))))))) | =1-(COUNTIF(R$7:R$98,C31)) |
| 32 | =B31+1 | =IF($D$3+(B32)*$D$2>$D$4,0,$D$3+(B32)*$D$2) | =(IF(C32>0,1,0))*(IF(AND(C32<=$O$7,C32>=$L$7),0, IF(AND(C32<=$O$8,C32>=$L$8),0,IF(AND(C32<=$O$9,C32>=$L$9),0, IF(AND(C32<=$O$10,C32>=$L$10),0,IF(AND(C32<=$O$11,C32>=$L$11),0, IF(AND(C32<=$O$12,C32>=$L$12),0,IF(AND(C32<=$O$13,C32>=$L$13),0,1)))))))) | =1-(COUNTIF(R$7:R$98,C32)) |

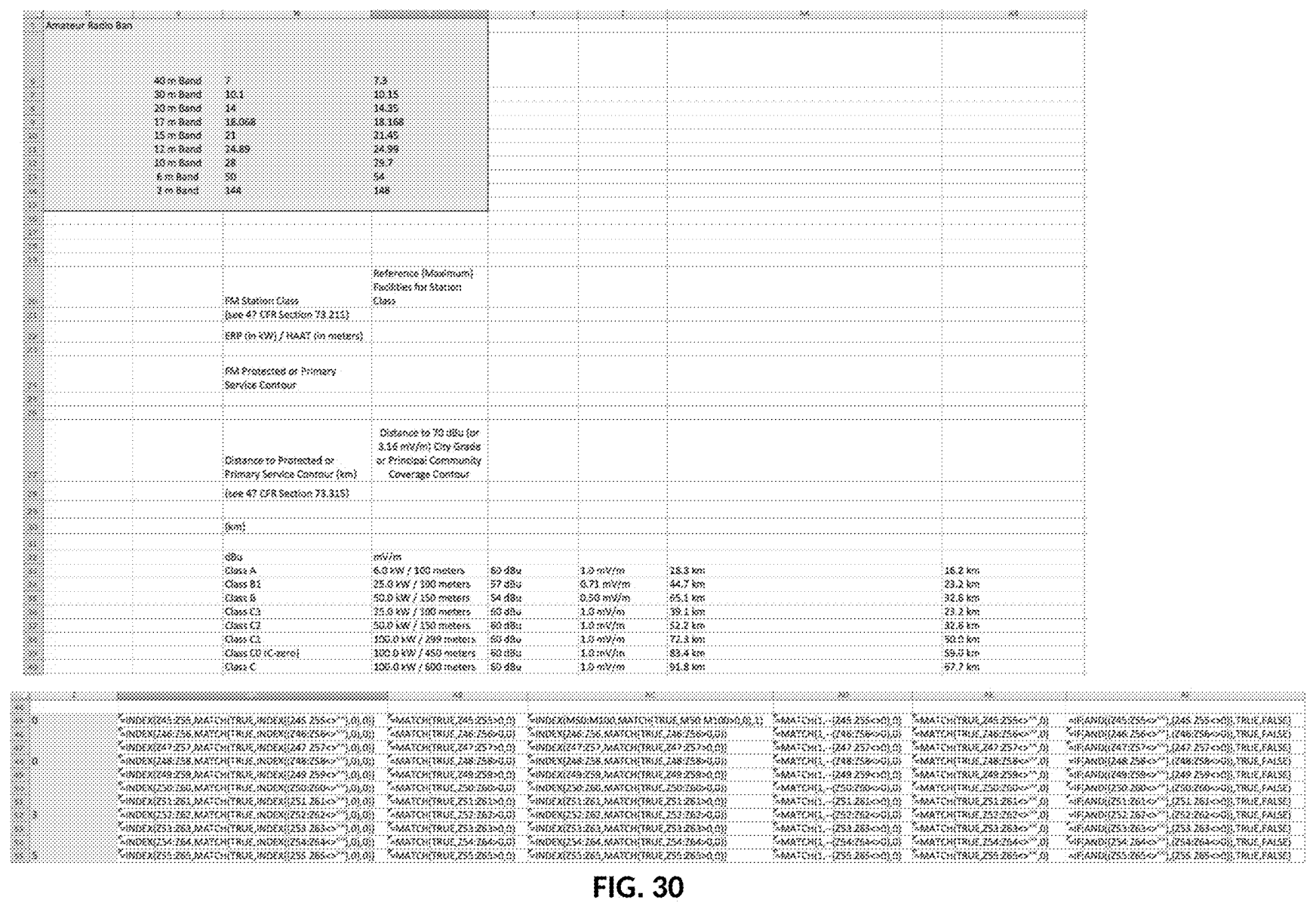

| | | | | | | | |
|---|---|---|---|---|---|---|---|
| Amateur Radio Ban | | | | | | | |
| | 40 m Band | 7 | 7.3 | | | | |
| | 30 m Band | 10.1 | 10.15 | | | | |
| | 20 m Band | 14 | 14.35 | | | | |
| | 17 m Band | 18.068 | 18.168 | | | | |
| | 15 m Band | 21 | 21.45 | | | | |
| | 12 m Band | 24.89 | 24.99 | | | | |
| | 10 m Band | 28 | 29.7 | | | | |
| | 6 m Band | 50 | 54 | | | | |
| | 2 m Band | 144 | 148 | | | | |
| | | FM Station Class | Reference (Maximum) Facilities for Station Class | | | | |
| | | (see 47 CFR Section 73.211) | | | | | |
| | | ERP (in KW) / HAAT (in meters) | | | | | |
| | | FM Protected or Primary Service Contour | | | | | |
| | | Distance to Protected or Primary Service Contour (km) | Distance to 70 dBu (or 3.16 mV/m) City Grade or Principal Community Coverage Contour | | | | |
| | | (see 47 CFR Section 73.315) | | | | | |
| | | (km) | | | | | |
| | | dBu | mV/m | | | | |
| | | Class A | 6.0 kW / 100 meters | 60 dBu | 1.0 mV/m | 28.3 km | 16.2 km |
| | | Class B1 | 25.0 kW / 100 meters | 57 dBu | 0.71 mV/m | 44.7 km | 23.2 km |
| | | Class B | 50.0 kW / 150 meters | 54 dBu | 0.50 mV/m | 65.1 km | 32.6 km |
| | | Class C3 | 25.0 kW / 100 meters | 60 dBu | 1.0 mV/m | 39.1 km | 23.2 km |
| | | Class C2 | 50.0 kW / 150 meters | 60 dBu | 1.0 mV/m | 52.2 km | 32.6 km |
| | | Class C1 | 100.0 kW / 299 meters | 60 dBu | 1.0 mV/m | 72.3 km | 50.0 km |
| | | Class C0 (C-zero) | 100.0 kW / 450 meters | 60 dBu | 1.0 mV/m | 83.4 km | 59.0 km |
| | | Class C | 100.0 kW / 600 meters | 60 dBu | 1.0 mV/m | 91.8 km | 57.7 km |

| | | | | | | |
|---|---|---|---|---|---|---|
| 0 | =INDEX(Z45:Z55,MATCH(TRUE,INDEX((Z45:Z55<>""),0),0)) | =MATCH(TRUE,Z45:Z55>0,0) | =INDEX(M50:M100,MATCH(TRUE,M50:M100>0,0),1) | =MATCH(1,--(Z45:Z55<>0),0) | =MATCH(TRUE,Z45:Z55<>"",0) | =IF(AND((Z45:Z55<>""),(Z45:Z55<>0)),TRUE,FALSE) |
| | =INDEX(Z46:Z56,MATCH(TRUE,INDEX((Z46:Z56<>""),0),0)) | =MATCH(TRUE,Z46:Z56>0,0) | =INDEX(Z46:Z56,MATCH(TRUE,Z46:Z56>0,0)) | =MATCH(1,--(Z46:Z56<>0),0) | =MATCH(TRUE,Z46:Z56<>"",0) | =IF(AND((Z46:Z56<>""),(Z46:Z56<>0)),TRUE,FALSE) |
| | =INDEX(Z47:Z57,MATCH(TRUE,INDEX((Z47:Z57<>""),0),0)) | =MATCH(TRUE,Z47:Z57>0,0) | =INDEX(Z47:Z57,MATCH(TRUE,Z47:Z57>0,0)) | =MATCH(1,--(Z47:Z57<>0),0) | =MATCH(TRUE,Z47:Z57<>"",0) | =IF(AND((Z47:Z57<>""),(Z47:Z57<>0)),TRUE,FALSE) |
| 0 | =INDEX(Z48:Z58,MATCH(TRUE,INDEX((Z48:Z58<>""),0),0)) | =MATCH(TRUE,Z48:Z58>0,0) | =INDEX(Z48:Z58,MATCH(TRUE,Z48:Z58>0,0)) | =MATCH(1,--(Z48:Z58<>0),0) | =MATCH(TRUE,Z48:Z58<>"",0) | =IF(AND((Z48:Z58<>""),(Z48:Z58<>0)),TRUE,FALSE) |
| | =INDEX(Z49:Z59,MATCH(TRUE,INDEX((Z49:Z59<>""),0),0)) | =MATCH(TRUE,Z49:Z59>0,0) | =INDEX(Z49:Z59,MATCH(TRUE,Z49:Z59>0,0)) | =MATCH(1,--(Z49:Z59<>0),0) | =MATCH(TRUE,Z49:Z59<>"",0) | =IF(AND((Z49:Z59<>""),(Z49:Z59<>0)),TRUE,FALSE) |
| | =INDEX(Z50:Z60,MATCH(TRUE,INDEX((Z50:Z60<>""),0),0)) | =MATCH(TRUE,Z50:Z60>0,0) | =INDEX(Z50:Z60,MATCH(TRUE,Z50:Z60>0,0)) | =MATCH(1,--(Z50:Z60<>0),0) | =MATCH(TRUE,Z50:Z60<>"",0) | =IF(AND((Z50:Z60<>""),(Z50:Z60<>0)),TRUE,FALSE) |
| | =INDEX(Z51:Z61,MATCH(TRUE,INDEX((Z51:Z61<>""),0),0)) | =MATCH(TRUE,Z51:Z61>0,0) | =INDEX(Z51:Z61,MATCH(TRUE,Z51:Z61>0,0)) | =MATCH(1,--(Z51:Z61<>0),0) | =MATCH(TRUE,Z51:Z61<>"",0) | =IF(AND((Z51:Z61<>""),(Z51:Z61<>0)),TRUE,FALSE) |
| 3 | =INDEX(Z52:Z62,MATCH(TRUE,INDEX((Z52:Z62<>""),0),0)) | =MATCH(TRUE,Z52:Z62>0,0) | =INDEX(Z52:Z62,MATCH(TRUE,Z52:Z62>0,0)) | =MATCH(1,--(Z52:Z62<>0),0) | =MATCH(TRUE,Z52:Z62<>"",0) | =IF(AND((Z52:Z62<>""),(Z52:Z62<>0)),TRUE,FALSE) |
| | =INDEX(Z53:Z63,MATCH(TRUE,INDEX((Z53:Z63<>""),0),0)) | =MATCH(TRUE,Z53:Z63>0,0) | =INDEX(Z53:Z63,MATCH(TRUE,Z53:Z63>0,0)) | =MATCH(1,--(Z53:Z63<>0),0) | =MATCH(TRUE,Z53:Z63<>"",0) | =IF(AND((Z53:Z63<>""),(Z53:Z63<>0)),TRUE,FALSE) |
| | =INDEX(Z54:Z64,MATCH(TRUE,INDEX((Z54:Z64<>""),0),0)) | =MATCH(TRUE,Z54:Z64>0,0) | =INDEX(Z54:Z64,MATCH(TRUE,Z54:Z64>0,0)) | =MATCH(1,--(Z54:Z64<>0),0) | =MATCH(TRUE,Z54:Z64<>"",0) | =IF(AND((Z54:Z64<>""),(Z54:Z64<>0)),TRUE,FALSE) |
| 5 | =INDEX(Z55:Z65,MATCH(TRUE,INDEX((Z55:Z65<>""),0),0)) | =MATCH(TRUE,Z55:Z65>0,0) | =INDEX(Z55:Z65,MATCH(TRUE,Z55:Z65>0,0)) | =MATCH(1,--(Z55:Z65<>0),0) | =MATCH(TRUE,Z55:Z65<>"",0) | =IF(AND((Z55:Z65<>""),(Z55:Z65<>0)),TRUE,FALSE) |

FIG. 30

UPSTREAM

| Conditions | UseCase 1 | | |
|---|---|---|---|
| BW (MHz) | 37 | | |
| Guardband | 0 | | |
| Subc. Spac. | 25 | | # Subcarriers |
| Symbol Period (us) | 40 | Excl Sub-band S. | 512 |
| Avg b/symb | 11 | S. Avail | 968 |
| Excluded Band w. Legacy | 12.8 | S. Used | 832 |
| Active Bandwidth (MHz) | 24.2 | S. Not Used | 136 |
| # of Strong NBIs | 18 | NBI S. Not Used | 54 |
| NBI Excluded Subc. | 54 | Packing S. Not U | 82 |
| Subcarriers (Q) | 16 | | |
| Symbols (K) | 16 | | |
| # of Minislots | 52 | | |
| CP (us) | 3.75 | | |
| Pilot Structure | 13 | | |
| Ideal Capacit | 266.2 | | |
| | Efficiency | Overhead | |
| Time | 0.9143 | 0.0857 | |
| Freq | 0.85950413 | | 0.12845537 |
| NBI+GB | | 0.051004339 | |
| Minislot Packing | | 0.077451033 | |
| | | | |
| Pilot Structure | 0.98953781 | 0.008221659 | |
| FEC | 0.84794804 | 0.118239095 | |
| PHY Payload | | 0.66 | |
| Capacity | 175.527987 | Mbps | 175.527987 |
| | 7.25 | b/s/Hz | |
| Overall PHY Efficiency | 175.45 | Mbps | |

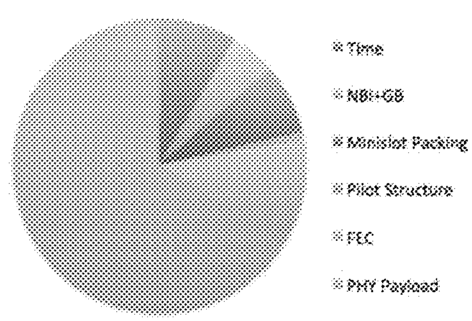

| Conditions | UseCase 4a | | |
|---|---|---|---|
| BW (MHz) | 37 | | |
| Guardband | 0 | | |
| Subc. Spac. | 25 | | # Subcarriers |
| Symbol Period (us) | 40 | Excl w. Legac | 640 |
| Avg b/symb | 8 | S. Avail | 840 |
| Excluded Band w. Legacy | 16 | S. Used | 800 |
| Active Bandwidth (MHz) | 21 | S. Not Used | 40 |
| # of Strong NBIs | 5 | NBI S. Not U | 15 |
| NBI Excluded Subc. | 15 | Packing S. Nc | 25 |
| Subcarriers (Q) | 16 | | |
| Symbols (K) | 16 | | |
| # of Minislots | 50 | | |
| CP (us) | 2.8125 | 288 samples | |
| Pilot Structure | 10 | | |
| Ideal Capacity | 168 | Mbps | |
| | Efficiency | Overhead | |
| Time | 0.9343 | 0.0657 | |
| Freq | 0.95238095 | | 0.04449048 |
| NBI+GB | | 0.01668393 | |
| Minislot Packing | | 0.02780655 | |
| | | | |
| Pilot Structure | 0.9629688 | 0.03295071 | |
| FEC | 0.851789 | 0.1269939 | |
| PHY Payload | | 0.73 | |
| Capacity | 122.616969 | Mbps | 122.616969 |
| | 5.84 | b/s/Hz | |
| Overall PHY Efficiency | 122.64 | Mbps | |

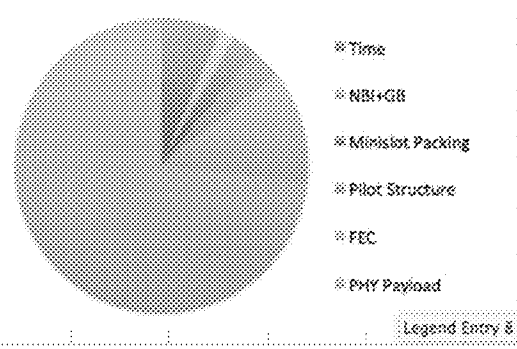

| Conditions | UseCase 4a+ | | |
|---|---|---|---|
| BW (MHz) | 37 | | |
| Guardband | 0 | | |
| Subc. Spac. | 25 | | # Subcarriers |
| Symbol Period (us) | 40 | Excl w. Legac | 640 |
| Avg b/symb | 10 | S. Avail | 840 |
| Excluded Band w. Legacy | 16 | S. Used | 800 |
| Active Bandwidth (MHz) | 21 | S. Not Used | 40 |
| # of Strong NBIs | 5 | NBI S. Not U | 15 |
| NBI Excluded Subc. | 15 | Packing S. Nc | 25 |
| Subcarriers (Q) | 16 | | |
| Symbols (K) | 16 | | |
| # of Minislots | 50 | | |
| CP (us) | 2.8125 | 288 samples | |
| Pilot Structure | 10 | | |
| Ideal Capacity | 210 | Mbps | |
| | Efficiency | Overhead | |
| Time | 0.9343 | 0.0657 | |
| Freq | 0.95238095 | | 0.04449048 |
| NBI+GB | | 0.01668393 | |
| Minislot Packing | | 0.02780655 | |
| | | | |
| Pilot Structure | 0.963875 | 0.03214437 | |
| FEC | 0.849397 | 0.12916695 | |
| PHY Payload | | 0.73 | |
| Capacity | 152.984624 | Mbps | 152.984624 |
| | 7.23 | b/s/Hz | |
| Overall PHY Efficiency | 153.09 | Mbps | |

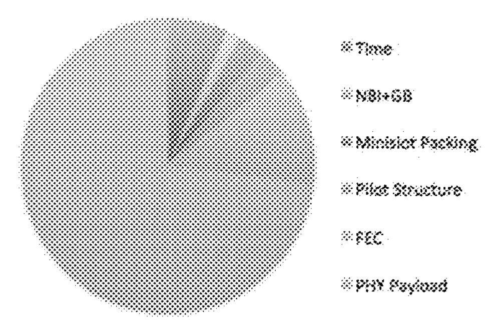

FIG. 31

| | T | U | V | W | X |
|---|---|---|---|---|---|
| 4 | | Conditions | UseCase 4b | | |
| 5 | | BW (MHz) | 37 | | |
| 6 | | Guardband | 0 | | |
| 7 | | Subc. Spac. | 25 | | # Subcarriers |
| 8 | | Symbol Period (us) | 40 | Excl w. Legac | 0 |
| 9 | | Avg b/symb | 8 | S. Avail | 1480 |
| 10 | | Excluded Band w. Legacy | 0 | S. Used | 1440 |
| 11 | | Active Bandwidth (MHz) | 37 | S. Not Used | 40 |
| 12 | | # of Strong NBIs | 5 | NBI S. Not Us | 15 |
| 13 | | NBI Excluded Subc. | 15 | Packing S. Nc | 25 |
| 14 | | Subcarriers (Q) | 16 | | |
| 15 | | Symbols (K) | 16 | | |
| 16 | | # of Minislots | 90 | | |
| 17 | | CP (us) | 2.8125 | 288 samples | |
| 18 | | Pilot Structure | 10 | | |
| 19 | | Ideal Capacity | 296 | Mbps | |
| 20 | | | Efficiency | Overhead | |
| 21 | | Time | 0.9343 | 0.0657 | |
| 22 | Freq | | 0.97297297 | | 0.02525135 |
| 23 | | NBI+GB | | 0.00946926 | |
| 24 | | Minislot Packing | | 0.01578209 | |
| 25 | | | | | |
| 26 | | Pilot Structure | 0.9626302 | 0.03397097 | |
| 27 | | FEC | 0.857215 | 0.12494797 | |
| 28 | | PHY Payload | | 0.75 | |
| 29 | | Capacity | 222.038396 | Mbps | 222.038396 |
| 30 | | | 6.00 | b/s/Hz | |
| 31 | | Overall PHY Efficiency | 222.00 | Mbps | |

| | Z | AA | AB | AC | AD |
|---|---|---|---|---|---|
| 4 | | Conditions | UseCase 4b+ | | |
| 5 | | BW (MHz) | 37 | | |
| 6 | | Guardband | 0 | | |
| 7 | | Subc. Spac. | 25 | | # Subcarriers |
| 8 | | Symbol Period (us) | 40 | Excl w. Legac | 0 |
| 9 | | Avg b/symb | 10 | S. Avail | 1480 |
| 10 | | Excluded Band w. Legacy | 0 | S. Used | 1440 |
| 11 | | Active Bandwidth (MHz) | 37 | S. Not Used | 40 |
| 12 | | # of Strong NBIs | 5 | NBI S. Not Us | 15 |
| 13 | | NBI Excluded Subc. | 15 | Packing S. Nc | 25 |
| 14 | | Subcarriers (Q) | 16 | | |
| 15 | | Symbols (K) | 16 | | |
| 16 | | # of Minislots | 90 | | |
| 17 | | CP (us) | 2.8125 | 288 samples | |
| 18 | | Pilot Structure | 10 | | |
| 19 | | Ideal Capacity | 370 | Mbps | |
| 20 | | | Efficiency | Overhead | |
| 21 | | Time | 0.9343 | 0.0657 | |
| 22 | Freq | | 0.97297297 | | 0.02525135 |
| 23 | | NBI+GB | | 0.00946926 | |
| 24 | | Minislot Packing | | 0.01578209 | |
| 25 | | | | | |
| 26 | | Pilot Structure | 0.963559 | 0.03312664 | |
| 27 | | FEC | 0.856059 | 0.12608109 | |
| 28 | | PHY Payload | | 0.75 | |
| 29 | | Capacity | 277.441139 | Mbps | 277.441139 |
| 30 | | | 7.50 | b/s/Hz | |
| 31 | | Overall PHY Efficiency | 277.50 | Mbps | |

| | AF | AG | AH | AI | AJ |
|---|---|---|---|---|---|
| 4 | | Conditions | UseCase 5a | | |
| 5 | | BW (MHz) | 80 | | |
| 6 | | Guardband | 0 | | |
| 7 | | Subc. Spac. | 25 | | # Subcarriers |
| 8 | | Symbol Period (us) | 40 | Excl w. Legac | 640 |
| 9 | | Avg b/symb | 10 | S. Avail | 2560 |
| 10 | | Excluded Band w. Legacy | 16 | S. Used | 2528 |
| 11 | | Active Bandwidth (MHz) | 64 | S. Not Used | 32 |
| 12 | | # of Strong NBIs | 3 | NBI S. Not Us | 9 |
| 13 | | NBI Excluded Subc. | 9 | Packing S. Nc | 23 |
| 14 | | Subcarriers (Q) | 16 | | |
| 15 | | Symbols (K) | 16 | | |
| 16 | | # of Minislots | 158 | | |
| 17 | | CP (us) | 2.1875 | 224 samples | |
| 18 | | Pilot Structure | 9 | | |
| 19 | | Ideal Capacity | 640 | Mbps | |
| 20 | | | Efficiency | Overhead | |
| 21 | | Time | 0.9481 | 0.0519 | |
| 22 | Freq | | 0.9875 | | 0.01185125 |
| 23 | | NBI+GB | | 0.00333316 | |
| 24 | | Minislot Packing | | 0.00851809 | |
| 25 | | | | | |
| 26 | | Pilot Structure | 0.9791733 | 0.01949897 | |
| 27 | | FEC | 0.854967 | 0.13295897 | |
| 28 | | PHY Payload | | 0.78 | |
| 29 | | Capacity | 501.626117 | Mbps | 501.626117 |
| 30 | | | 7.84 | b/s/Hz | |
| 31 | | Overall PHY Efficiency | 501.76 | Mbps | |

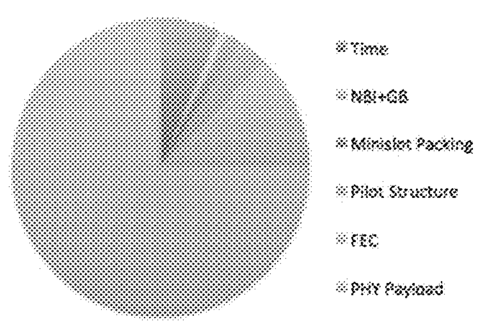

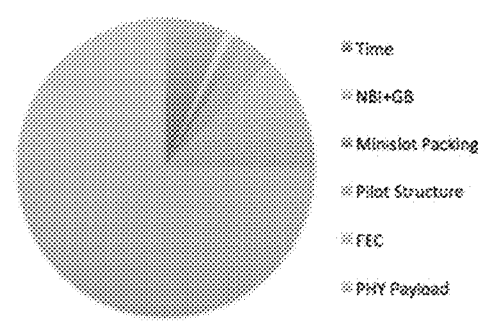

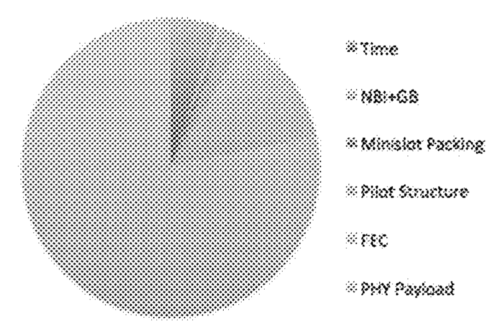

FIG. 32

| | AL | AM | AN | AO | AP |
|---|---|---|---|---|---|
| 4 | | Conditions | UseCase 5a+ | | |
| 5 | | BW (MHz) | 80 | | |
| 6 | | Guardband | 0 | | |
| 7 | | Subc. Spac. | 25 | | # Subcarriers |
| 8 | | Symbol Period (us) | 40 | Excl w. Legac | 640 |
| 9 | | Avg b/symb | 11 | S. Avail | 2560 |
| 10 | | Excluded Band w. Legacy | 16 | S. Used | 2528 |
| 11 | | Active Bandwidth (MHz) | 64 | S. Not Used | 32 |
| 12 | | # of Strong NBIs | 3 | NBI S. Not Us | 9 |
| 13 | | NBI Excluded Subc. | 9 | Packing S. Nc | 23 |
| 14 | | Subcarriers (Q) | 16 | | |
| 15 | | Symbols (K) | 16 | | |
| 16 | | # of Minislots | 158 | | |
| 17 | | CP (us) | 2.1875 | 224 samples | |
| 18 | | Pilot Structure | 9 | | |
| 19 | | Ideal Capacity | 704 | Mbps | |
| 20 | | | Efficiency | Overhead | |
| 21 | | Time | 0.9481 | 0.0519 | |
| 22 | Freq | | 0.9875 | | 0.01185125 |
| 23 | | NBI+GB | | 0.00333316 | |
| 24 | | Minislot Packing | | 0.00851809 | |
| 25 | | | | | |
| 26 | | Pilot Structure | 0.9793764 | 0.01930883 | |
| 27 | | FEC | 0.854412 | 0.13349545 | |
| 28 | | PHY Payload | | 0.78 | |
| 29 | | Capacity | 551.544914 | Mbps | 551.544914 |
| 30 | | | 8.62 | b/s/Hz | |
| 31 | | Overall PHY Efficiency | 551.68 | Mbps | |

| | AR | AS | AT | AU | AV |
|---|---|---|---|---|---|
| 4 | | Conditions | UseCase 5b | | |
| 5 | | BW (MHz) | 80 | | |
| 6 | | Guardband | 0 | | |
| 7 | | Subc. Spac. | 25 | | # Subcarriers |
| 8 | | Symbol Period (us) | 40 | Excl w. Legac | 0 |
| 9 | | Avg b/symb | 10 | S. Avail | 3200 |
| 10 | | Excluded Band w. Legacy | 0 | S. Used | 3168 |
| 11 | | Active Bandwidth (MHz) | 80 | S. Not Used | 32 |
| 12 | | # of Strong NBIs | 3 | NBI S. Not Us | 9 |
| 13 | | NBI Excluded Subc. | 9 | Packing S. Nc | 23 |
| 14 | | Subcarriers (Q) | 16 | | |
| 15 | | Symbols (K) | 16 | | |
| 16 | | # of Minislots | 198 | | |
| 17 | | CP (us) | 2.1875 | 224 samples | |
| 18 | | Pilot Structure | 9 | | |
| 19 | | Ideal Capacity | 800 | Mbps | |
| 20 | | | Efficiency | Overhead | |
| 21 | | Time | 0.9481 | 0.0519 | |
| 22 | Freq | | 0.99 | | 0.009481 |
| 23 | | NBI+GB | | 0.00266653 | |
| 24 | | Minislot Packing | | 0.00681447 | |
| 25 | | | | | |
| 26 | | Pilot Structure | 0.9792061 | 0.01951755 | |
| 27 | | FEC | 0.856894 | 0.13152893 | |
| 28 | | PHY Payload | | 0.79 | |
| 29 | | Capacity | 630.058015 | Mbps | 630.058015 |
| 30 | | | 7.88 | b/s/Hz | |
| 31 | | Overall PHY Efficiency | 630.40 | Mbps | |

| | AX | AY | AZ | BA | BB |
|---|---|---|---|---|---|
| 4 | | Conditions | UseCase 5b+ | | |
| 5 | | BW (MHz) | 80 | | |
| 6 | | Guardband | 0 | | |
| 7 | | Subc. Spac. | 25 | | # Subcarriers |
| 8 | | Symbol Period (us) | 40 | Excl w. Legac | 0 |
| 9 | | Avg b/symb | 11 | S. Avail | 3200 |
| 10 | | Excluded Band w. Legacy | 0 | S. Used | 3168 |
| 11 | | Active Bandwidth (MHz) | 80 | S. Not Used | 32 |
| 12 | | # of Strong NBIs | 3 | NBI S. Not Us | 9 |
| 13 | | NBI Excluded Subc. | 9 | Packing S. Nc | 23 |
| 14 | | Subcarriers (Q) | 16 | | |
| 15 | | Symbols (K) | 16 | | |
| 16 | | # of Minislots | 198 | | |
| 17 | | CP (us) | 2.1875 | 224 samples | |
| 18 | | Pilot Structure | 9 | | |
| 19 | | Ideal Capacity | 880 | Mbps | |
| 20 | | | Efficiency | Overhead | |
| 21 | | Time | 0.9481 | 0.0519 | |
| 22 | Freq | | 0.99 | | 0.009481 |
| 23 | | NBI+GB | | 0.00266653 | |
| 24 | | Minislot Packing | | 0.00681447 | |
| 25 | | | | | |
| 26 | | Pilot Structure | 0.9793281 | 0.01940304 | |
| 27 | | FEC | 0.856372 | 0.13202515 | |
| 28 | | PHY Payload | | 0.79 | |
| 29 | | Capacity | 692.727914 | Mbps | 692.727914 |
| 30 | | | 8.66 | b/s/Hz | |
| 31 | | Overall PHY Efficiency | 692.80 | Mbps | |

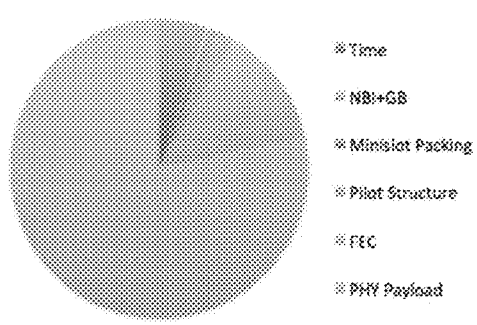

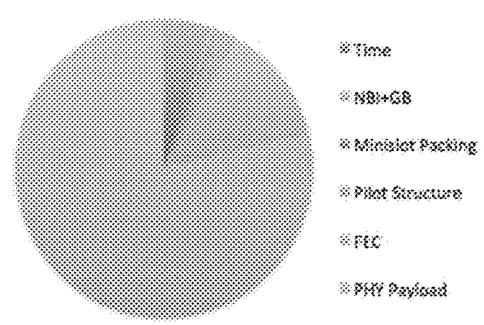

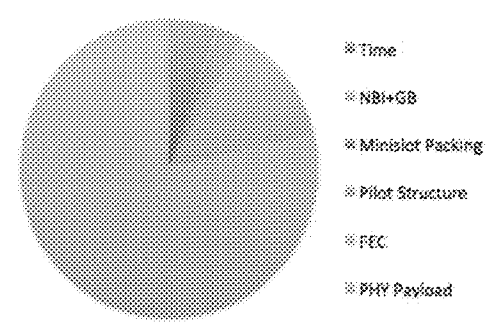

FIG. 33A

| | BD | BE | BF | BG | BH | BI | BJ | BK | BL | BM | BN |
|---|---|---|---|---|---|---|---|---|---|---|---|
| 4 | | Conditions | UseCase 6a | | | | | Conditions | UseCase 6a+ | | |
| 5 | | BW (MHz) | 192 | | | | | BW (MHz) | 192 | | |
| 6 | | Guardband | 0 | | | | | Guardband | 0 | | |
| 7 | | Subc. Spac. | 25 | | # Subcarriers | | | Subc. Spac. | 25 | | # Subcarriers |
| 8 | | Symbol Period (us) | 40 | Excl w. Legac | 512 | | | Symbol Period (us) | 40 | Excl w. Legac | 512 |
| 9 | | Avg b/symb | 10 | S. Avail | 7168 | | | Avg b/symb | 11 | S. Avail | 7168 |
| 10 | | Excluded Band w. Legacy | 12.8 | S. Used | 7136 | | | Excluded Band w. Legacy | 12.8 | S. Used | 7136 |
| 11 | | Active Bandwidth (MHz) | 179.2 | S. Not Used | 32 | | | Active Bandwidth (MHz) | 179.2 | S. Not Used | 32 |
| 12 | | # of Strong NBIs | 0 | NBI S. Not Us | 0 | | | # of Strong NBIs | 0 | NBI S. Not Us | 0 |
| 13 | | NBI Excluded Subc. | 0 | Packing S. Nc | 32 | | | NBI Excluded Subc. | 0 | Packing S. Nc | 32 |
| 14 | | Subcarriers (Q) | 16 | | | | | Subcarriers (Q) | 16 | | |
| 15 | | Symbols (K) | 16 | | | | | Symbols (K) | 16 | | |
| 16 | | # of Minislots | 446 | | | | | # of Minislots | 446 | | |
| 17 | | CP (us) | 1.875 | 192 samples | | | | CP (us) | 1.875 | 192 samples | |
| 18 | | Pilot Structure | 12 | | | | | Pilot Structure | 12 | | |
| 19 | | Ideal Capacity | 1792 | Mbps | | | | Ideal Capacity | 1971.2 | Mbps | |
| 20 | | | Efficiency | Overhead | | | | | Efficiency | Overhead | |
| 21 | | Time | 0.9552 | 0.0448 | | | | Time | 0.9552 | 0.0448 | |
| 22 | Freq | | 0.99553571 | | 0.00426429 | | Freq | | 0.99553571 | | 0.00426429 |
| 23 | | NBI+GB | | 0 | | | | NBI+GB | | 0 | |
| 24 | | Minislot Packing | | 0.00426429 | | | | Minislot Packing | | 0.00426429 | |
| 25 | | | | | | | | | | | |
| 26 | | Pilot Structure | 0.9935865 | 0.00609883 | | | | Pilot Structure | 0.9935865 | 0.00609883 | |
| 27 | | FEC | 0.858407 | 0.13378229 | | | | FEC | 0.856994 | 0.13511734 | |
| 28 | | PHY Payload | | 0.81 | | | | PHY Payload | | 0.81 | |
| 29 | | Capacity | 1453.40984 | Mbps | 1453.40984 | | | Capacity | 1596.11917 | Mbps | 1596.11917 |
| 30 | | | 8.11 | b/s/Hz | | | | | 8.91 | b/s/Hz | |
| 31 | | Overall PHY Efficiency | 1453.33 | Mbps | | | | Overall PHY Efficiency | 1596.67 | Mbps | |

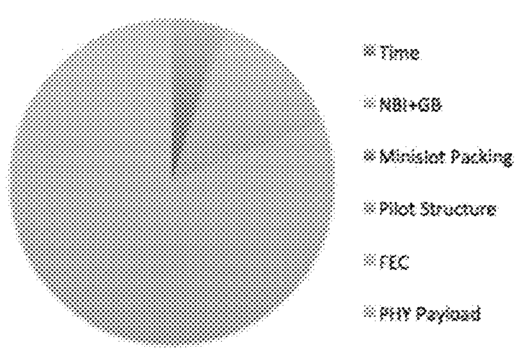

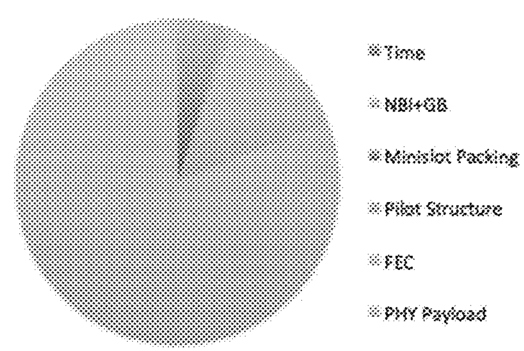

FIG. 33B

| | BP | BQ | BR | BS | BT | BU | BV | BW | BX | BY | BZ |
|---|---|---|---|---|---|---|---|---|---|---|---|
| 4 | | Conditions | UseCase 6b | | | | | Conditions | UseCase 6b+ | | |
| 5 | | BW (MHz) | 192 | | | | | BW (MHz) | 192 | | |
| 6 | | Guardband | 0 | | | | | Guardband | 0 | | |
| 7 | | Subc. Spac. | 25 | | # Subcarriers | | | Subc. Spac. | 25 | | # Subcarriers |
| 8 | | Symbol Period (us) | 40 | Excl w. Legac | 0 | | | Symbol Period (us) | 40 | Excl w. Legac | 0 |
| 9 | | Avg b/symb | 10 | S. Avail | 7680 | | | Avg b/symb | 11 | S. Avail | 7680 |
| 10 | | Excluded Band w. Legacy | 0 | S. Used | 7648 | | | Excluded Band w. Legacy | 0 | S. Used | 7648 |
| 11 | | Active Bandwidth (MHz) | 192 | S. Not Used | 32 | | | Active Bandwidth (MHz) | 192 | S. Not Used | 32 |
| 12 | | # of Strong NBIs | 0 | NBI S. Not Us | 0 | | | # of Strong NBIs | 0 | NBI S. Not Us | 0 |
| 13 | | NBI Excluded Subc. | 0 | Packing S. Nc | 32 | | | NBI Excluded Subc. | 0 | Packing S. Nc | 32 |
| 14 | | Subcarriers (Q) | 16 | | | | | Subcarriers (Q) | 16 | | |
| 15 | | Symbols (K) | 16 | | | | | Symbols (K) | 16 | | |
| 16 | | # of Minislots | 478 | | | | | # of Minislots | 478 | | |
| 17 | | CP (us) | 1.875 | 192 samples | | | | CP (us) | 1.875 | 192 samples | |
| 18 | | Pilot Structure | 12 | | | | | Pilot Structure | 12 | | |
| 19 | | Ideal Capacity | 1920 | Mbps | | | | Ideal Capacity | 2112 | Mbps | |
| 20 | | | Efficiency | Overhead | | | | | Efficiency | Overhead | |
| 21 | | Time | 0.9552 | 0.0448 | | | | Time | 0.9552 | 0.0448 | |
| 22 | Freq | | 0.99583333 | | 0.00398 | | Freq | | 0.99583333 | | 0.00398 |
| 23 | | NBI+GB | | 0 | | | | NBI+GB | | 0 | |
| 24 | | Minislot Packing | | 0.00398 | | | | Minislot Packing | | 0.00398 | |
| 25 | | | | | | | | | | | |
| 26 | | Pilot Structure | 0.9935449 | 0.00614022 | | | | Pilot Structure | 0.9935701 | 0.00611625 | |
| 27 | | FEC | 0.858915 | 0.13333658 | | | | FEC | 0.855805 | 0.13627924 | |
| 28 | | PHY Payload | | 0.81 | | | | PHY Payload | | 0.81 | |
| 29 | | Capacity | 1558.54694 | Mbps | 1558.54694 | | | Capacity | 1708.23738 | Mbps | 1708.23738 |
| 30 | | | 8.12 | b/s/Hz | | | | | 8.90 | b/s/Hz | |
| 31 | | Overall PHY Efficiency | 1559.04 | Mbps | | | | Overall PHY Efficiency | 1708.80 | Mbps | |

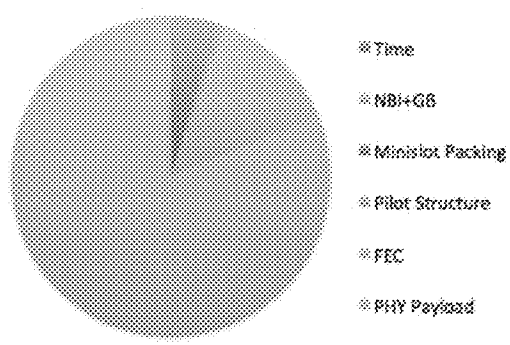

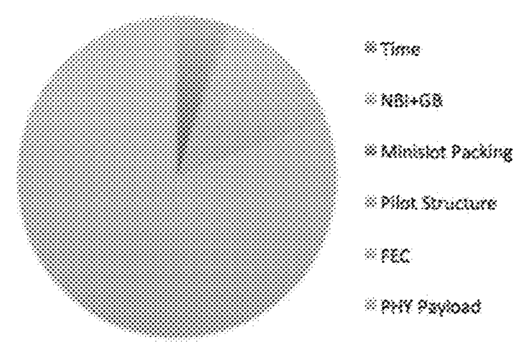

FIG. 33C

| | BZ | CA | CB | CC | CD | CE | CF | CG | CH | CI |
|---|---|---|---|---|---|---|---|---|---|---|
| 3 | | | | | | DOCSIS 3.0 | | | | |
| 4 | | | | | | | | | | |
| 5 | | | | | 6.4 MHz, 64QAM | | | | | |
| 6 | | | | DOCSIS 3.0 | | FEC Long: 235,10 | | Raw Cap= | 30.72 | Mbps |
| 7 | | | | | | FEC Short: 78, 5 | | | | |
| 8 | | | | | Avg. Pkt Size | 512 Bytes | | Eff= | 70% | |
| 9 | | | | | | | | | | |
| 10 | | | | | 3.2 MHz 16 QAM | | | | | |
| 11 | | | | | | FEC Long: 235,10 | | Raw Cap= | 10.24 | Mbps |
| 12 | | | | | | FEC Short: 78, 5 | | | | |
| 13 | | | | | Avg. Pkt Size | 512 Bytes | | Eff= | 75% | |
| 14 | | | | | | | | | | |
| 15 | | | | Baseline DOCSIS 3x6.4(64QAM) + 1x3.2(16QAM)= | | | | | 72.192 | Mbps |
| 16 | | | | | | | | | | |
| 17 | | | | Total DOCSIS 2x6.4(64QAM) + 1x3.2(16QAM)= | | | | | 50.688 | Mbps |
| 18 | | | | | | | | | | |
| 19 | | | | | | Total DOCSIS 2x6.4(64QAM) = | | | 43.008 | Mbps |
| 20 | | | | | | | | | | |
| 21 | | | | 5-42 MHz | | Case | Case | Case | Case | |
| 22 | | | | | | 4a | 4b | 4a+ | 4b+ | |
| 23 | | | | | Bit Loading | 8 | 8 | 10 | 10 | bits |
| 24 | | | | | Excl for Legacy | 16 | 0 | 16 | 0 | MHz |
| 25 | | | | | Capacity 3.1 | 122.60 | 222.00 | 153.00 | 277.50 | Mbps |
| 26 | | | | | Capacity 3.0 | 50.69 | 50.69 | 50.69 | 50.69 | Mbps |
| 27 | | | | D3.1 | 20% | 98.08 | 44.40 | 122.40 | 55.50 | Mbps |
| 28 | | | | D3.0 | 80% | 40.55 | | 40.55 | | Mbps |
| 29 | | | | Mixing Penalty | 5% | 173.88 | | 207.53 | | Mbps |
| 30 | | | | | | | | | | |
| 31 | | | | | | | | | | |
| 32 | | | | 5-85 MHz | | Case | Case | Case | Case | |
| 33 | | | | | | 5a | 5b | 5a+ | 5b+ | |
| 34 | | | | | Bit Loading | 10 | 10 | 11 | 11 | bits |
| 35 | | | | | Excl for Legacy | 16 | 0 | 16 | 0 | MHz |
| 36 | | | | | Capacity 3.1 | 501.76 | 630.40 | 551.68 | 692.80 | Mbps |
| 37 | | | | | Capacity 3.0 | 50.69 | 50.69 | 50.69 | 50.69 | Mbps |
| 38 | | | | D3.1 | 40% | 301.06 | 252.16 | 331.01 | 277.12 | Mbps |
| 39 | | | | D3.0 | 60% | 30.41 | | 30.41 | | Mbps |
| 40 | | | | Mixing Penalty | 5% | 554.45 | | 606.61 | | Mbps |
| 41 | | | | | | | | | | |
| 42 | | | | | | | | | | |
| 43 | | | | 12-204 MHz | | Case | Case | Case | Case | |
| 44 | | | | | | 6a | 6b | 6a+ | 6b+ | |
| 45 | | | | | Bit Loading | 10 | 10 | 11 | 11 | bits |
| 46 | | | | | Excl for Legacy | 12.8 | 0 | 12.8 | 0 | MHz |
| 47 | | | | | Capacity 3.1 | 1453.31 | 1559.04 | 1596.67 | 1708.80 | Mbps |
| 48 | | | | | Capacity 3.0 | 43.01 | 43.01 | 43.01 | 43.01 | Mbps |
| 49 | 60% | D3.0 | | D3.1 | 40% | 871.99 | 623.62 | 958.00 | 683.52 | Mbps |
| 50 | 40% | D3.1 | | D3.0 | 60% | 25.80 | | 25.80 | | Mbps |
| 51 | | | | Mixing Penalty | 5% | 1445.34 | | 1583.96 | | Mbps |
| 52 | | | | | | | | | | |

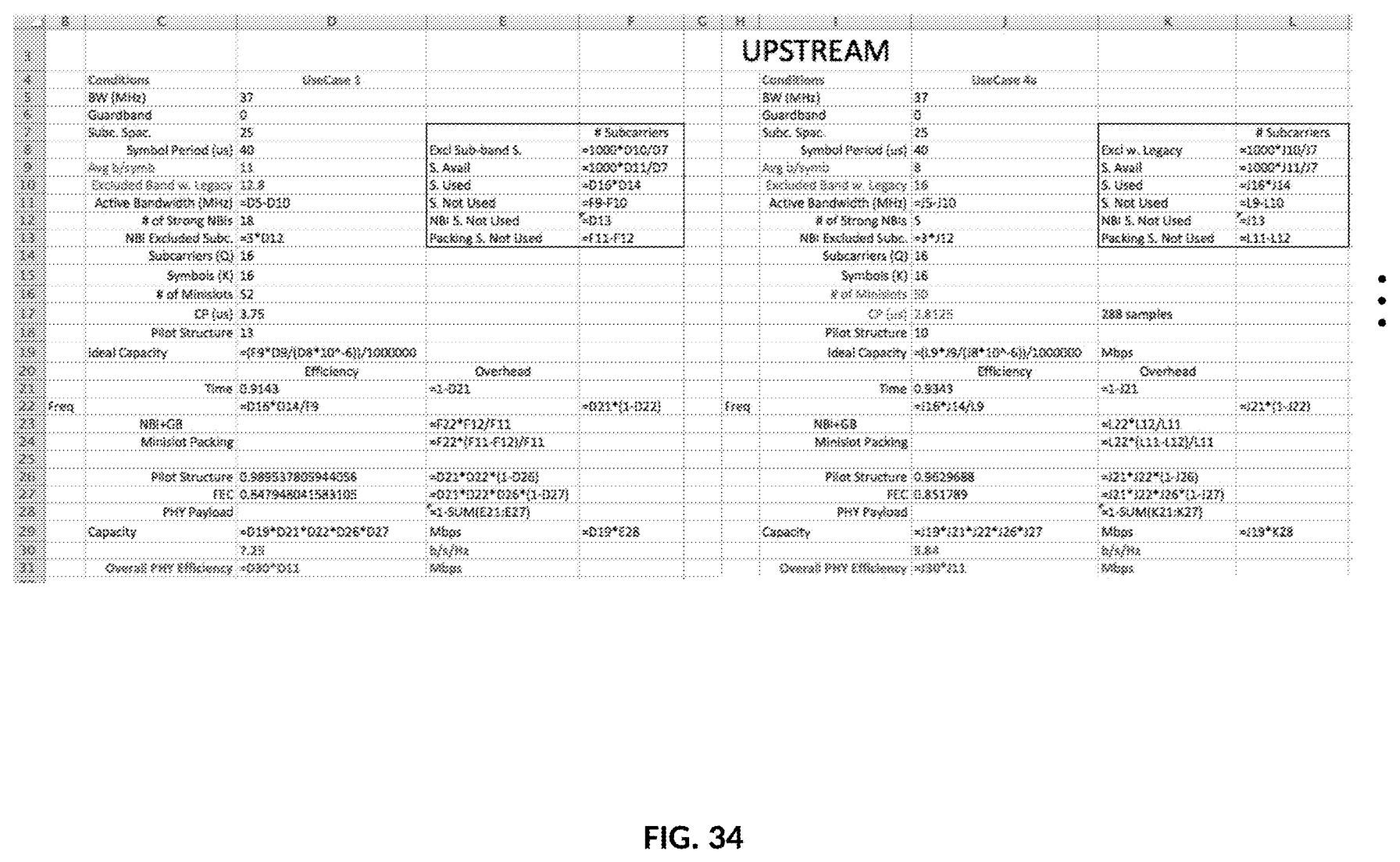

| | B | C | D | E | F | G | H | I | J | K | L |
|---|---|---|---|---|---|---|---|---|---|---|---|
| 3 | | | | | | | | UPSTREAM | | | |
| 4 | | Conditions | UseCase 1 | | | | | Conditions | UseCase 4a | | |
| 5 | | BW (MHz) | 37 | | | | | BW (MHz) | 37 | | |
| 6 | | Guardband | 0 | | | | | Guardband | 0 | | |
| 7 | | Subc. Spac. | 25 | | # Subcarriers | | | Subc. Spac. | 25 | | # Subcarriers |
| 8 | | Symbol Period (us) | 40 | Excl Sub-band S. | =1000*D10/D7 | | | Symbol Period (us) | 40 | Excl w. Legacy | =1000*J10/J7 |
| 9 | | Avg b/symb | 11 | S. Avail | =1000*D11/D7 | | | Avg b/symb | 8 | S. Avail | =1000*J11/J7 |
| 10 | | Excluded Band w. Legacy | 12.8 | S. Used | =D16*D14 | | | Excluded Band w. Legacy | 16 | S. Used | =J16*J14 |
| 11 | | Active Bandwidth (MHz) | =D5-D10 | S. Not Used | =F9-F10 | | | Active Bandwidth (MHz) | =J5-J10 | S. Not Used | =L9-L10 |
| 12 | | # of Strong NBIs | 18 | NBI S. Not Used | =D13 | | | # of Strong NBIs | 5 | NBI S. Not Used | =J13 |
| 13 | | NBI Excluded Subc. | =3*D12 | Packing S. Not Used | =F11-F12 | | | NBI Excluded Subc. | =3*J12 | Packing S. Not Used | =L11-L12 |
| 14 | | Subcarriers (Q) | 16 | | | | | Subcarriers (Q) | 16 | | |
| 15 | | Symbols (K) | 16 | | | | | Symbols (K) | 16 | | |
| 16 | | # of Minislots | 52 | | | | | # of Minislots | 30 | | |
| 17 | | CP (us) | 3.75 | | | | | CP (us) | 1.8125 | 288 samples | |
| 18 | | Pilot Structure | 13 | | | | | Pilot Structure | 10 | | |
| 19 | | Ideal Capacity | =(F9*D9/(D8*10^-6))/1000000 | | | | | Ideal Capacity | =(L9*J9/(J8*10^-6))/1000000 | Mbps | |
| 20 | | | Efficiency | Overhead | | | | | Efficiency | Overhead | |
| 21 | | Time | 0.9143 | =1-D21 | | | | Time | 0.9343 | =1-J21 | |
| 22 | Freq | | =D16*D14/F9 | | =D21*(1-D22) | | Freq | | =J16*J14/L9 | | =J21*(1-J22) |
| 23 | | NBI+GB | | =F22*F12/F11 | | | | NBI+GB | | =L22*L12/L11 | |
| 24 | | Minislot Packing | | =F22*(F11-F12)/F11 | | | | Minislot Packing | | =L22*(L11-L12)/L11 | |
| 25 | | | | | | | | | | | |
| 26 | | Pilot Structure | 0.989537805944056 | =D21*D22*(1-D26) | | | | Pilot Structure | 0.9629688 | =J21*J22*(1-J26) | |
| 27 | | FEC | 0.847946041583105 | =D21*D22*D26*(1-D27) | | | | FEC | 0.851789 | =J21*J22*J26*(1-J27) | |
| 28 | | PHY Payload | | =1-SUM(E21:E27) | | | | PHY Payload | | =1-SUM(K21:K27) | |
| 29 | | Capacity | =D19*D21*D22*D26*D27 | Mbps | =D19*E28 | | | Capacity | =J19*J21*J22*J26*J27 | Mbps | =J19*K28 |
| 30 | | | 7.23 | b/s/Hz | | | | | 3.84 | b/s/Hz | |
| 31 | | Overall PHY Efficiency | =D30*D11 | Mbps | | | | Overall PHY Efficiency | =J30*J11 | Mbps | |

FIG. 34

| | CC | CD | CE | CF | CG | CH | CI |
|---|---|---|---|---|---|---|---|
| 3 | | | DOCSIS 3.0 | | | | |
| 4 | | | | | | | |
| 5 | | 6.4 MHz, 64QAM | | | | | |
| 6 | DOCSIS 3.0 | | FEC Long: 235,10 | | Raw Cap= | 30.72 | Mbps |
| 7 | | | FEC Short: 78, 5 | | | | |
| 8 | | Avg. Pkt Size | 512 Bytes | | Eff= | 0.7 | |
| 9 | | | | | | | |
| 10 | | 3.2 MHz 16 QAM | | | | | |
| 11 | | | FEC Long: 235,10 | | Raw Cap= | 10.24 | Mbps |
| 12 | | | FEC Short: 78, 5 | | | | |
| 13 | | Avg. Pkt Size | 512 Bytes | | Eff= | 0.75 | |
| 14 | | | | | | | |
| 15 | | | | | Baseline DOCSIS 3x6.4(64QAM) + 1x3.2(16QAM)= | =3*CH8*CH6+CH13*CH11 | Mbps |
| 16 | | | | | | | |
| 17 | | | | | Total DOCSIS 2x6.4(64QAM) + 1x3.2(16QAM)= | =2*CH8*CH6+CH13*CH11 | Mbps |
| 18 | | | | | | | |
| 19 | | | | | Total DOCSIS 2x6.4(64QAM) = | =2*CH8*CH6 | Mbps |
| 20 | | | | | | | |
| 21 | 5-42 MHz | | Case | Case | Case | Case | |
| 22 | | | 4a | 4b | 4a+ | 4b+ | |
| 23 | | Bit Loading | 8 | 8 | 10 | 10 | bits |
| 24 | | Excl for Legacy | 16 | 0 | 16 | 0 | MHz |
| 25 | | Capacity 3.1 | 132.6 | 222 | 153 | 277.5 | Mbps |
| 26 | | Capacity 3.0 | 50.688 | 50.688 | 50.688 | 50.688 | Mbps |
| 27 | D3.1 | 0.2 | =(1-CD27)*CE25 | =CD27*CF25 | =(1-CD27)*CG25 | =CD27*CH25 | Mbps |
| 28 | D3.0 | 0.8 | =CD28*CE26 | | =CD28*CG26 | | Mbps |
| 29 | Mixing Penalty | 0.05 | =(CE27+CE28+CF27)*(1-$CD$29) | | =(CG27+CG28+CH27)*(1-$CD$29) | | Mbps |
| 30 | | | | | | | |
| 31 | | | | | | | |
| 32 | 5-85 MHz | | Case | Case | Case | Case | |
| 33 | | | 5a | 5b | 5a+ | 5b+ | |
| 34 | | Bit Loading | 10 | 10 | 11 | 11 | bits |
| 35 | | Excl for Legacy | 16 | 0 | 16 | 0 | MHz |
| 36 | | Capacity 3.1 | 501.76 | 630.4 | 551.68 | 692.8 | Mbps |
| 37 | | Capacity 3.0 | 50.888 | 50.688 | 50.688 | 50.688 | Mbps |
| 38 | D3.1 | 0.4 | =(1-CD38)*CE36 | =CD38*CF36 | =(1-CD38)*CG36 | =CD38*CH36 | Mbps |
| 39 | D3.0 | 0.6 | =CD39*CE37 | | =CD39*CG37 | | Mbps |
| 40 | Mixing Penalty | 0.05 | =(CE38+CE39+CF38)*(1-$CD$29) | | =(CG38+CG39+CH38)*(1-$CD$29) | | Mbps |
| 41 | | | | | | | |
| 42 | | | | | | | |
| 43 | 12-204 MHz | | Case | Case | Case | Case | |
| 44 | | | 6a | 6b | 6a+ | 6b+ | |
| 45 | | Bit Loading | 10 | 10 | 11 | 11 | bits |
| 46 | | Excl for Legacy | 12.8 | 0 | 12.8 | 0 | MHz |
| 47 | | Capacity 3.1 | 1453.31 | 1559.04 | 1596.67 | 1708.8 | Mbps |
| 48 | | Capacity 3.0 | 43.008 | 43.008 | 43.008 | 43.008 | Mbps |
| 49 | D3.1 | 0.4 | =(1-CD49)*CE47 | =CD49*CF47 | =(1-CD49)*CG47 | =CD49*CH47 | Mbps |
| 50 | D3.0 | 0.6 | =CD50*CE48 | | =CD50*CG48 | | Mbps |
| 51 | Mixing Penalty | 0.05 | =(CE49+CE50+CF49)*(1-$CD$29) | | =(CG49+CG50+CH49)*(1-$CD$29) | | Mbps |
| 52 | | | | | | | |

FIG. 35

| DOWNSTREAM | | | | | | | | |
|---|---|---|---|---|---|---|---|---|
| ANGA | | | ANGA | | | ANGA | | |
| Conditions | UseCase 1 | | Conditions | UseCase 2 | | Conditions | UseCase 3 | |
| BW (MHz) | 24 | | BW (MHz) | 192 | | BW (MHz) | 384 | |
| Guardband | 1 | | Guardband | 2 | | Guardband | 2 | |
| Subc. Spac. | 25 | | Subc. Spac. | 50 | | Subc. Spac. | 50 | |
| Avg b/symb | 10 | | Avg b/symb | 11 | | Avg b/symb | 12 | |
| Excluded Band | 0 | | Excluded Band | 10 | | Excluded Band | 6 | |
| Excluded Subc. | 0 | | Excluded Subc. | 0 | | Excluded Subc. | 0 | |
| | | | | | | | | |
| CP (us) | 2.5 | | CP (us) | 1.25 | | CP (us) | 0.9375 | |
| PLC Subc | 16 | | PLC Subc | 8 | | PLC Subc | 8 | |
| Cont & Scat | 56 | | Cont & Scat | 77 | | Cont & Scat | 75 | |
| NCP Messages | 2 | | NCP Messages | 3 | | NCP Messages | 2 | |
| Subc/NCP | 8 | | Subc/NCP | 8 | | Subc/NCP | 8 | |
| | | | | | | | | |
| Downstream | | | Downstream | | | Downstream | | |
| | | | | | | | | |
| Time Overhead | 5.85 | | Time Overhead | 5.88 | | Time Overhead | 4.48 | |
| Guardband | 7.84 | | Guardband | 2.078 | | Guardband | 0.9934 | |
| Pilots & PLC | 2.5 | | Pilots & PLC | 2.97 | | Pilots & PLC | 2.16 | |
| NCP | 1.57 | | NCP | 0.559 | | NCP | 0.795 | |
| FEC | 19.2 | | FEC | 10.92 | | FEC | 12.14 | |
| Excluded Subc. | 0 | | Excluded Subc. | 4.25 | | Excluded Subc. | 0 | |
| PHY Payload | 58.91 | | PHY Payload | 74.674 | | PHY Payload | 79.4356 | |
| | | | | | | | | |
| PHY Efficiency | 5.78 | b/s/Hz | PHY Efficiency | 8.2 | b/s/Hz | PHY Efficiency | 9.53 | b/s/Hz |
| Capacity | 138.72 | Mbps | Capacity | 1574.4 | Mbps | Capacity | 3659.52 | Mbps |

| | | | | | | | | | | | | |
|---|---|---|---|---|---|---|---|---|---|---|---|---|
| | Lower Edge | 606 | | Lower Edge | 216 | | Lower Edge | 678 | | | | |
| | Comcast | | | Comcast | | | Comcast | | | | | |
| | Conditions | UseCase A | | Conditions | UseCase B | | Conditions | UseCase C | | | | |
| | BW (MHz) | 96 | | BW (MHz) | 96 | | BW (MHz) | 192 | | | | |
| | Guardband | 2 | | Guardband | 2 | | Guardband | 2 | | | | |
| | Subc. Spac. | 25 | | Subc. Spac. | 25 | | Subc. Spac. | 25 | | | | |
| | Avg b/symb | 12 | | Avg b/symb | 12 | | Avg b/symb | 12 | | | | |
| | Excluded Band | 0 | | Excluded Band | 0 | | Excluded Band | 3 | | | | |
| | Excluded Subc. | 0 | | Excluded Subc. | 0 | | Excluded Subc. | 3 | | | | |
| | | | | | | | | | | | | |
| | CP (us) | 1.25 | | CP (us) | 1.25 | | CP (us) | 1.25 | | | | |
| | PLC Subc | 16 | | PLC Subc | 16 | | PLC Subc | 16 | | | | |
| | Cont & Scat | 79 | | Cont & Scat | 79 | | Cont & Scat | 117 | | | | |
| | NCP Messages | 2 | | NCP Messages | 2 | | NCP Messages | 2 | | | | |
| | Subc/NCP | 8 | | Subc/NCP | 8 | | Subc/NCP | 8 | | | | |
| | G/256/1/1/4 | 0/10/80/10 | 11 | G/256/1/2/4 | 0/10/80/10 | 11 | G/256/1/2/4 | 0/10/80/10 | 11 | | | |
| DS-Profiles | RP/256/1/2/4 | 0/10/20/70 | 11.6 | RP/256/1/2/4 | 0/10/20/70 | 11.6 | RP/256/1/2/4 | 0/10/20/70 | 11.6 | | | |
| | Pr/256/1/2/4 | 10/80/5/5 | 9.95 | Pr/256/1/2/4 | 10/80/5/5 | 9.95 | Pr/256/1/2/4 | 10/80/5/5 | 9.95 | | | |
| | Time Overhead | 4.48 | | Time Overhead | 4.48 | | Time Overhead | 4.48 | | | | |
| | Guardband | 0.9934 | | Guardband | 0.9934 | | Guardband | 0.9954 | | | | |
| | Pilots & PLC | 2.16 | | Pilots & PLC | 2.16 | | Pilots & PLC | 2.16 | | | | |
| | NCP | 0.795 | | NCP | 0.795 | | NCP | 0.795 | | | | |
| | FEC | 12.14 | | FEC | 12.14 | | FEC | 12.14 | | | | |
| | Excluded Subc. | 0 | | Excluded Subc. | 0 | | Excluded Subc. | 0 | | | | |
| | PHY Payload | 79.4516 | | PHY Payload | 79.4516 | | PHY Payload | 79.4216 | | | | |
| | | | | | | | | | | | | |
| | PHY Efficiency | 9.53 | b/s/Hz | PHY Efficiency | 9.53 | b/s/Hz | PHY Efficiency | 9.53 | b/s/Hz | | | |
| | Capacity | 914.88 | Mbps | Capacity | 914.88 | Mbps | Capacity | 1829.76 | Mbps | | | |

| | | | |
|---|---|---|---|
| DOCSIS 3.1 | UseCase 9 -[illegible] | | |
| BW (MHz) | 96 | CP (us) | 1.25 |
| Guardband (MHz) | 2 | # of PLC Subc. | 16 |
| Subc. Spac. (KHz) | 25 | Cont & Scat Subc. | 63 |
| Avg b/symb | 9.95 | NCP Messages | 4 |
| # of Excluded Subc. | 0 | Subc/NCP | 8 |
| | | | |
| | | | |
| Time Overhead (%) | 3.03 | FEC Overhead (%) | 12.702 |
| Guardband Ovhd (%) | 2.020 | Excluded Subc. (%) | 0 |
| Pilots & PLC Ovhd (%) | 1.9949 | PHY Overhead (%) | 20.555 |
| NCP Overhead (%) | 0.808 | MAC Overhead (%) | 2.5 |
| | | Overall Efficiency (b/s/Hz) | 7.66 |
| | | PHY Efficiency (b/s/Hz) | 7.90 |
| | | Effective PHY Rate (Gbps) | 0.786767 |
| | | MAC Rate (Gbps) | 0.75 |
| Time | 3.03 | | |
| Guardband | 2.020 | | |
| Pilots & PLC | 1.9949 | | |
| NCP | 0.808 | | |
| FEC | 12.702 | | |
| MAC | 1.99 | | |
| Payload | 77.46 | | |

| | | | | | | |
|---|---|---|---|---|---|---|
| | | | 94.12 | | | |
| Overhead | | | 96.97 | Total Eff. | | |
| Tot Subc./symb | 3840 | | % | | | |
| PLC subc | 16 | 0.00416667 | 0.404 | | Per Profile Optimization | |
| GB subc | 80 | 0.02083333 | 2.020 | | Symb./Profile | 1.8 |
| Cont&Scat subc | 63 | 0.01640625 | 1.591 | 1.9949495 | Bits/symbol | 9.95 |
| NCP subc | 32 | 0.00833333 | 0.808 | | Pre FEC Bits/Profile | 65927 |
| FEC subc | 503 | 0.13098958 | 12.702 | | Post FEC bits/Profile | 56928 |
| | | | 3.030 | | | |
| | | PHY Overhead | 20.556 | | | |

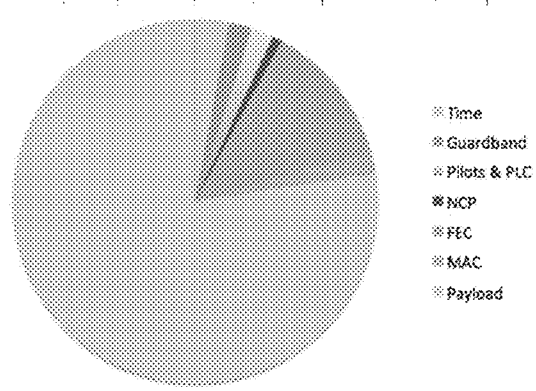

FIG. 36A

UPSTREAM

| Conditions | UseCase 1 | | Conditions | UseCase 2 | | Conditions | UseCase 3 | |
|---|---|---|---|---|---|---|---|---|
| BW (MHz) | 37 | | BW (MHz) | 80 | | BW (MHz) | 192 | |
| Guardband | 0 | | Guardband | 0 | | Guardband | 2 | |
| Subc. Spac. | 25 | | Subc. Spac. | 50 | | Subc. Spac. | 50 | |
| Avg b/symb | 6 | | Avg b/symb | 8 | | Avg b/symb | 11 | |
| Excluded Band | 12.6 | | Excluded Band | 12.6 | | Excluded Band | 0 | |
| Strong NBIs | 18 | | Strong NBIs | 12 | | Strong NBIs | 6 | |
| Excluded Subc. | 54 | | Excluded Subc. | 24 | | Excluded Subc. | 12 | |
| # of Gaps | 12 | | # of Gaps | 10 | | # of Gaps | 5 | |
| Minislot Packing Overhead | 72 | | Minislot Packing Overhead | 48 | | Minislot Packing Overhead | 24 | |
| | | | | | | | | |
| CP (us) | 3.75 | | CP (us) | 2.5 | | CP (us) | 1.25 | |
| Pilot Structure | 3 | | Pilot Structure | 2 | | Pilot Structure | 5 | |
| | | | | | | | | |
| Subcarriers (Q) | 8 | | Subcarriers (Q) | 8 | | Subcarriers (Q) | 8 | |
| Symbols (K) | 18 | | Symbols (K) | 18 | | Symbols (K) | 16 | |
| | | | | | | | | |
| Time Overhead | 8.57 | | Time Overhead | 11.11 | | Time Overhead | 5.88 | |
| Legacy,Excl Subc,Grd Bnd | 34.37 | | Legacy,Excl Subc,Grd Bnd | 15.56 | | Legacy,Excl Subc,Grd Bnd | 1.27 | |
| Minislot Packing | 2.97 | | Minislot Packing | 2.22 | | Minislot Packing | 0.49 | |
| Pilot Structure Overhead | 4.08 | | Pilot Structure Overhead | 3.00 | | Pilot Structure Overhead | 2.35 | |
| FEC | 6.92 | | FEC | 3.22 | | FEC | 12.60 | |
| PHY Payload | 42.50 | | PHY Payload | 58.89 | | PHY Payload | 77.40 | |
| | | | | | | | | |
| Overall PHY Efficiency | 2.55 | b/s/Hz | Overall PHY Efficiency | 4.71 | b/s/Hz | Overall PHY Efficiency | 8.51 | b/s/Hz |
| Capacity | 94.36 | Mbps | Capacity | 376.89 | Mbps | Capacity | 1634.77 | Mbps |

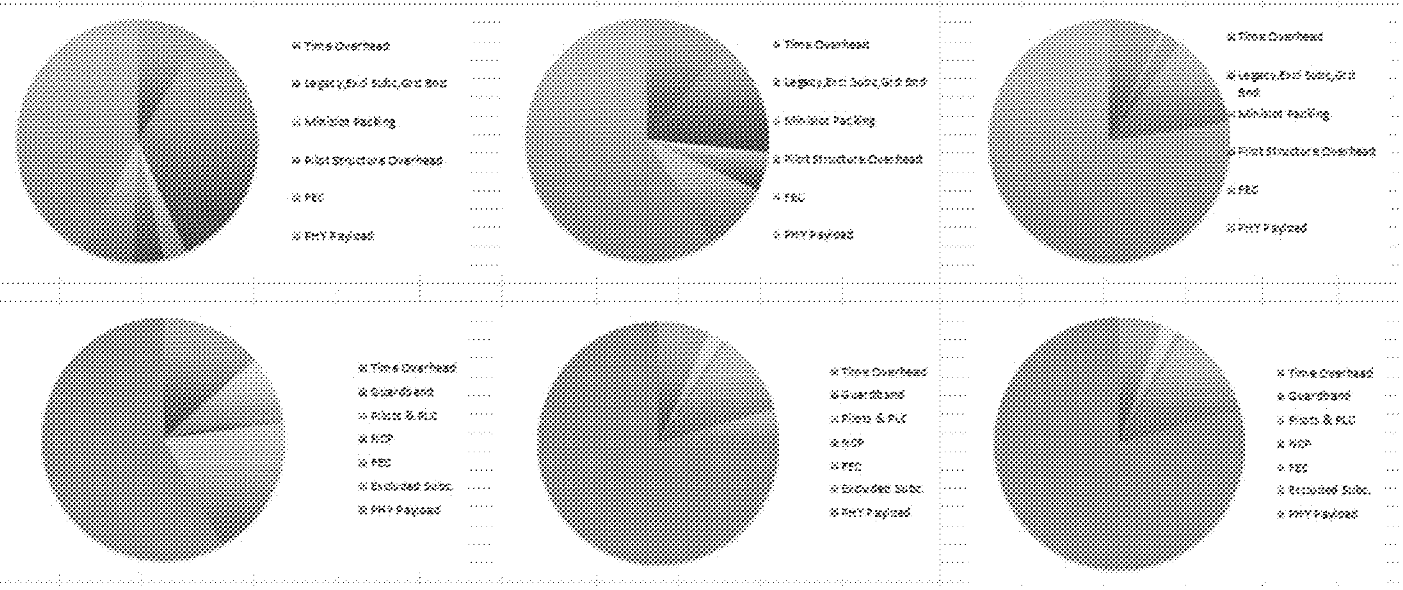

FIG. 37A

| | B | C | D | E | F | G | H | I | J | K | L | M | |
|---|---|---|---|---|---|---|---|---|---|---|---|---|---|
| 47 | UPSTREAM | | | | | | | | | | | | |
| 48 | | | Conditions | UseCase 1 | | | Conditions | UseCase 2 | | | Conditions | UseCase 3 | |
| 49 | | | BW (MHz) | 37 | | | BW (MHz) | 80 | | | BW (MHz) | 192 | |
| 50 | | | Guardband | 0 | | | Guardband | 0 | | | Guardband | 2 | |
| 51 | | | Subc. Spac. | 25 | | | Subc. Spac. | 50 | | | Subc. Spac. | 50 | |
| 52 | | | Avg b/symb | 6 | | | Avg b/symb | 8 | | | Avg b/symb | 11 | |
| 53 | | | Excluded Band | 12.8 | | | Excluded Band | 12.8 | | | Excluded Band | 0 | |
| 54 | | | Strong NBIs | 18 | | | Strong NBIs | 12 | | | Strong NBIs | 6 | |
| 55 | | | Excluded Subc. | =3*E54 | | | Excluded Subc. | =2*I54 | | | Excluded Subc. | =2*M54 | |
| 56 | | | # of Gaps | 12 | | | # of Gaps | 10 | | | # of Gaps | 5 | |
| 57 | | | Minislot Packing Overhead | =4*E54 | | | Minislot Packing Overhead | =4*I54 | | | Minislot Packing Overhead | =4*M54 | |
| 58 | | | | | | | | | | | | | |
| 59 | | | CP (us) | 3.75 | | | CP (us) | 2.5 | | | CP (us) | 1.25 | |
| 60 | | | Pilot Structure | 3 | | | Pilot Structure | 2 | | | Pilot Structure | 5 | |
| 61 | | | | | | | | | | | | | |
| 62 | | | Subcarriers (Q) | 8 | | | Subcarriers (Q) | 8 | | | Subcarriers (Q) | 8 | |
| 63 | | | Symbols (K) | 16 | | | Symbols (K) | 16 | | | Symbols (K) | 16 | |
| 64 | | | | | | | | | | | | | |
| 65 | | | Time Overhead | 8.57 | | | Time Overhead | 11.11 | | | Time Overhead | 5.88 | |
| 66 | | | Legacy,Excl Subc,Grd Bnd | =(100*566/1480)*0.9143 | | | Legacy,Excl Subc,Grd Bnd | =(100*280/1600)*0.8889 | | | Legacy,Excl Subc,Grd Bnd | =(100*52/3840)*0.9412 | |
| 67 | | | Minislot Packing | =(100*48/1480)*0.9143 | | | Minislot Packing | =(100*40/1600)*0.8889 | | | Minislot Packing | =(100*20/3840)*0.9412 | |
| 68 | | | Pilot Structure Overhead | =(100*66/1480)*0.9143 | | | Pilot Structure Overhead | =(100*54/1600)*0.8889 | | | Pilot Structure Overhead | =(100*40/1600)*0.9412 | |
| 69 | | | FEC | =(100*112/1480)*0.9143 | | | FEC | =(100*166/1600)*0.8889 | | | FEC | =(100*514/3840)*0.9412 | |
| 70 | | | PHY Payload | =100-SUM(E65:E69) | | | PHY Payload | =100-SUM(I65:I69) | | | PHY Payload | =100-SUM(M65:M69) | |
| 71 | | | | | | | | | | | | | |
| 72 | | | Overall PHY Efficiency | =6*E70/100 | b/s/Hz | | Overall PHY Efficiency | =8*I70/100 | b/s/Hz | | Overall PHY Efficiency | =11*M70/100 | b/s/Hz |
| 73 | | | Capacity | =E72*E49 | Mbps | | Capacity | =I72*I49 | Mbps | | Capacity | =M72*M49 | Mbps |

FIG. 37B

DOCSIS 3.1 DS Efficiency

| | |
|---|---|
| Color | Input |
| Coding | Output |

| | Sampling Rate (Hz) | Sampling Period (ns) | FFT Points | Sub Carrier Spacing (KHz) | Net Symbol Period (us) | Cyclic Prefix 512 | Window 128 | Act Symbol Period (us) | Symbol Efficiencies |
|---|---|---|---|---|---|---|---|---|---|
| Downstream | 2.048E+08 | 4.88 | 4096 | 50 | 20.00 | 2.50 | 0.63 | 22.50 | |

| | LDPC FEC | | | Codeword | LDPC Parity | BCH Parity | Info |
|---|---|---|---|---|---|---|---|
| DS | 88.9% | Bits | Long | 16200 | 1800 | 168 | 14232 |
| | | Bytes | | 2025 | 225 | 21 | 1779 |

| | | |
|---|---|---|
| Cont. Pilots | Act BW>48 | every 128 |
| | Act BW<=8 | every 64 |
| Scat. Pilots | if 25 KHz | every 128 subc |
| | if 50 KHz | every 128 subc |

Downstream

| | | | | |
|---|---|---|---|---|
| | | | 50 | KHz |
| Lower Modulated Band Edge | 678 | MHz | | |
| Upper Modulated Band Edge | 774 | MHz | Excluded | |
| GuardBand | 2 | MHz | Band in MHz | Due to |
| Excluded Band | 0 | MHz | 0 | interference |
| Number of FFT Blocks | 1 | | 0 | Legacy |
| | | | | Unused |
| Modulated Subcarriers | 1880 | | | |
| Effective Occupied Spectrum | 94.00 | MHz | | |
| Effective bits/symbol | 12.00 | | Selected Profile = | 1 |
| Excluded Subcarriers | 0 | (1 MHz = 40 subc @ 25KHz) | | |
| # of PLC Subcarriers | 8 | (8 or 16) | | |
| Continuous Pilots o'head in eff Subc | 33 | Pilot Density (48 ≤ M ≤ 120) = | 48 | |
| Scattered Pilots o'head in eff Subc | 15 | | | |
| Eff Data Subcarriers | 1824 | | | |

1 profile transmitted in one symbol

| | | | | |
|---|---|---|---|---|
| # of bits in data subcarriers | 21888 | bits/symbol | Not 40 | us |
| # of full codewords per symbol | 1 | | | |
| NCP o'head bits | 48 | bits/codeword | | |
| Subcarriers per NCP message (assuming 64QAM) | 8 | subcarriers | | |
| 1st Estimate Total NCP subcarriers | 16 | Shortened codeword not yet considered | | |
| # of bits in data subc. after 1st Estimate of NCP subc. | 21696 | | | |
| 1st estimate of # of bits for shortened codeword | 5496 | | | |
| 1st estimate information bits in shortened codeword | 3528 | | | |
| | | Shortened codeword considered | | |
| # of bits in data subc. after final Estimate of NCP subc. | 21600 | | 3 | NCP msgs |
| Final estimate of # of bits for shortened codeword | 5400 | | | |
| Final estimate information bits in shortened codeword | 3432 | | | |
| Zero bit loaded filler subc. | 0 | | | |
| Information bits in full codewords | 14232 | | | |
| Total data bits | 17664 | bits | | |
| Effective symbol duration | 22.5000 | us | | |
| Rate in 192 MHz | 0.78506667 | Gbps | | |
| DS PHY Efficiency | 8.18 | b/sec/Hz | | |

NOT INCLUDED
MAP Overhead
Ranging
Administration Traffic
Access-Polling Contention

FIG. 38

| | B | C | D | E | F | G | H | I | J | K | L | M |
|---|---|---|---|---|---|---|---|---|---|---|---|---|
| 1 | | | | | | | | | From Downstream Profile Descriptor Message/ OFI | | | |
| 2 | Subcarrier Spacing | | 0.025 | MHz | | | | Physical Link Channel | | Lower Edge Subc. Freq | 330 | |
| 3 | Lower Freq Edge Block 1 | | 300 | MHz | | | | | | Excluded Subcarriers | List in Col 'O' | |
| 4 | Upper Freq Edge Block 1 | | 492 | MHz | | | | | | # of PLC Subcarriers | 16 | |
| 5 | | | <1 GHz | 1-1.2 GHz | | | | | | Cont Pilots Subcarriers | List in Col 'O' | |
| 6 | Modulation | Bit Loading | SNR (dB) | SNR (dB) | Profile 1 | Profile 2 | Profile 3 | Profile 4 | | Exclusion Bands | Lower Edge | Upper Edge |
| 7 | BPSK | 1 | 6 | 6 | 0 | 0 | 0 | 0 | | Band 1 | 777 | 787 |
| 8 | QPSK | 2 | 9 | 9 | 0 | 0 | 0 | 0 | | Band 2 | 706 | 716 |
| 9 | 8QAM | 3 | 12 | 12 | 0 | 0 | 0 | 0 | | Band 3 | 746 | 756 |
| 10 | 16QAM | 4 | 15 | 15 | 0 | 0 | 0 | 0 | | Band 4 | 736 | 736 |
| 11 | 32QAM | 5 | 18 | 18 | 0 | 0 | 0 | 0 | | Band 5 | 819 | 824 |
| 12 | 64QAM | 6 | 21 | 21 | 0 | 0 | 0 | 0 | | Band 6 | 864 | 869 |
| 13 | 128QAM | 7 | 24 | 24 | 0 | 0 | 0 | 0 | | PLC Band | 330.000 | 330.375 |
| 14 | 256QAM | 8 | 27 | 27 | 0 | 0 | 0 | 0 | | | | |
| 15 | 512QAM | 9 | 30.5 | 30.5 | 3785 | 0 | 0 | 0 | | | LTE Frequencies | |
| 16 | 1024QAM | 10 | 34 | 34 | 3828 | 3785 | 0 | 0 | | VZ-UL | 777 | 787 |
| 17 | 2048QAM | 11 | 37 | 37.5 | 0 | 3828 | 7613 | 3785 | | VZ-DL | 746 | 756 |
| 18 | 4096QAM | 12 | 41 | 41.5 | 0 | 0 | 0 | 3828 | | ATT-UL | 704 | 716 |
| 19 | 8192QAM | 13 | 44 | 44 | 0 | 0 | 0 | 0 | | ATT-DL | 734 | 736 |
| 20 | 16384QAM | 14 | 48 | 48 | 0 | 0 | 0 | 0 | | SP-UL | 819 | 824 |
| 21 | | | Total Active Subc | | 7613 | 7613 | 7613 | 7613 | | SP-DL | 864 | 869 |
| 22 | | | Effective SNR | | 32.6 | 35.8 | 37 | | | | | |

FIG. 39A

| | A | B | C | D | E | F | G | H | I |
|---|---|---|---|---|---|---|---|---|---|
| 24 | | | | | | RxMER | RxMER | RxMER | RxMER |
| 25 | | FFT Block 1 | Subcarrier | Exclusion | Excluded | Profile 1 | Profile 2 | Profile 3 | Profile 4 |
| 26 | | Subcarrier | Frequency | Bands & | Subcarriers | 9 | 10 | 11 | 11 |
| 27 | | Index | MHz | PLC | & Cont. Pilots | 10 | 11 | 11 | 12 |
| 28 | | 0 | 300 | 1 | 0 | 0 | 0 | 0 | 0 |
| 29 | | 1 | 300.025 | 1 | 1 | 10 | 11 | 11 | 12 |
| 30 | | 2 | 300.05 | 1 | 1 | 9 | 10 | 11 | 11 |
| 31 | | 3 | 300.075 | 1 | 1 | 10 | 11 | 11 | 12 |
| 32 | | 4 | 300.1 | 1 | 1 | 9 | 10 | 11 | 11 |
| 33 | | 5 | 300.125 | 1 | 1 | 10 | 11 | 11 | 12 |
| 34 | | 6 | 300.15 | 1 | 1 | 9 | 10 | 11 | 11 |
| 35 | | 7 | 300.175 | 1 | 1 | 10 | 11 | 11 | 12 |
| 36 | | 8 | 300.2 | 1 | 1 | 9 | 10 | 11 | 11 |
| 37 | | 9 | 300.225 | 1 | 1 | 10 | 11 | 11 | 12 |
| 38 | | 10 | 300.25 | 1 | 1 | 9 | 10 | 11 | 11 |
| 39 | | 11 | 300.275 | 1 | 1 | 10 | 11 | 11 | 12 |
| 40 | | 12 | 300.3 | 1 | 1 | 9 | 10 | 11 | 11 |

| | B | C | D |
|---|---|---|---|
| 23 | | | |
| 24 | | | |
| 25 | FFT Block 1 | Subcarrier | Exclusion |
| 26 | Subcarrier | Frequency | Bands & |
| 27 | Index | MHz | PLC |
| 28 | 0 | =IF($D$3+(B28)*$D$2>$D$4,0,$D$3+(B28)*$D$2) | =(IF(C28>0,1,0))*(IF(AND(C28<=$M$7,C28>=$L$7),0,IF(AND(C28<=$M$8,C28>=$L$8),0,IF(AND(C28<=$M$9,C28>=$L$9),0,IF(AND(C28<=$M$10,C28>=$L$10),0,IF(AND(C28<=$M$11,C28>=$L$11),0,IF(AND(C28<=$M$12,C28>=$L$12),0,IF(AND(C28<=$M$13,C28>=$L$13),0,1)))))))) |
| 29 | =B28+1 | =IF($D$3+(B29)*$D$2>$D$4,0,$D$3+(B29)*$D$2) | =(IF(C29>0,1,0))*(IF(AND(C29<=$M$7,C29>=$L$7),0,IF(AND(C29<=$M$8,C29>=$L$8),0,IF(AND(C29<=$M$9,C29>=$L$9),0,IF(AND(C29<=$M$10,C29>=$L$10),0,IF(AND(C29<=$M$11,C29>=$L$11),0,IF(AND(C29<=$M$12,C29>=$L$12),0,IF(AND(C29<=$M$13,C29>=$L$13),0,1)))))))) |
| 30 | =B29+1 | =IF($D$3+(B30)*$D$2>$D$4,0,$D$3+(B30)*$D$2) | =(IF(C30>0,1,0))*(IF(AND(C30<=$M$7,C30>=$L$7),0,IF(AND(C30<=$M$8,C30>=$L$8),0,IF(AND(C30<=$M$9,C30>=$L$9),0,IF(AND(C30<=$M$10,C30>=$L$10),0,IF(AND(C30<=$M$11,C30>=$L$11),0,IF(AND(C30<=$M$12,C30>=$L$12),0,IF(AND(C30<=$M$13,C30>=$L$13),0,1)))))))) |
| 31 | =B30+1 | =IF($D$3+(B31)*$D$2>$D$4,0,$D$3+(B31)*$D$2) | =(IF(C31>0,1,0))*(IF(AND(C31<=$M$7,C31>=$L$7),0,IF(AND(C31<=$M$8,C31>=$L$8),0,IF(AND(C31<=$M$9,C31>=$L$9),0,IF(AND(C31<=$M$10,C31>=$L$10),0,IF(AND(C31<=$M$11,C31>=$L$11),0,IF(AND(C31<=$M$12,C31>=$L$12),0,IF(AND(C31<=$M$13,C31>=$L$13),0,1)))))))) |
| 32 | =B31+1 | =IF($D$3+(B32)*$D$2>$D$4,0,$D$3+(B32)*$D$2) | =(IF(C32>0,1,0))*(IF(AND(C32<=$M$7,C32>=$L$7),0,IF(AND(C32<=$M$8,C32>=$L$8),0,IF(AND(C32<=$M$9,C32>=$L$9),0,IF(AND(C32<=$M$10,C32>=$L$10),0,IF(AND(C32<=$M$11,C32>=$L$11),0,IF(AND(C32<=$M$12,C32>=$L$12),0,IF(AND(C32<=$M$13,C32>=$L$13),0,1)))))))) |

| | E | F | G | H | I |
|---|---|---|---|---|---|
| 23 | | | | | |
| 24 | | RxMER | RxMER | RxMER | RxMER |
| 25 | Excluded | Profile 1 | Profile 2 | Profile 3 | Profile 4 |
| 26 | Subcarriers | 9 | 10 | 11 | 11 |
| 27 | & Cont. Pilots | 10 | 11 | 11 | 12 |
| 28 | =1-(COUNTIF(O$7:O$107,C28)) | =$F$26*D28*E28 | =$G$26*D28*E28 | =$H$26*D28*E28 | =$I$26*D28*E28 |
| 29 | =1-(COUNTIF(O$7:O$107,C29)) | =$F$27*D29*E29 | =$G$27*D29*E29 | =$H$27*D29*E29 | =$I$27*D29*E29 |
| 30 | =1-(COUNTIF(O$7:O$107,C30)) | =$F$26*D30*E30 | =$G$26*D30*E30 | =$H$26*D30*E30 | =$I$26*D30*E30 |
| 31 | =1-(COUNTIF(O$7:O$107,C31)) | =$F$27*D31*E31 | =$G$27*D31*E31 | =$H$27*D31*E31 | =$I$27*D31*E31 |
| 32 | =1-(COUNTIF(O$7:O$107,C32)) | =$F$26*D32*E32 | =$G$26*D32*E32 | =$H$26*D32*E32 | =$I$26*D32*E32 |

FIG. 39D

| | N | O | P |
|---|---|---|---|
| 4 | | **Excluded Subc.** | |
| 5 | | **Frequencies** | |
| 6 | | **& Cont Pilots** | |
| 7 | Lower Edge Pilot | 300.000 | |
| 8 | Upper Edge Pilot | 492.000 | |
| 9 | PLC 6 MHz Pilot | 327.650 | -d4 |
| 10 | PLC 6 MHz Pilot | 328.250 | -d3 |
| 11 | PLC 6 MHz Pilot | 328.800 | -d2 |
| 12 | PLC 6 MHz Pilot | 329.250 | -d1 |
| 13 | PLC 6 MHz Pilot | 331.125 | +d1 |
| 14 | PLC 6 MHz Pilot | 331.575 | +d2 |
| 15 | PLC 6 MHz Pilot | 332.125 | +d3 |
| 16 | PLC 6 MHz Pilot | 332.725 | +d4 |
| 17 | Std Cont Pilot | 303.200 | |
| 18 | Std Cont Pilot | 306.400 | |
| 19 | Std Cont Pilot | 309.600 | |
| 20 | Std Cont Pilot | 312.800 | |
| 21 | Std Cont Pilot | 316.000 | |
| 22 | Std Cont Pilot | 319.200 | |
| 23 | Std Cont Pilot | 322.400 | |
| 24 | Std Cont Pilot | 325.600 | |
| 25 | Std Cont Pilot | 328.800 | |
| 26 | Std Cont Pilot | 332.000 | |
| 27 | Std Cont Pilot | 335.200 | |
| 28 | Std Cont Pilot | 338.400 | |
| 29 | | 341.600 | |
| 30 | | 344.800 | |
| 31 | | 348.000 | |
| 32 | | 351.200 | |
| 33 | | 354.400 | |
| 34 | | 357.600 | |
| 35 | | 360.800 | |
| 36 | | 364.000 | |
| 37 | | 367.200 | |
| 38 | | 370.400 | |
| 39 | | 373.600 | |

| | N | O | P |
|---|---|---|---|
| 4 | | **Excluded Subc.** | |
| 5 | | **Frequencies** | |
| 6 | | **& Cont Pilots** | |
| 7 | Lower Edge Pilot | =D3 | |
| 8 | Upper Edge Pilot | =D4 | |
| 9 | PLC 6 MHz Pilot | =IF(D2=0.025,L2-U3*D2,L2-U6*D2) | -d4 |
| 10 | PLC 6 MHz Pilot | =IF(D2=0.025,L2-U2*D2,L2-U5*D2) | -d3 |
| 11 | PLC 6 MHz Pilot | =IF(D2=0.025,L2-S3*D2,L2-S6*D2) | -d2 |
| 12 | PLC 6 MHz Pilot | =IF(D2=0.025,L2-S2*D2,L2-S5*D2) | -d1 |
| 13 | PLC 6 MHz Pilot | =IF(D2=0.025,M13+S2*D2,M13+S5*D2) | +d1 |
| 14 | PLC 6 MHz Pilot | =IF(D2=0.025,M13+S3*D2,M13+S6*D2) | +d2 |
| 15 | PLC 6 MHz Pilot | =IF(D2=0.025,M13+U2*D2,M13+U5*D2) | +d3 |
| 16 | PLC 6 MHz Pilot | =IF(D2=0.025,M13+U3*D2,M13+U6*D2) | +d4 |
| 17 | Std Cont Pilot | =O7+128*D2 | |
| 18 | Std Cont Pilot | =O17+128*$D$2 | |
| 19 | Std Cont Pilot | =O18+128*$D$2 | |
| 20 | Std Cont Pilot | =O19+128*$D$2 | |
| 21 | Std Cont Pilot | =O20+128*$D$2 | |
| 22 | Std Cont Pilot | =O21+128*$D$2 | |
| 23 | Std Cont Pilot | =O22+128*$D$2 | |
| 24 | Std Cont Pilot | =O23+128*$D$2 | |
| 25 | Std Cont Pilot | =O24+128*$D$2 | |
| 26 | Std Cont Pilot | =O25+128*$D$2 | |
| 27 | Std Cont Pilot | =O26+128*$D$2 | |
| 28 | Std Cont Pilot | =O27+128*$D$2 | |
| 29 | | =O28+128*$D$2 | |
| 30 | | =O29+128*$D$2 | |
| 31 | | =O30+128*$D$2 | |
| 32 | | =O31+128*$D$2 | |
| 33 | | =O32+128*$D$2 | |
| 34 | | =O33+128*$D$2 | |
| 35 | | =O34+128*$D$2 | |
| 36 | | =O35+128*$D$2 | |
| 37 | | =O36+128*$D$2 | |
| 38 | | =O37+128*$D$2 | |
| 39 | | =O38+128*$D$2 | |

| | Q | R | S | T | U | V |
|---|---|---|---|---|---|---|
| 1 | | | Continuous Pilots in PLC | | | |
| 2 | 8K FFT | d1 | 30 | d3 | 70 | |
| 3 | 25 KHz | d2 | 48 | d4 | 94 | |
| 4 | | | | | | |
| 5 | 4K FFT | d1 | 15 | d3 | 35 | |
| 6 | 50 KHz | d2 | 24 | d4 | 47 | |

FIG. 39G

4K FFT Diagram / 50 KHz

8K FFT Diagram / 25 KHz Alternating Pilots

DIMENSIONING APPROACH FOR DATA NETWORKS

BACKGROUND

Cable data networks have evolved throughout the years to the current fairly complex system that DOCSIS 3.1 represents. The DOCSIS 3.1 multicarrier system has a variety of sources of overhead that have to be taken into account when estimating capacity. The introduction of profiles has introduced a new layer of complexity as each profile, depending on its traffic characteristics and the channel conditions of its related end-devices, will have its own efficiency estimate. The determination of resources consumed allows cable operators to determine how to best assign spectrum, network device ports and how to configure the network devices to meet desired performance levels for their subscribers. It is also a tool for operators to determine the appropriate time to upgrade and purchase equipment as the demand for capacity continues to grow.

SUMMARY OF THE INVENTION

A network dimensioning algorithm for networks, such as that included in DOCSIS 3.1, is described. The algorithm combines per profile traffic characteristics, available bandwidth, legacy coexistence and detail overhead contributions of cyclic prefix, pilots, excluded subcarriers, FEC and bit loading, among other parameters.

The present dimensioning approach to data network systems and methods may be implemented externally to the cable modem terminal system (CMTS) and the cable modem (CM) for purposes of collecting data therefrom. In addition, the present system and method may also collect data regarding traffic through the CMTS and CM. The collected data is utilized according to the instructions presented here for the calculation of capacity and efficiency, which may then be used to select the appropriate transmission patterns, and thereby the best balance of efficiency and robustness for a given network path.

In an embodiment, in addition to the collection of CMTS configuration parameters that rely on the CMTS's internal algorithms, the present dimensioning system may also externally optimize the CMTS data based on traffic and channel conditions and then communicate the results back to the CMTS. Based at least in part on the results, the upstream algorithm assesses whether greater efficiencies may be gained by utilizing a lower modulation order body minislot and transmitting through the impairment or by skipping over the impairment and beginning the transmission of an edge minislot.

In an example of a downstream embodiment, a similar process to that described above in the upstream embodiments may be used. For example, in the case of a wideband interferer, like LTE ingress, carriers are not automatically excluded. Instead, an ingress level and the OFDM signal level per profile assessment is made to determine the use of FEC and frequency interleaving to overcome, rather than avoid, the wideband interference.

BRIEF DESCRIPTION OF THE FIGURES

FIGS. 13-17, which show an exemplary upstream FEC efficiency Calculator, should be viewed together.

FIG. 13 is one exemplary table showing results for an upstream FEC Efficiency Calculator, in an embodiment.

FIG. 14 shows formulas utilized in the table of FIG. 13 for the upstream FEC Efficiency Calculator, in an embodiment.

FIG. 15 is one exemplary table showing results for an upstream FEC Efficiency Calculator, in an embodiment.

FIG. 16 shows formulas utilized in the table of FIG. 15 for the upstream FEC Efficiency Calculator, in an embodiment FIG. 17 is a graph illustrating an Upstream Efficiency vs. Information size in bytes as determined by the upstream FEC efficiency calculator of FIGS. 13-16, in an embodiment.

FIGS. 19-25E, which show an exemplary DOCSIS 3.1 upstream efficiency calculator, are best viewed together.

FIG. 19 shows field data and references used in a DOCSIS 3.1 efficiency calculator, in an embodiment.

FIGS. 20A-25E are aspects of the DOCSIS 3.1 upstream efficiency calculator.

FIGS. 26-30 are best viewed together.

FIG. 26 shows aspects of the DOCSIS 3.1 upstream efficiency calculator of FIGS. 19-25E shown in detail, in an embodiment.

FIGS. 27-30 are aspects of the DOCSIS 3.1 upstream efficiency calculator of FIG. 26 shown in detail.

FIGS. 31-35 are best viewed together.

FIGS. 31-33C are a plurality of upstream use cases showing results of the of applied algorithms, in an embodiment.

FIG. 33D shows a mixing calculator, the formulas of which are shown in FIG. 35, which calculates transmission rates for each of the 4*a*-6*b*+ cases for mixing of DOCSIS 3.1 and 3.0 systems at a 5% mixing penalty.

FIG. 34 shows use cases 1, 4*a* and 4*a*+ of FIG. 31 with results replaced by formulas that produce those results, in an embodiment.

FIG. 35 shows an aspect of FIG. 33D with results replaced by formulas that produce those results, in an embodiment.

FIGS. 36A-B show downstream use cases, with results (FIG. 36A) and formulas (FIG. 36B) that produce those results.

FIGS. 37A-B show upstream use cases, with results (FIG. 37A) and formulas (FIG. 37B) that produce those results.

FIG. 38 is a portion of a DOCSIS 3.1 downstream efficiency calculator showing results of calculations, in an embodiment.

FIGS. 39A-J are best viewed together.

FIGS. 39A-G show aspects of a downstream bit loading, pilots, and exclusions calculator in detail showing formulas and results produced by those formulas.

FIG. 39H is a 4K FFT Diagram at a subcarrier spacing of 50 KHz, in an embodiment.

FIG. 39I is an 8K FFT Diagram at a subcarrier spacing of 25 KHz, in an embodiment.

FIG. 39J is an 8K FFT Diagram at a subcarrier spacing of 25 KHz with alternating pilots, in an embodiment.

DETAILED DESCRIPTION OF THE FIGURES

Cable data networks have evolved throughout the years to their current level of complexity, as described in the DOCSIS 3.1 implementation. This multicarrier data network system has a plurality of overhead sources that must to be taken into account when calculating system capacity. Adding profiles has introduced an extra layer of complexity due to the fact that efficiency estimates are profile dependent. That is, each profile depends on at least data traffic characteristics and end-device channel conditions. A diagram showing some general dependencies that may be taken into account is shown in FIG. 1.

Figure 1:
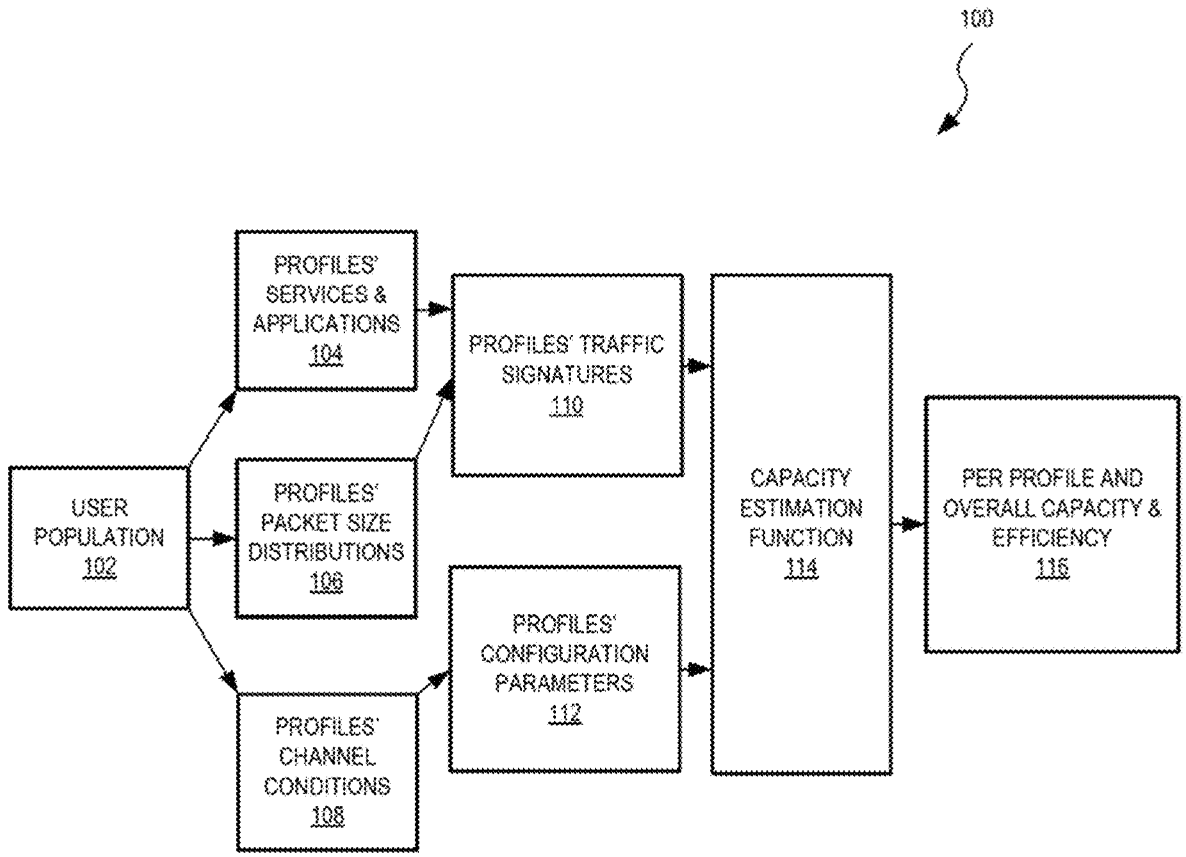
FIG. 1 is a block diagram illustrating one exemplary structure of a profile and overall capacity and efficiency calculator, in an embodiment.

FIG. 1 shows some of the general parametric dependencies for dimensioning a DOCSIS 3.1 network. A more detailed description of the network dimensioning process in the downstream and upstream directions may be calculated by modeling, for example, user traffic characteristics and conditions that exist on network channels. These details are expanded on in the following description and associated figures.

FIG. 1 shows the basic structure of a profile and overall capacity and efficiency calculator 100 in an embodiment. System 100 includes a user population 102, which influences profiles' services and applications 104, profiles' packet size distributions 106, and profiles' channel conditions 108. Profiles' services and applications 104 and packet size distribution 106 influence profiles' traffic signatures 110. Profiles' channel conditions 108 influence profiles' configuration parameters 112. Profiles' traffic signatures 110 and profiles' configuration parameters 112 together are inputs into a capacity estimation function 114, which in turn outputs a per profile overall capacity and efficiency 116.

The user population 102 is a group of data service users that as an aggregate has specific transmission characteristics. The user population sharing specific network configuration parameters, channel conditions and traffic characteristics is used to estimate the network resources it consumes.

The services and applications 104 are defined as follows. A service is defined as a two-way data connection to a subscriber that meets specific levels of performance and is associated to certain traffic characteristics. In this context, an application is a specific purpose program that uses a two-way data connection and is also associated with certain traffic characteristics.

The packet size distribution 106 describes the different packet length statistics in bytes or bits of upstream or downstream transmissions. This distribution provides insight on transport efficiency as the overhead of a shorter packet is different than the overhead of a longer packet.

The channel conditions 108 indicate the noise, distortion and other unwanted signal characteristics occupying the different portions of the channel spectrum. The channel conditions provide the necessary information to decide how to use the channel and transmit the desired information carrying signals.

Traffic signatures 110 describe the transmission characteristics using attributes such as number of packets in transmission, packet duration or length (packet size distribution) and period of time of transmission. Traffic signatures can be defined for individual subscriber transmissions, for transmissions related to specific services or applications or by any selection or grouping of subscribers or traffic.

Configuration parameters 112 indicate the operational settings selected by operators or automatically set by the network equipment.

The capacity estimation function 114 estimates the effective capacity available from the network under the conditions assumed and configurations selected. It is a collection of algorithms that use a diversity of inputs such as configuration parameters and traffic signatures to provide the effective capacity.

FIGS. 2-5 show a downstream network dimensioning method 200 utilized in a data network. The present embodiment is described for use in a DOCSIS 3.1 environment, although it will be understood that the present method may be adapted to other data networks without departing from the scope herein. The methods of FIGS. 2-8 are represented in one embodiment by the graphs, spread sheets, and algorithms shown in FIGS. 9-39J.

Step 202 starts method 200, which then moves to step 204.

In step 204, method 200 identifies the legacy use of spectrum and node capacities to determine the total downstream DOCSIS 3.1 occupied spectrum in nodes. Method 200 then moves to step 206.

In step 206, method 200 determines both the unused spectrum and unusable spectrum within the total occupied spectrum of the data network. Method 200 then moves to step 208.

In step 208, method 200 examines the first (or the next) i-th channel, for example, utilizing a downstream FFT function. Method 200 then moves to step 210.

In step 210, method 200 collects PLC data. Method 200 then moves to step 212 where method 200 collects traffic data. Examples of method steps 210 and 212 are shown in detail in FIGS. 3 and 4, respectively. Method 200 then moves to step 214.

In step 214, method 200 utilizes cyclic prefix data and net symbol period data to determine a time efficiency which may be represented, for example, as a percentage. Method 200 then moves to step 216.

In step 216, method 200 determines the modulated bandwidth of the system and stores the upper bound for a number of subcarriers in, for example, a temporary storage variable "S". Method 200 then moves to step 218.

In step 218, method 200 utilizes the occupied bandwidth and guard band or encompassed bandwidth to determine an upper and a lower active sub-carrier frequency. Method 200 then moves to decision step 220.

In decision step 220, method 200 determines if the occupied bandwidth and guard band are available. If step 220 determines that the occupied bandwidth and guard band are available, then method 200 moves to step 222, where method 200 utilizes the occupied BW and guard band or the encompassed bandwidth to determine upper and lower active subcarriers frequencies. Method 200 then moves to the first step of FIG. 5. If it is determined in step 220 that no occupied bandwidth and guard bands are available, then step 220 moves to step 224, where method 200 updates the potential subcarriers variable "S" from the encompassed bandwidth. One example of updating the "S" variable is by performing the calculation:

[((Upper edge active subcarrier frequency)−(lower edge active subcarrier frequency))/subcarrier spacing]

Figure 5:
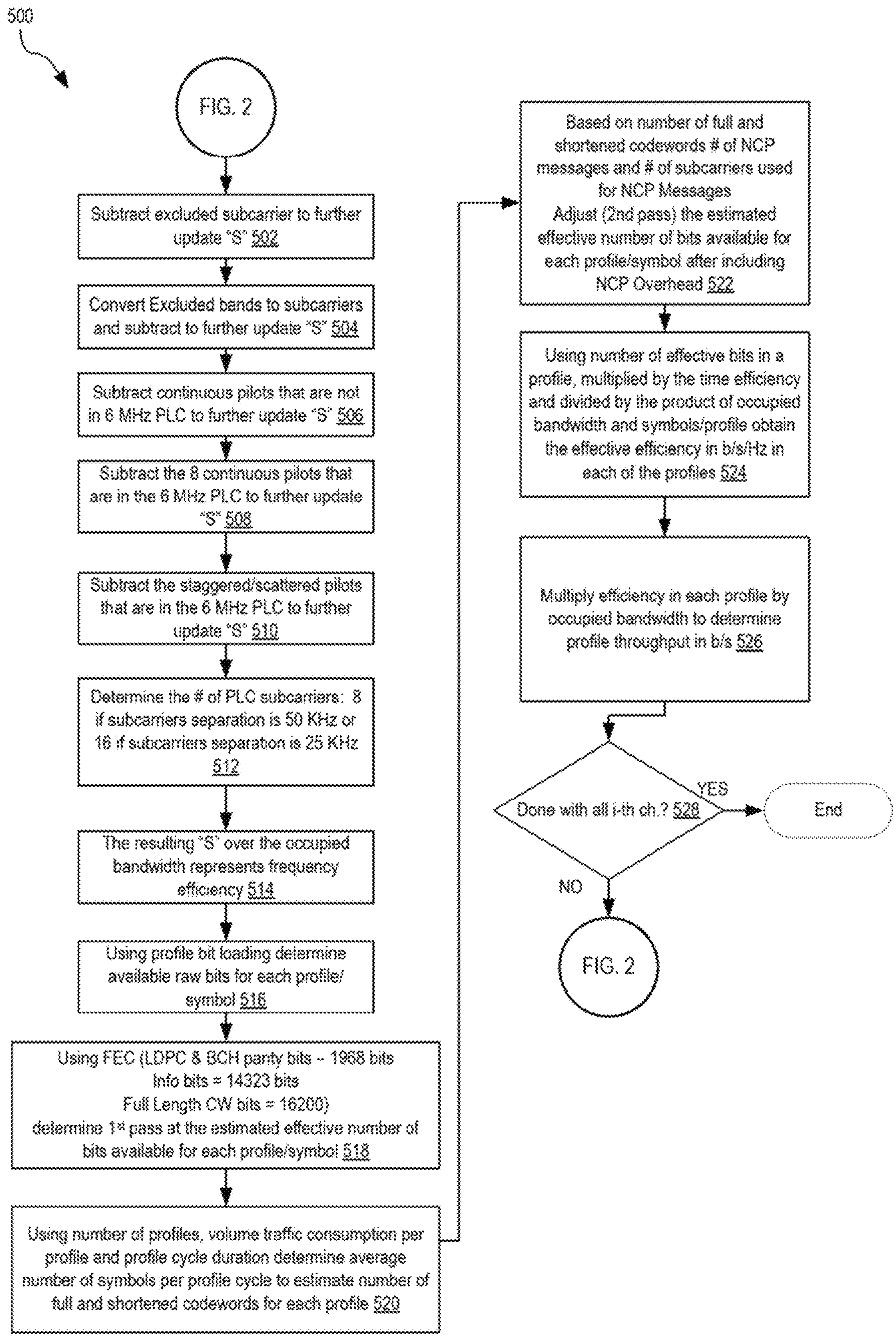
FIG. 5 is a continuation of the method of FIG. 2, in an embodiment.

Method 200 then moves to the first step of FIG. 5.

Figure 2:
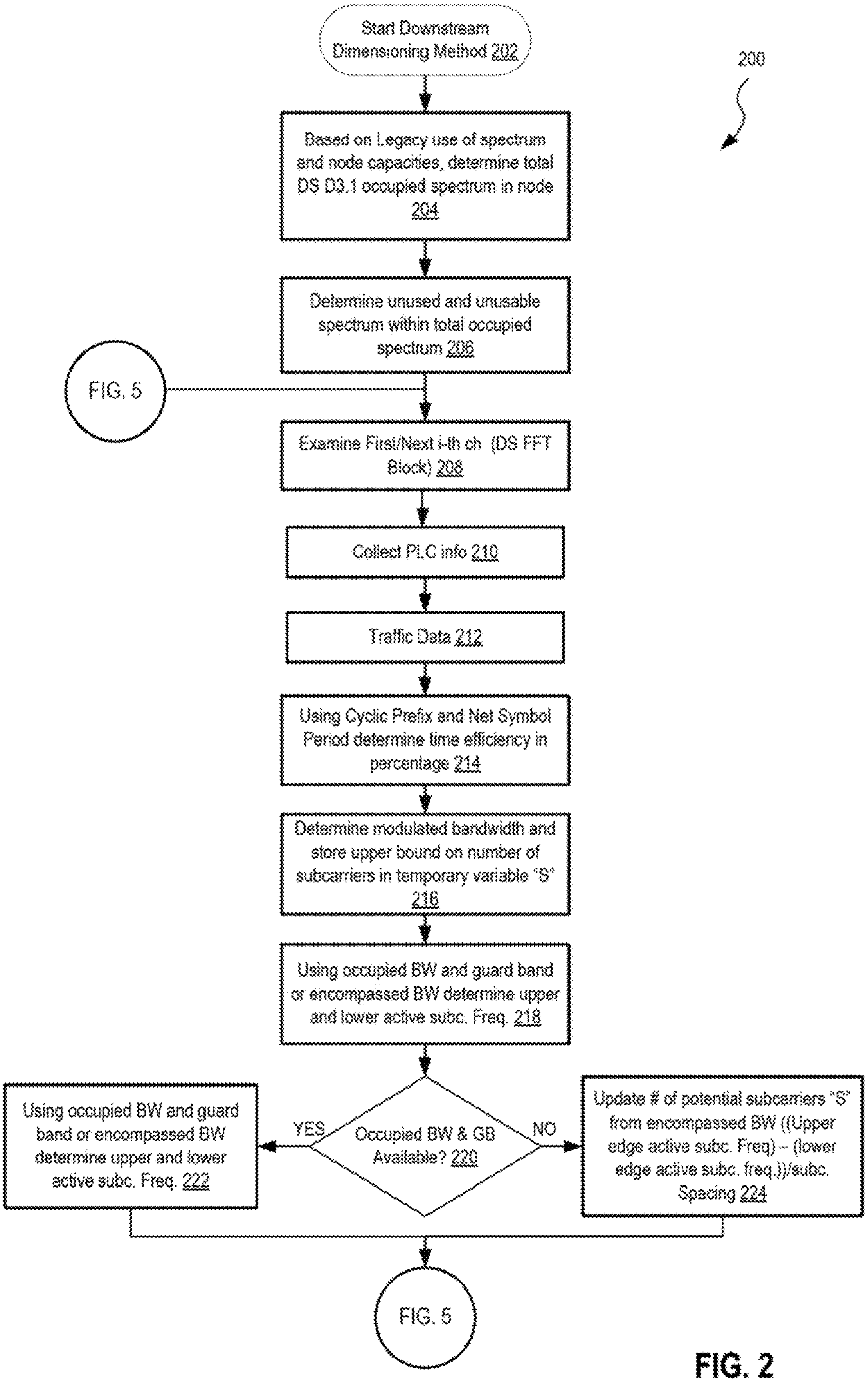
FIG. 2 is a flowchart illustrating one exemplary method for a dimensioning approach for downstream data in a data network, in an embodiment.
Figure 3:
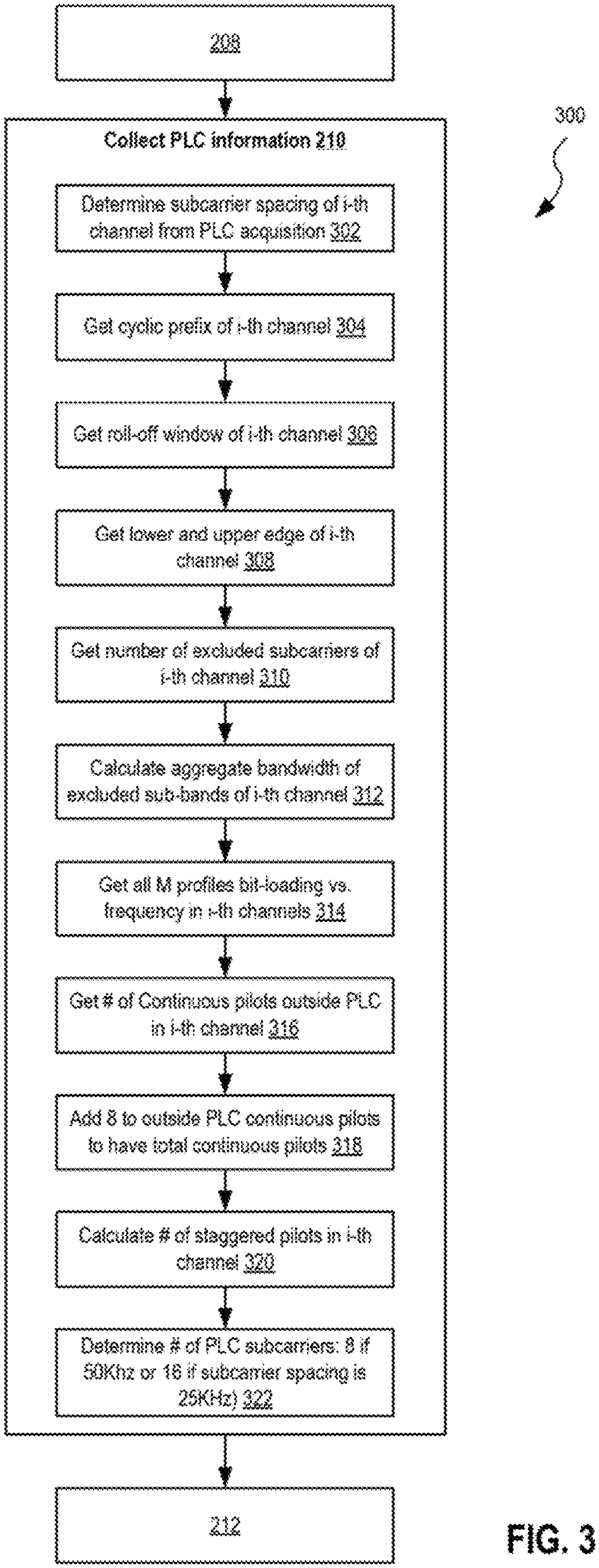
FIG. 3 is one example of a Collect PLC information step from the method of FIG. 2, in an embodiment.

FIG. 3 shows method 300, which is one example of step 210 of FIG. 2, shown in detail. Step 210 is a step of collecting PHY Link Channel (PLC) information. In step 302, method 300 first determines the subcarrier spacing of the i-th channel from PLC acquisition.

In step 304, method 300 retrieves the cyclic prefix of the i-th channel.

In step 306, method 300 determines the roll-off window of the i-th channel.

In step 308, method 300 determines lower and upper edges of the i-th channel.

In step 310, method 300 determines the number of excluded subcarriers of the i-th channel.

In step 312, method 300 calculates the aggregate bandwidth of the excluded sub-bands for the i-th channel.

In step 314, method 300 determines all of the "M" profile's bit-loading vs. frequency for the i-th channel.

In step 316, method 300 retrieves the number of continuous pilots outside of the PLC in the i-th channel.

In step 318, method 300 adds eight (8) to the outside PLC continuous pilots to generate a total number of continuous pilots.

In step 320, method 300 calculates the number of staggered pilots in the i-th channel.

In step 322, method 300 determines the number of PLC subcarriers. The number of PLC subcarriers is 8 for a subcarrier spacing of 50 KHz and is equal to 16 for a subcarrier spacing of 25 KHz.

Method 300 then moves to step 212 of method 200, FIG. 2.

Figure 4:
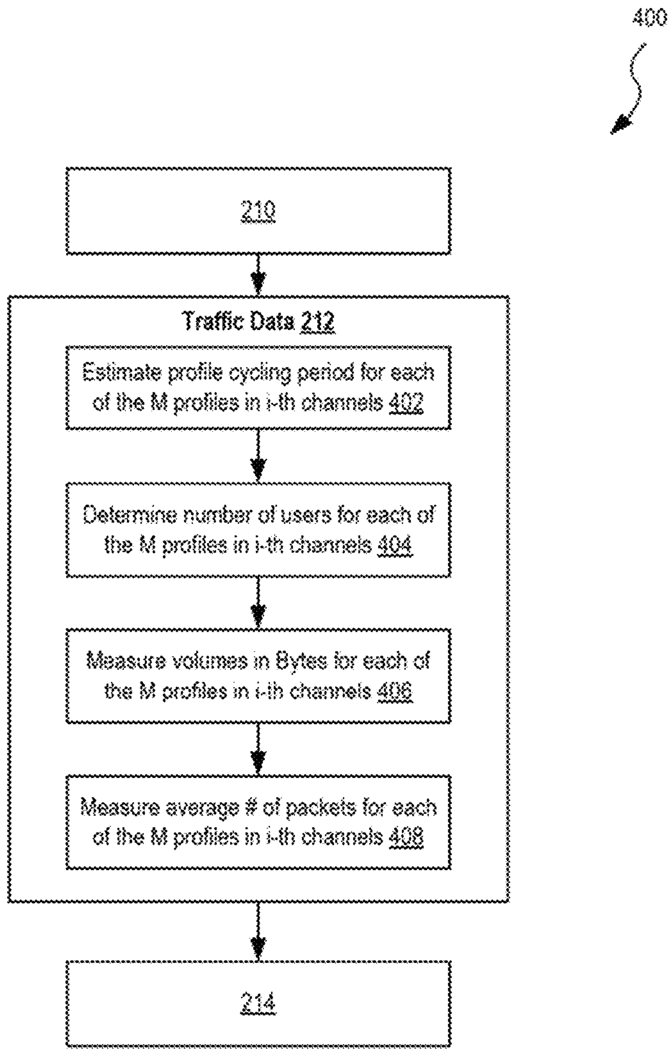
FIG. 4 is one example of a Traffic Data step from the method of FIG. 2, in an embodiment.

FIG. 4 shows method 400, which is one example of step 212 of FIG. 2, shown in detail. Step 212 is a step of collecting network traffic data. In step 402, method 400 estimates a profile cycling period for each of the M profiles in i-th channels.

In step 404, method 400 determines the number of users for each of the M profiles in i-th channels.

In step 406, method 400 measures the volumes in bytes for each of the M profiles in i-th channels.

In step 408, method 400 measures the average number of packets for each of the M profiles in i-th channels. Method 400 then moves to step 214 of method 200, FIG. 2.

FIG. 5 is a continuation of the method of FIG. 2, in an embodiment. Steps 222 or 224 of method 300 move to step 502 of FIG. 5, starting method 500.

In step 502, method 500 subtracts the excluded subcarrier to update the "S" variable.

In step 504, method 500 converts the excluded bands to subcarriers and subtracts them from the "S" variable to further update it.

In step 506, method 500 subtracts the continuous pilots that are not in the 6 MHz PLC from the "S" variable to further update it.

In step 508, method 500 subtracts the 8 continuous pilots that are in the 6 MHz PLC from the "S" variable to further update it.

In step 510, method 500 subtracts the staggered/scattered pilots that are in the 6 MHz PLC from the "S" variable to further update it.

In step 512, method 500 determines the number of PLC subcarriers. The number of PLC subcarriers is 8 for a subcarrier spacing of 50 KHz and is equal to 16 for a subcarrier spacing of 25 KHz.

In step 514, method 500 determines the frequency efficiency by dividing the value stored in the "S" variable by the occupied bandwidth, which results in the frequency efficiency which may be represented, for example, as a percentage.

In step 516, method 500 utilizes the profile bit loading to determine the available raw bits for each profile/symbol.

In step 518, method 500 utilizes the Forward Error Correction (FEC), for example, using LDPC & BCH parity bits: 1968 bits, Info bits=14323 bits, Full Length CW bits=16200, to determine a 1st pass at an estimated effective number of bits available for each profile/symbol.

In step 520, method 500 utilizes the number of profiles, volume traffic consumption per profile, and profile cycle duration to determine the average number of symbols per profile cycle to estimate the number of full and shortened codewords for each profile.

In step 522, method 500, based on number of full and shortened codewords, the number of NCP messages, and the number of subcarriers used for NCP Messages, adjust, in a second pass, the estimated effective number of bits available for each profile/symbol after including NCP Overhead.

In step 524, method 500 utilizes the number of effective bits in a profile, multiplied by the time efficiency and divided by the product of occupied bandwidth and symbols/profile, to obtain the effective efficiency in b/s/Hz in each of the profiles.

In step 526, method 500 multiplies the efficiency in each profile by the occupied bandwidth to determine a profile throughput in b/s.

In step 528, method 500 (and 200) determines if method 500 has completed its process of all i-th channels. If method 500 determines it has not completed the process, method 500 moves to step 208 of FIG. 2, otherwise, method 500 ends.

Figure 6:
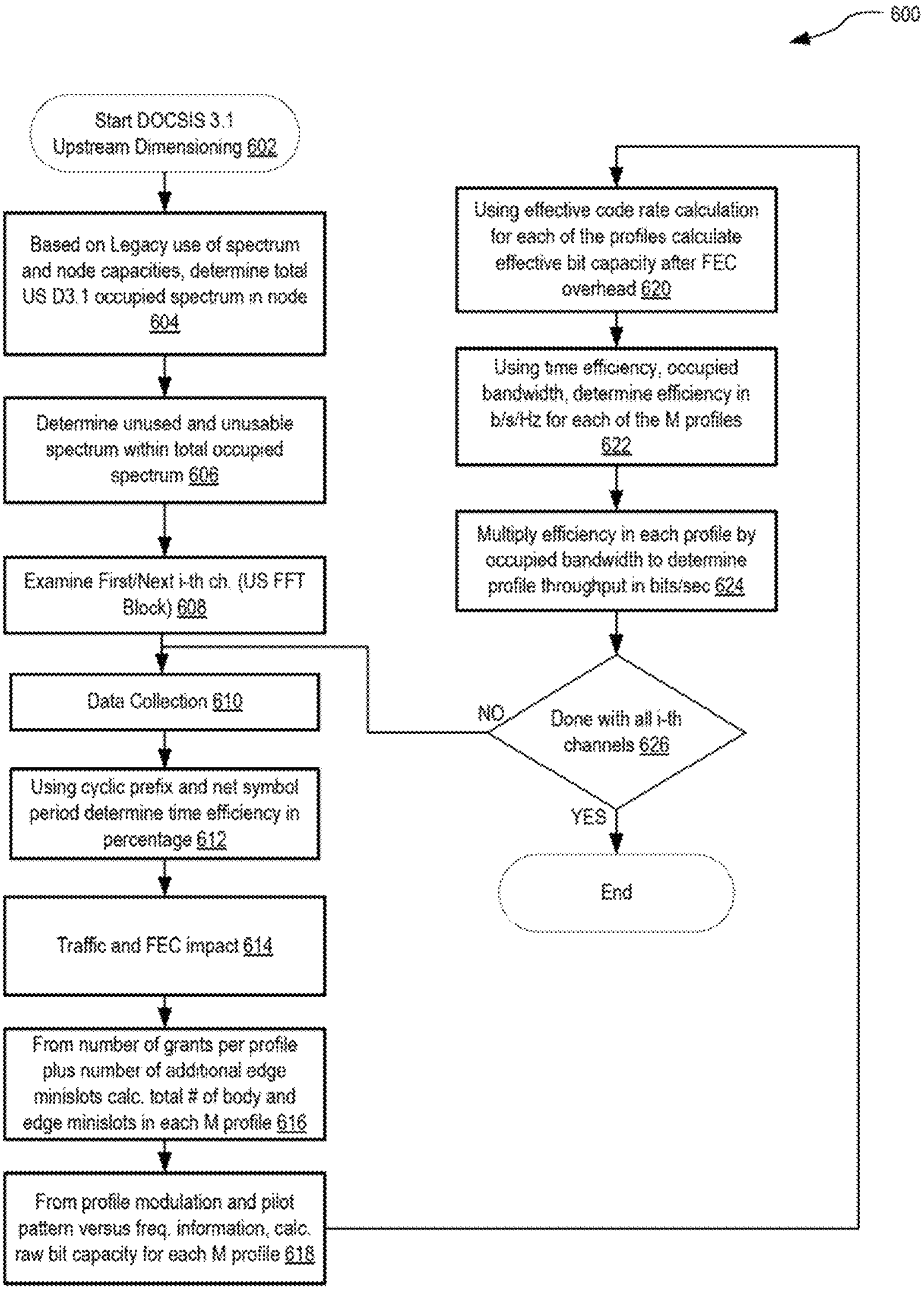
FIG. 6 is a flowchart illustrating one exemplary method for a dimensioning approach for upstream data in a data network, in an embodiment.
Figure 7:
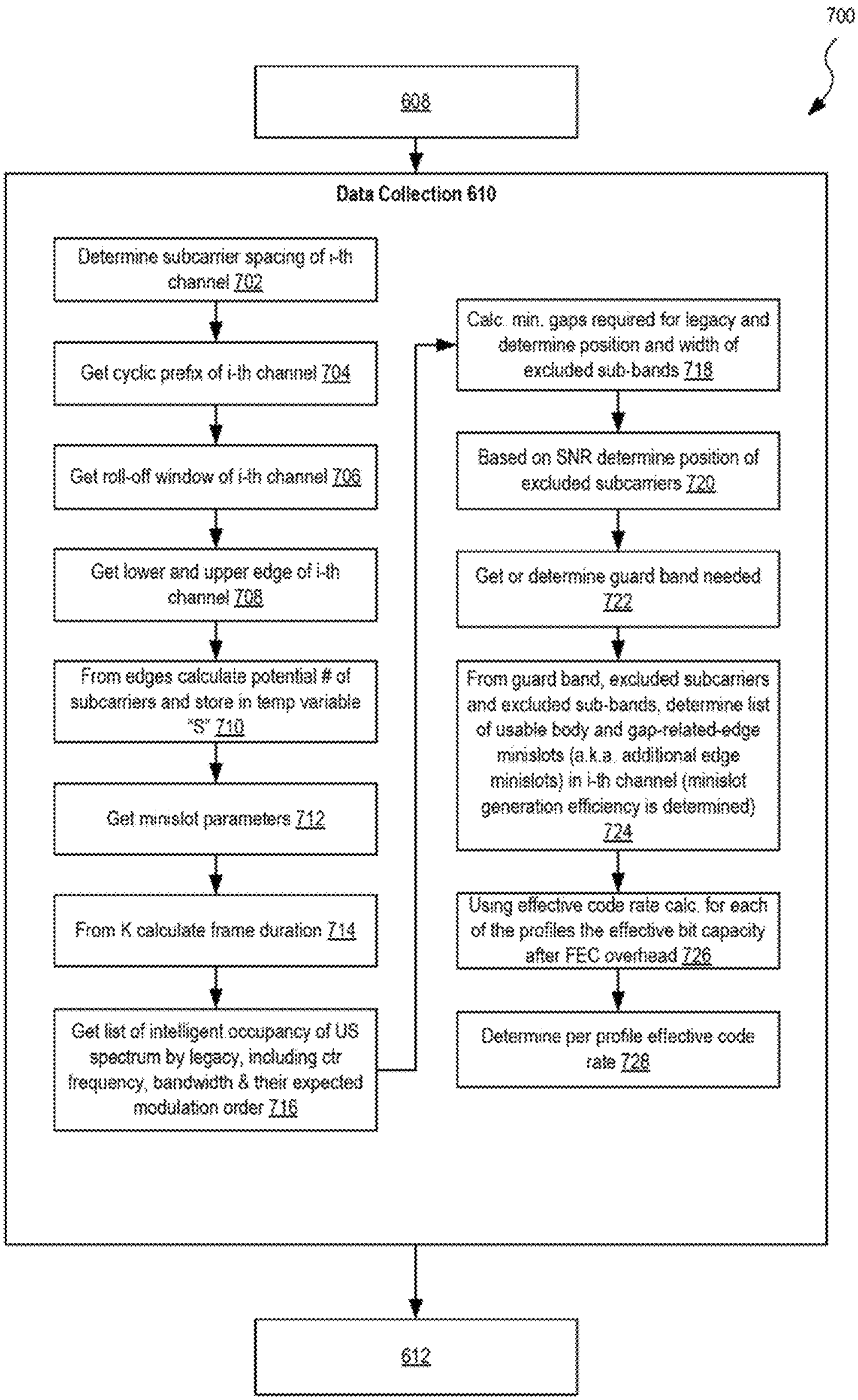
FIG. 7 is one example of a Data Collect step from the method of FIG. 6, in an embodiment.
Figure 8:
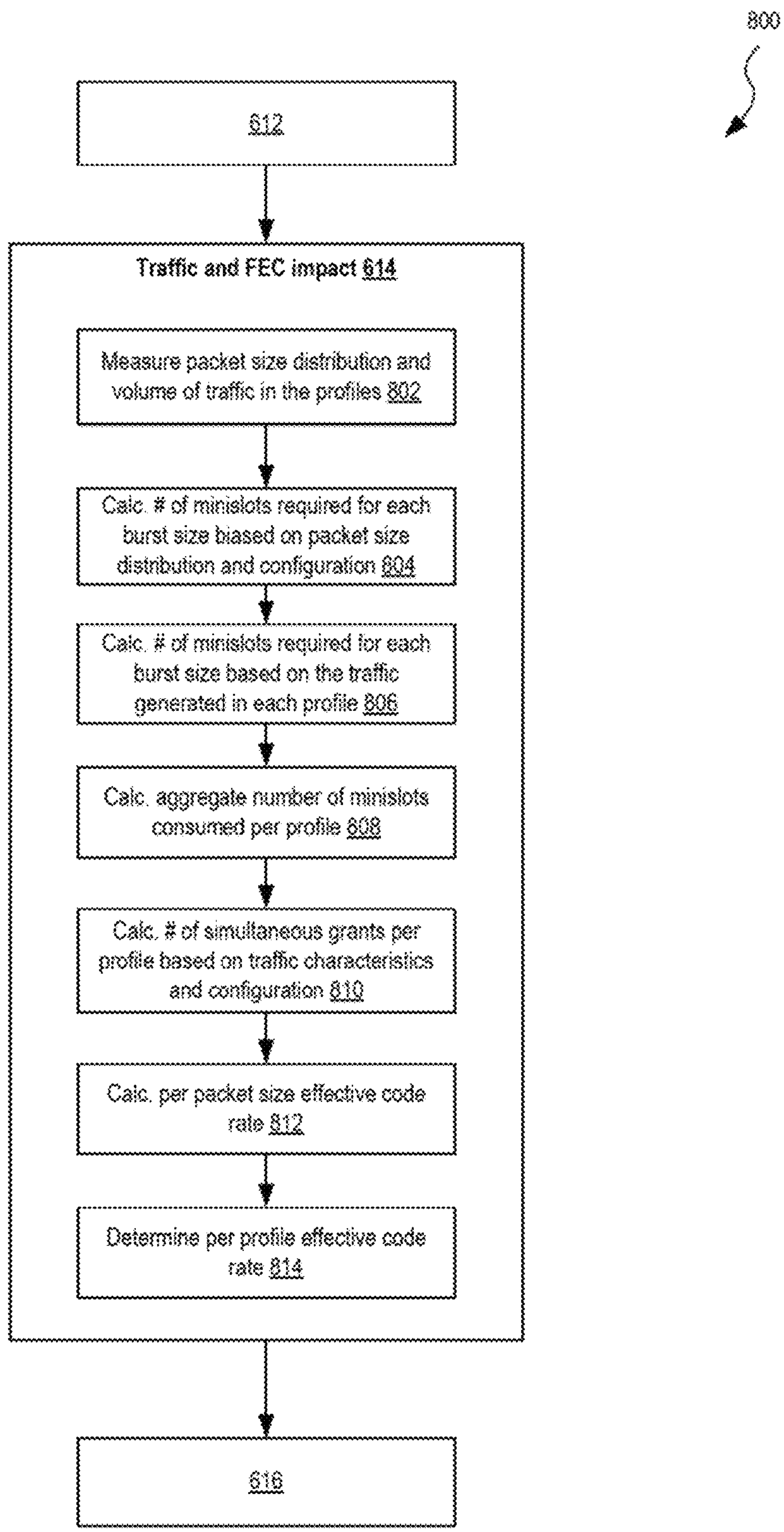
FIG. 8 is one example of a Traffic and FEC impact step from the method of FIG. 6, in an embodiment.

FIGS. 6-8 show an Upstream Network Dimensioning method in a DOCSIS 3.1 embodiment. The method of FIGS. 6-8 is represented in one embodiment by the spread sheets, graphs, and algorithms of FIGS. 9-37B.

Step 602 starts method 600.

In step 604, method 600 determines total upstream DOCSIS 3.1 occupied spectrum in a node based on legacy use of spectrum and node capacities.

In step 606, method 600 determines what portion of the total occupied spectrum is the unused spectrum and the unusable spectrum.

In step 608, method 600 examines the first i-th channel, if this is the first pass through the method; otherwise method 600 examines the next i-th channel. This examination process may be performed, for example, using an upstream FFT Block.

In step 610, method 600 collects data. One exemplary data collection step 610 is shown in detail in FIG. 7 as data collection 700.

In step 612, method 600 utilizes cyclic prefix and net symbol period to determine time efficiency, for example, as a percentage.

In step 614, method 600 determines traffic and FEC impact. One exemplary step 614 is shown in detail in FIG. 8 as data collection 800.

In step 616, method 600 calculates a total # of body and edge minislots in each M profile from the number of grants per profile plus the number of additional edge minislots.

In step 618, method 600 calculates raw bit capacity for each M profile from profile modulation and pilot pattern versus frequency information.

In step 620, method 600 utilizes an effective code rate calculation for each of the profiles to calculate an effective bit capacity after FEC overhead.

In step 622, method 600 determines efficiency in b/s/Hz for each of the M profiles utilizing time efficiency and occupied bandwidth metrics.

In step 624, method 600 determines a profile throughput in bits/sec by multiplying efficiency in each profile by the occupied bandwidth.

In decision step 626, method 600 determines if it is done with all i-th channels. If in step 626 it is determined that method 600 is not done with all i-th channels, it moves to step 610, and otherwise method 600 ends.

FIG. 7 is a method 700, which is one example of step 610 of FIG. 6, shown in detail. In step 702, method 700 determines the subcarrier spacing of an i-th channel.

In step 704, method 700 determines the i-th channel's cyclic prefix.

In step 706, method 700 determines the i-th channel's roll-off window.

In step 708, method 700 determines the i-th channel's lower and upper edges.

In step 710, method 700 calculates potential # of subcarriers and stores it in temp variable "S" based on the retrieved i-th channel's lower and upper edges.

In step 712, method 700 determines minislot parameters, for example, the number of subcarriers, the number of symbols, etc.

In step 714, method 700 calculates the frame duration from "K", the symbols per frame.

In step 716, method 700 determines a list of intelligent occupancy of upstream spectrum by legacy systems on the network, including center frequency, bandwidth, and expected modulation order.

In step 718, method 700 calculates the minimum gaps required for legacy systems on the network and determines the position and width of excluded sub-bands.

In step 720, method 700 determines the position of excluded subcarriers based on signal-to-noise-ratio (SNR).

In step 722, method 700 determines the guard band(s) required.

In step 724, method 700 determines a list of usable body and gap-related-edge minislots (a.k.a. additional edge minislots) in the i-th channel, from the guard band, excluded subcarriers and excluded sub-bands, such that a minislot generation efficiency is determined.

In step 726, method 700 calculates, for each of the profiles, the effective bit capacity after FEC overhead utilizing the effective code rate.

In step 728, method 700 determines the per profile effective code rate.

Method 700 then moves to step 612 of FIG. 6.

FIG. 8 is a method 800, which is one example of step 614 of FIG. 6, shown in detail. In step 802, method 800 measures a packet size distribution and a volume of traffic in the profiles.

In step 804, method 800 calculates the number of minislots required for each burst size biased on packet size distribution and configuration.

In step 806, method 800 calculates the number of minislots required for each burst size based on the traffic generated in each profile.

In step 808, method 800 calculates the aggregate number of minislots consumed per profile.

In step 810, method 800 calculates the number of simultaneous grants per profile based on traffic characteristics and configuration.

In step 812, method 800 calculates the per packet size effective code rate.

In step 814, method 800 determines the per profile effective code rate.

Method 800 then moves to step 616 of FIG. 6.

Figure 9:
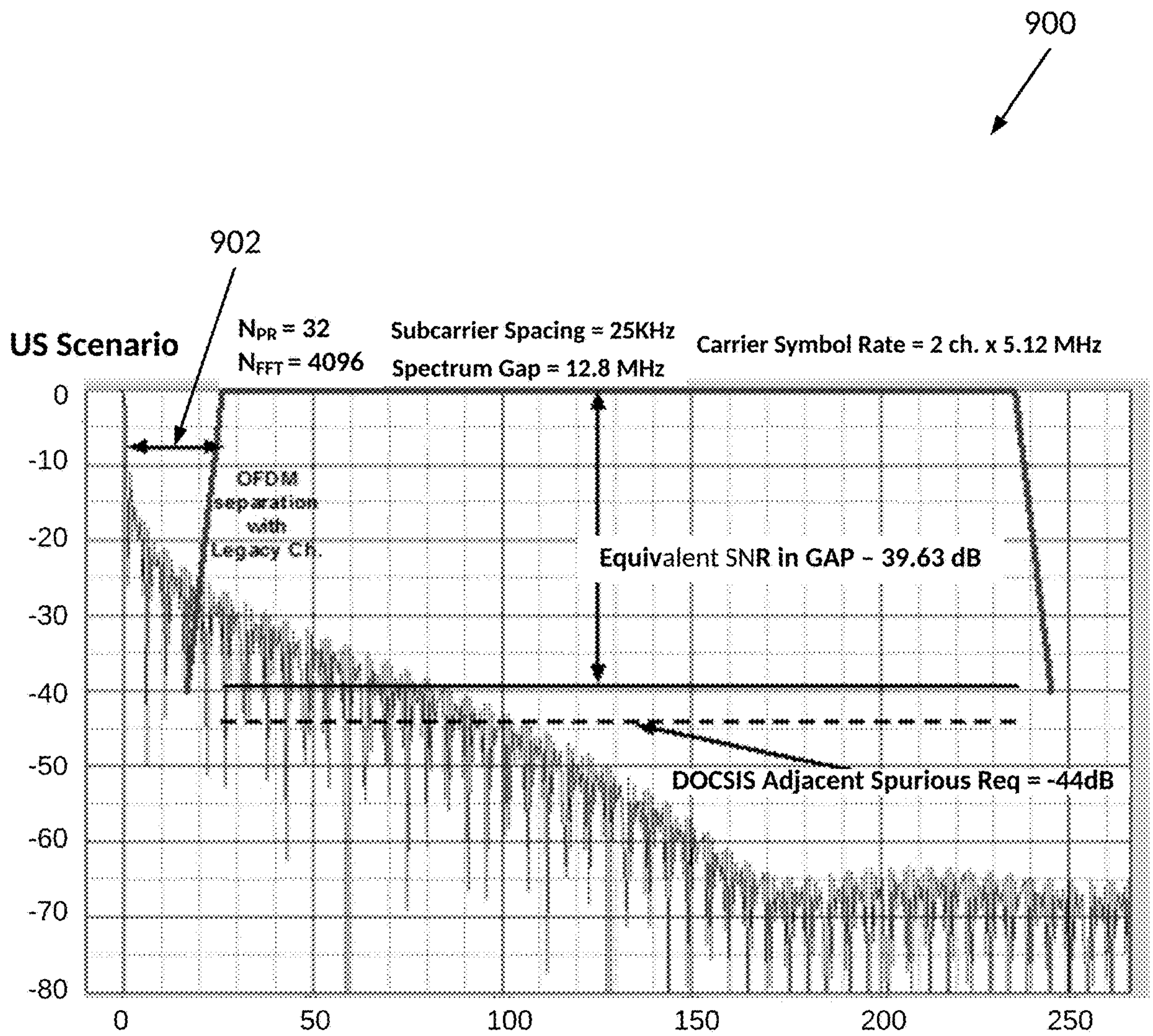
FIG. 9 is a graph illustrating a roll-off window and legacy/OFDM separation optimization, in an embodiment.

FIG. 9 shows one exemplary relationship between legacy and OFDM systems such that they may coexistence on the same network. For example, where the location and modulation order of legacy channels are known or determined, the present system determines an optimization. The separation of legacy and OFDM systems is based on the CNR required by the legacy channel, the amount of adjacent OFDM/OFDMA noise that a particular roll-off window configuration implies, and a separation 902 of the legacy signal to the closest active OFDM/OFDMA subcarrier. The roll-off window requires additional samples that are added to the symbol and have the effect of lowering the energy adjacent to the signal by rolling-off and decreasing the adjacent energy in amplitude at a higher rate than the traditional configured scenario without the additional roll-off samples. This reduces the total amount of energy in the adjacent channel and allows the adjacent portion of the spectrum be occupied by another signal such as a legacy DOC SIS signal. Graph 900 of FIG. 9 shows one example of such a scenario in an up-stream embodiment having a roll-off window and legacy/OFDM separation 902 optimization. In this example, a 64 QAM DOCSIS legacy system that requires 27 dB CNR coexists with an OFDMA system, which operates at a specific power level/bandwidth that is located at a specific frequency separation from the edge of the legacy signal. The time overhead needed in the form of Cyclic Prefix is calculated using an adjacency optimization algorithm plus the delay spread that is obtained from the channel conditions.

Figure 10:
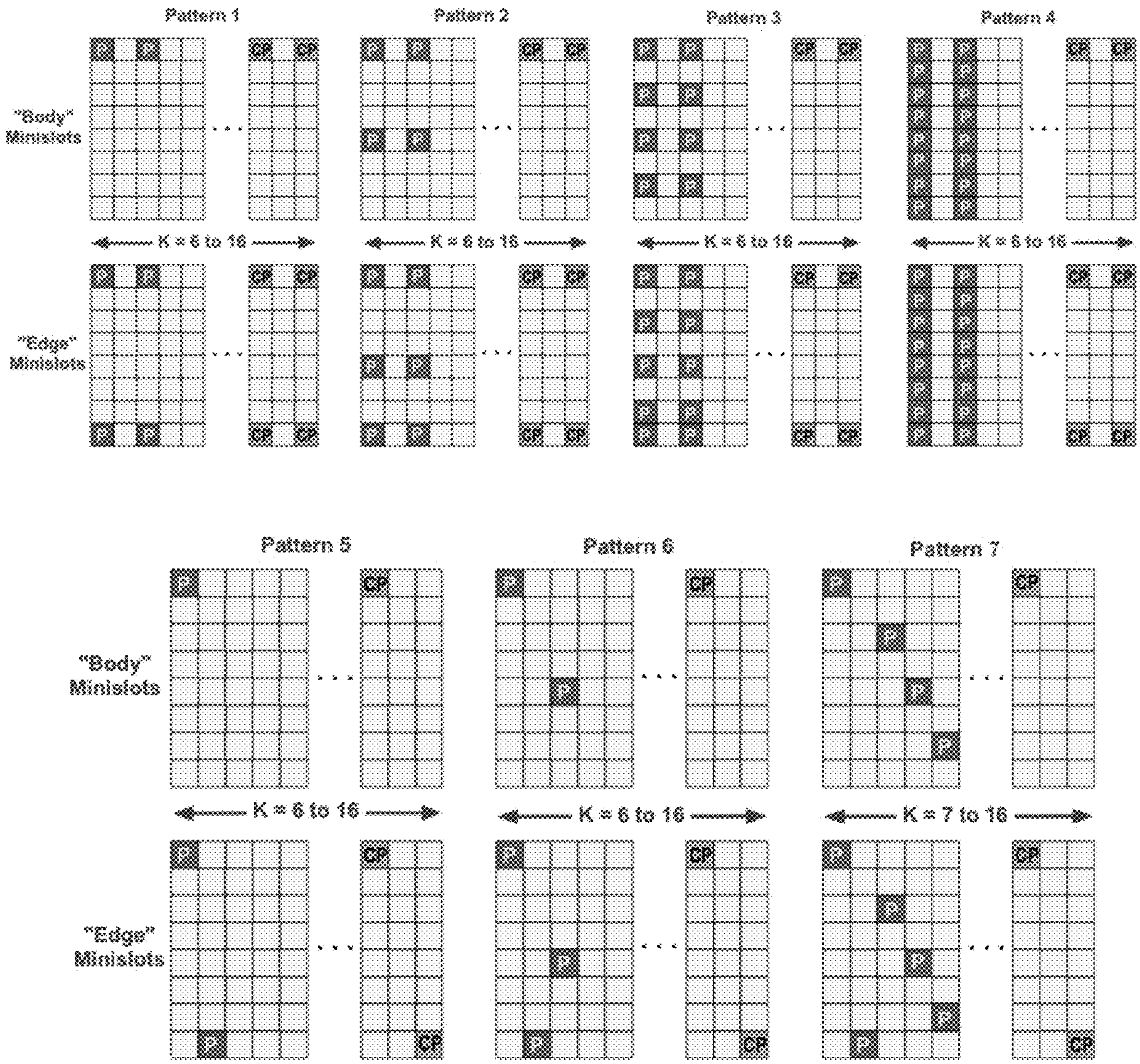
FIG. 10 shows exemplary upstream Pilot structures in Patterns 1 through 7, each with body minislots and edge minislots, in an embodiment.
Figure 11:
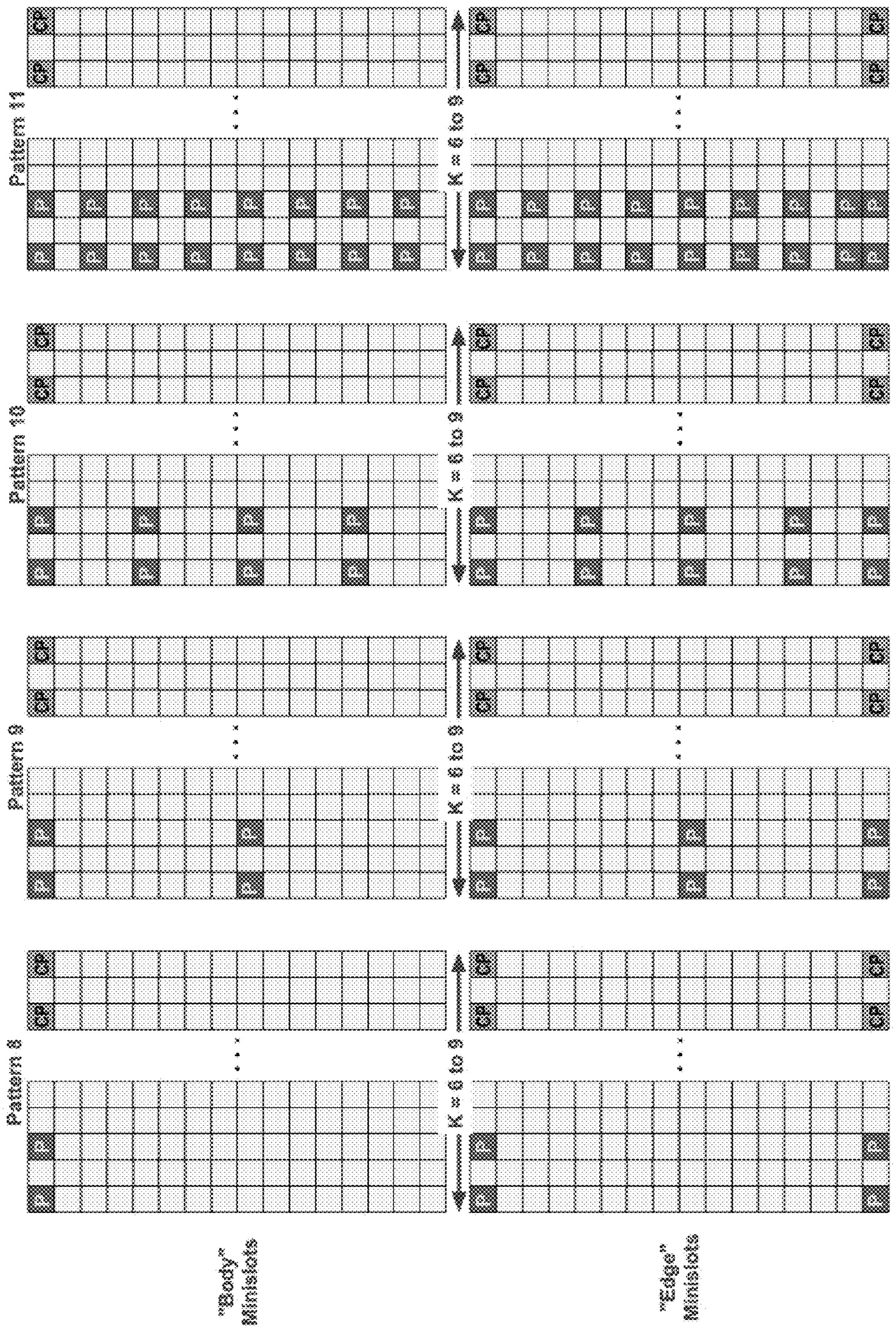
FIG. 11 shows exemplary upstream Pilot structures in Patterns 8 through 11, each with body minislots and edge minislots, in an embodiment.
Figure 12:
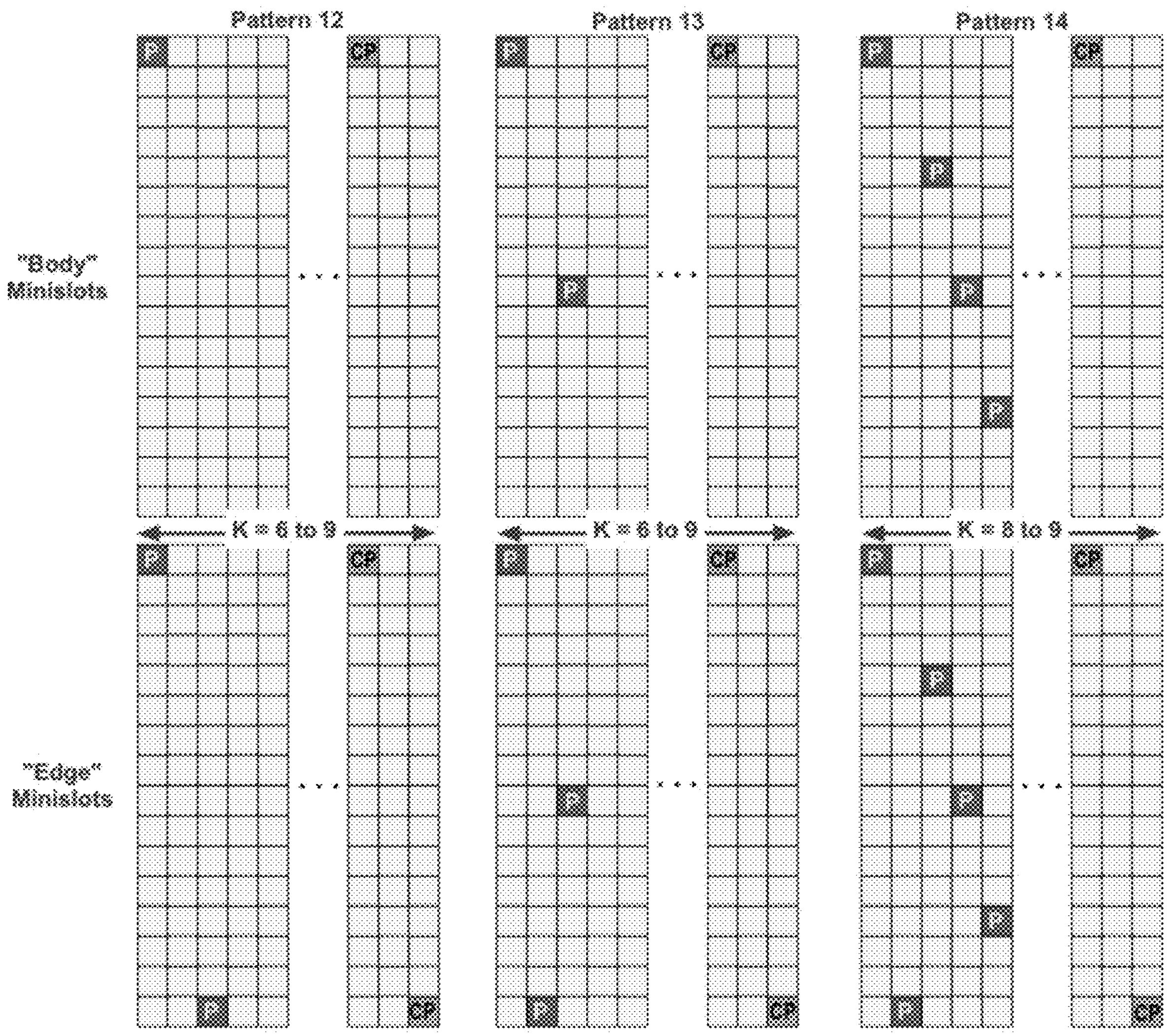
FIG. 12 shows exemplary upstream Pilot structures in Patterns 12 through 14, each with body minislots and edge minislots, in an embodiment.

FIGS. 10-12 show upstream patterns 1-14 each having specific pilot structures, minislot configurations, etc. as known in the art. The present systems and methods may select the appropriate pattern based on network characteristics.

FIGS. 13 and 14 show the same spread sheet, although FIG. 14 shows the functions that produce the results shown in FIG. 13. Both FIGS. 13 and 14 show the Transmission Payload Range in Bytes, the Codeword types and associated information bits, the transmission payload range in bits, and the Codeword types. FIGS. 13 and 14 also show the codeword bits, parity bits, payload bits, efficiency, payload bytes and parity bytes associated with the long, medium and short Codeword types.

FIGS. 15 and 16 show the same spread sheet, although FIG. 16 shows the functions that produce the results shown in FIG. 15. FIGS. 15 and 16 show the spread sheet which correlates the calculated efficiencies with calculated code word bytes, information bits, information bytes, and codeword type (short, medium and long).

Figure 17:
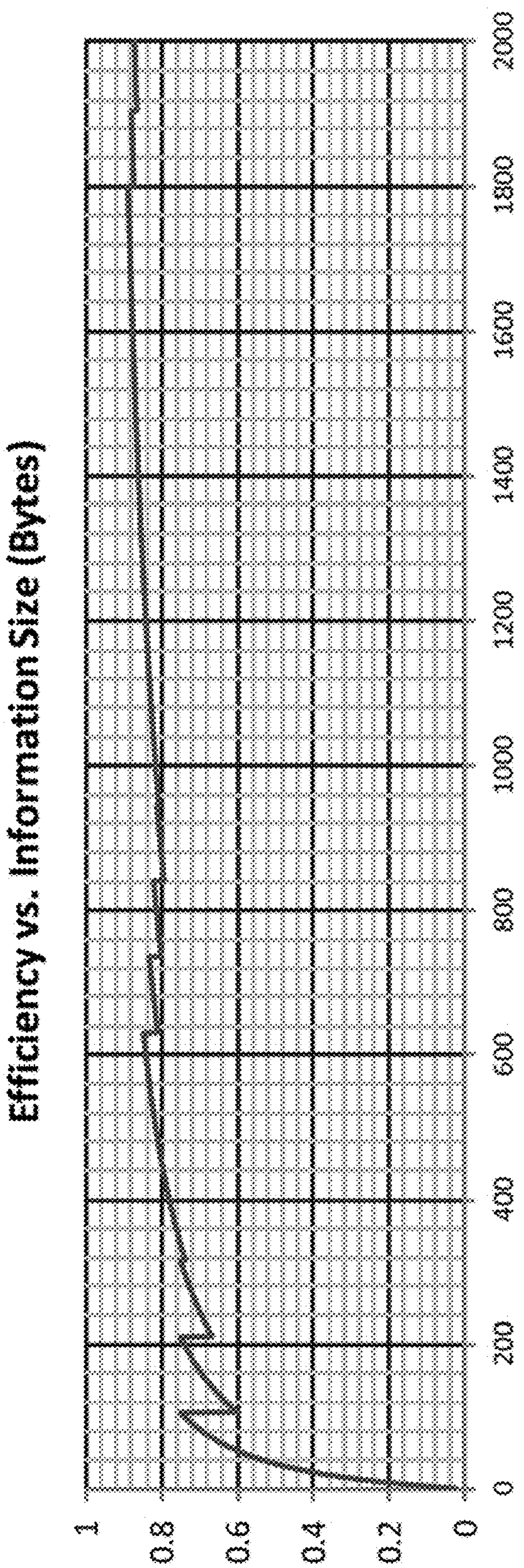

FIG. 17 is a graph of Efficiency vs. Information Size (in bytes) as calculated by the spreadsheet of FIGS. 13-14.

Figure 18:
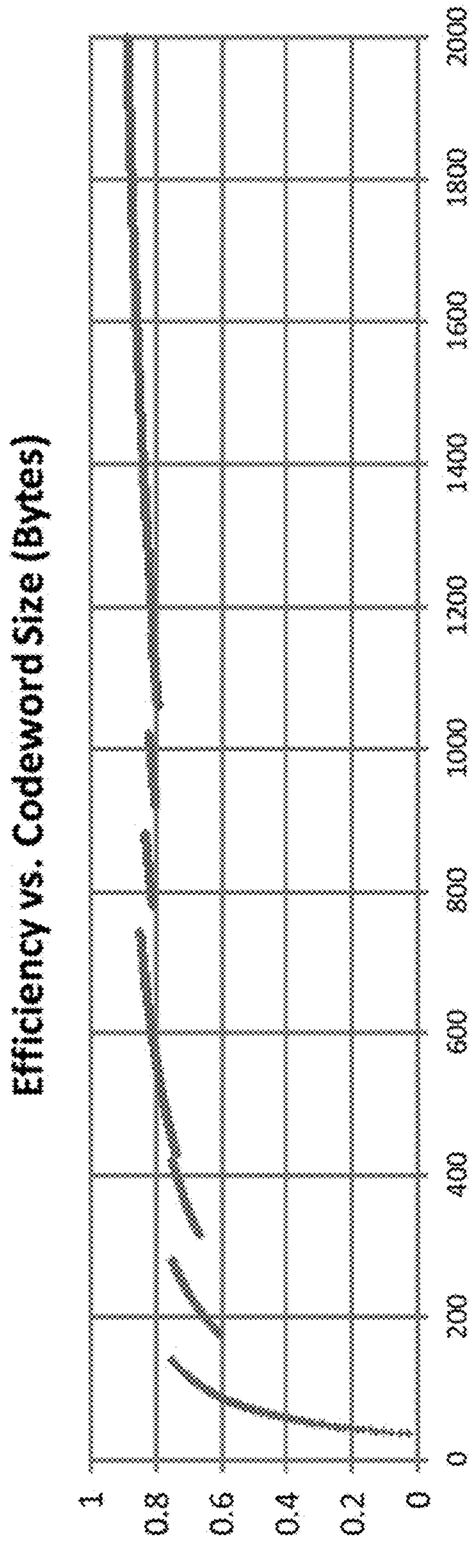
FIG. 18 is a graph illustrating an Upstream Efficiency vs. Codeword size in bytes as determined by the upstream FEC efficiency calculator of FIGS. 13-16, in an embodiment.

FIG. 18 is a graph of Efficiency vs. Codeword Size (in bytes) as calculated by the spread sheet of FIGS. 15-16.

FIG. 19 shows field data and references used in a DOCSIS 3.1 efficiency calculator. FIGS. 20A-25E are aspects of the DOCSIS 3.1 upstream efficiency calculator.

Figure 20A:
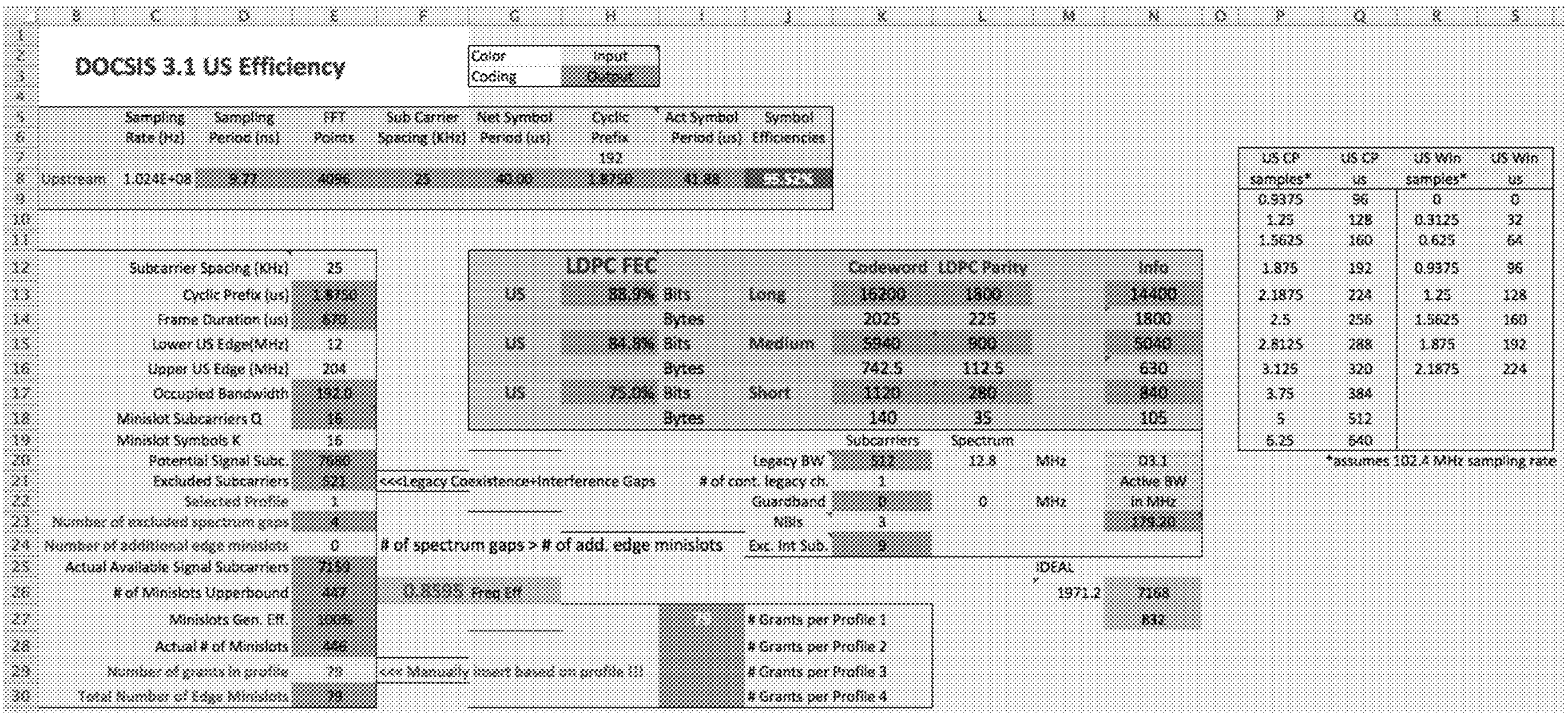
Figure 20B:
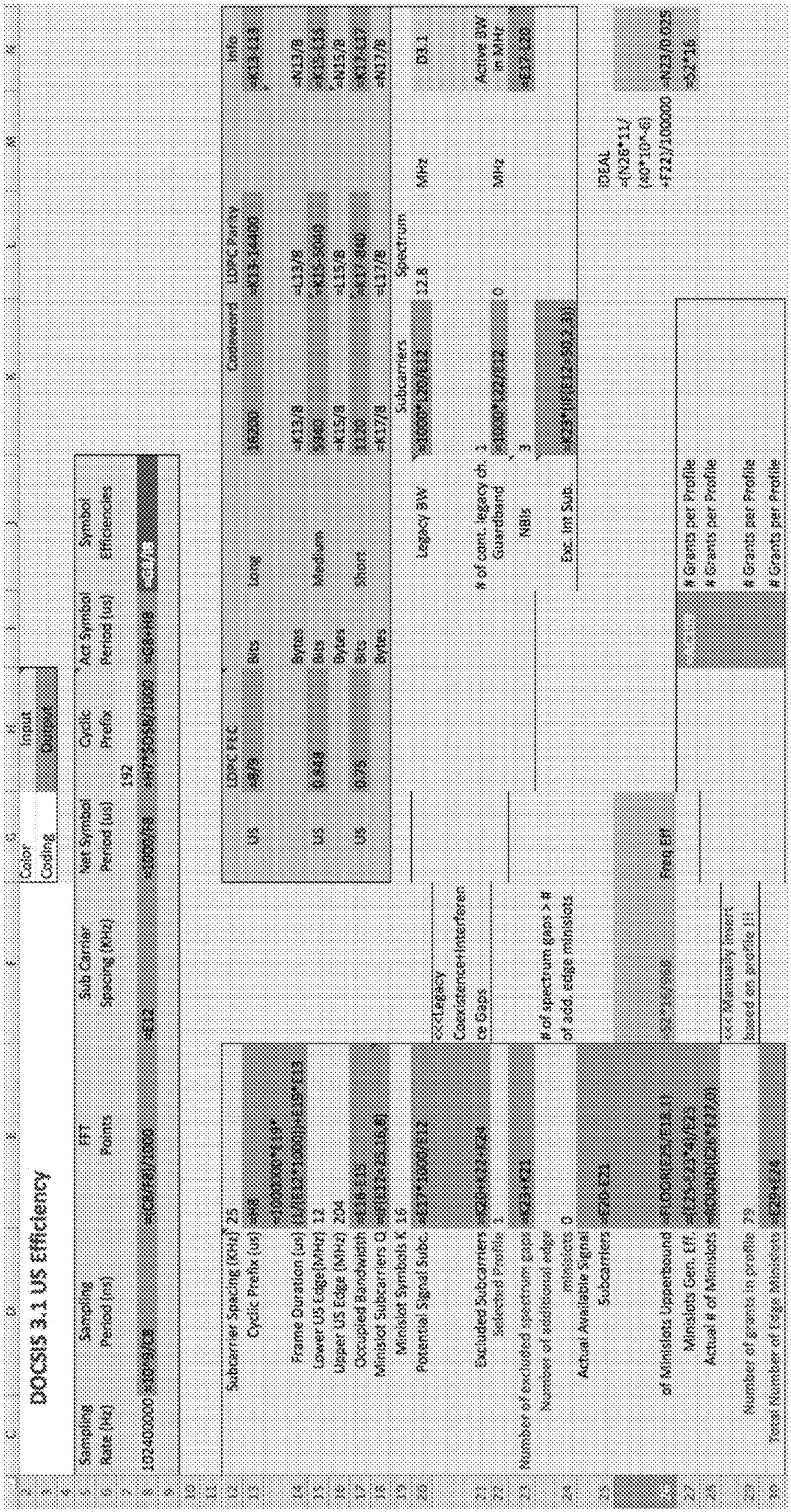

FIGS. 20A and 20B show the same spread sheet, although FIG. 20B shows the functions that produce the results shown in FIG. 20A.

Figure 21B:
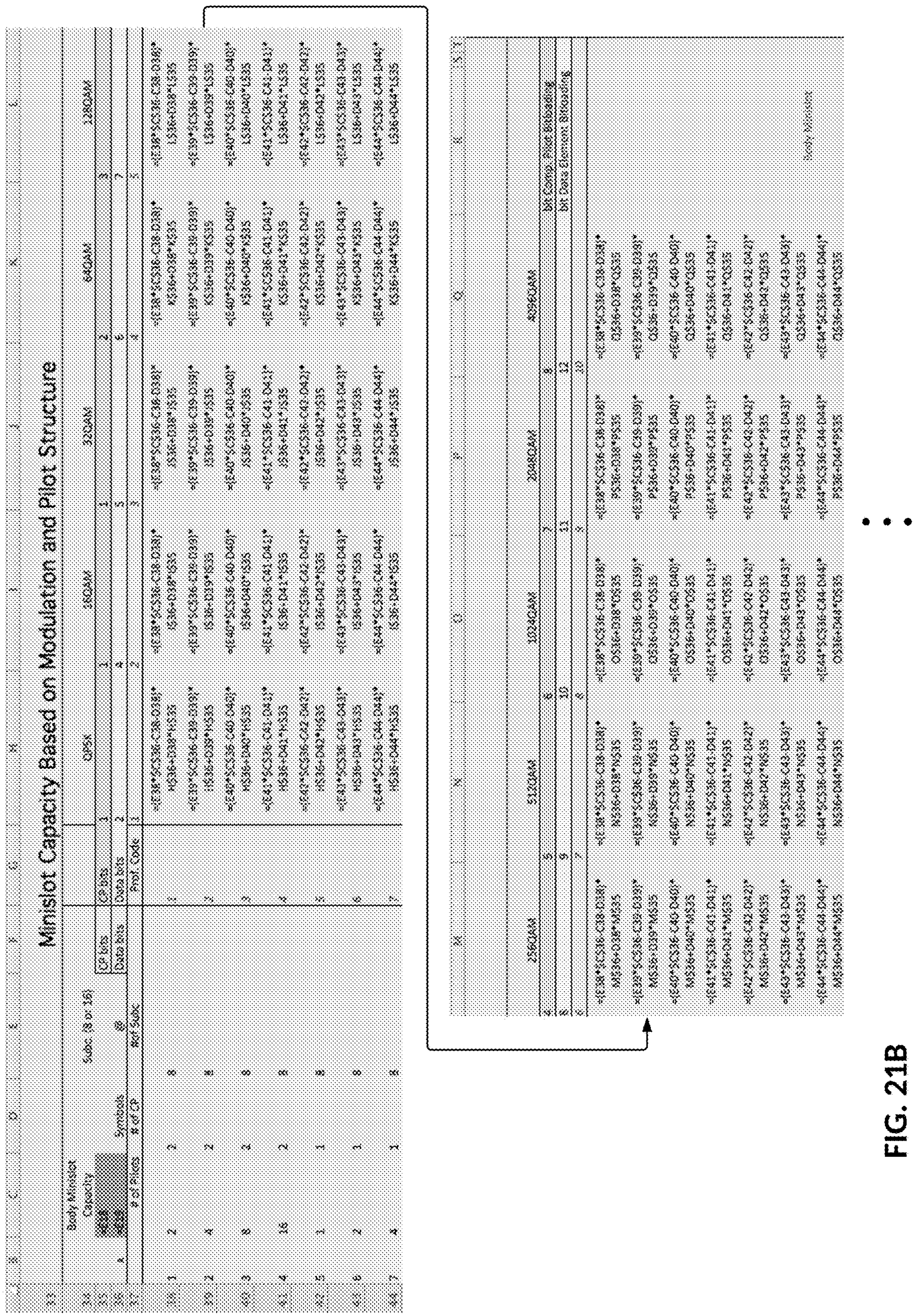

FIGS. 21A and 21B show the same spread sheet, although FIG. 21B shows the functions that produce the results shown in FIG. 21A.

FIGS. 22A and 22B show the same spread sheet, although FIG. 22B shows the functions that produce the results shown in FIG. 22A.

FIGS. 23A and 23B show the same spread sheet, although FIG. 23B shows the functions that produce the results shown in FIG. 23A.

Figure 24B:
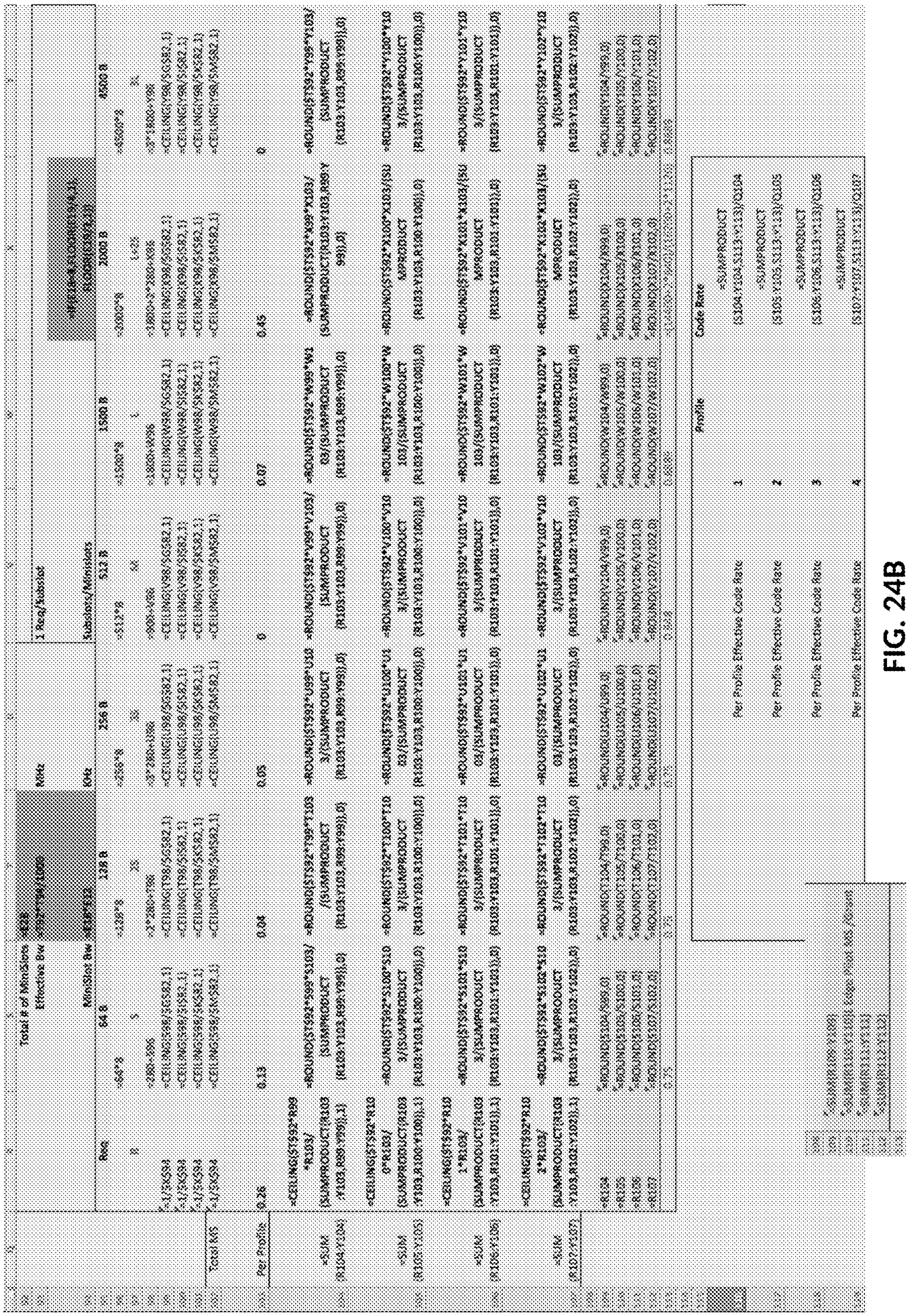

FIGS. 24A and 24B show the same spread sheet, although FIG. 24B shows the functions that produce the results shown in FIG. 24A.

Figure 25:
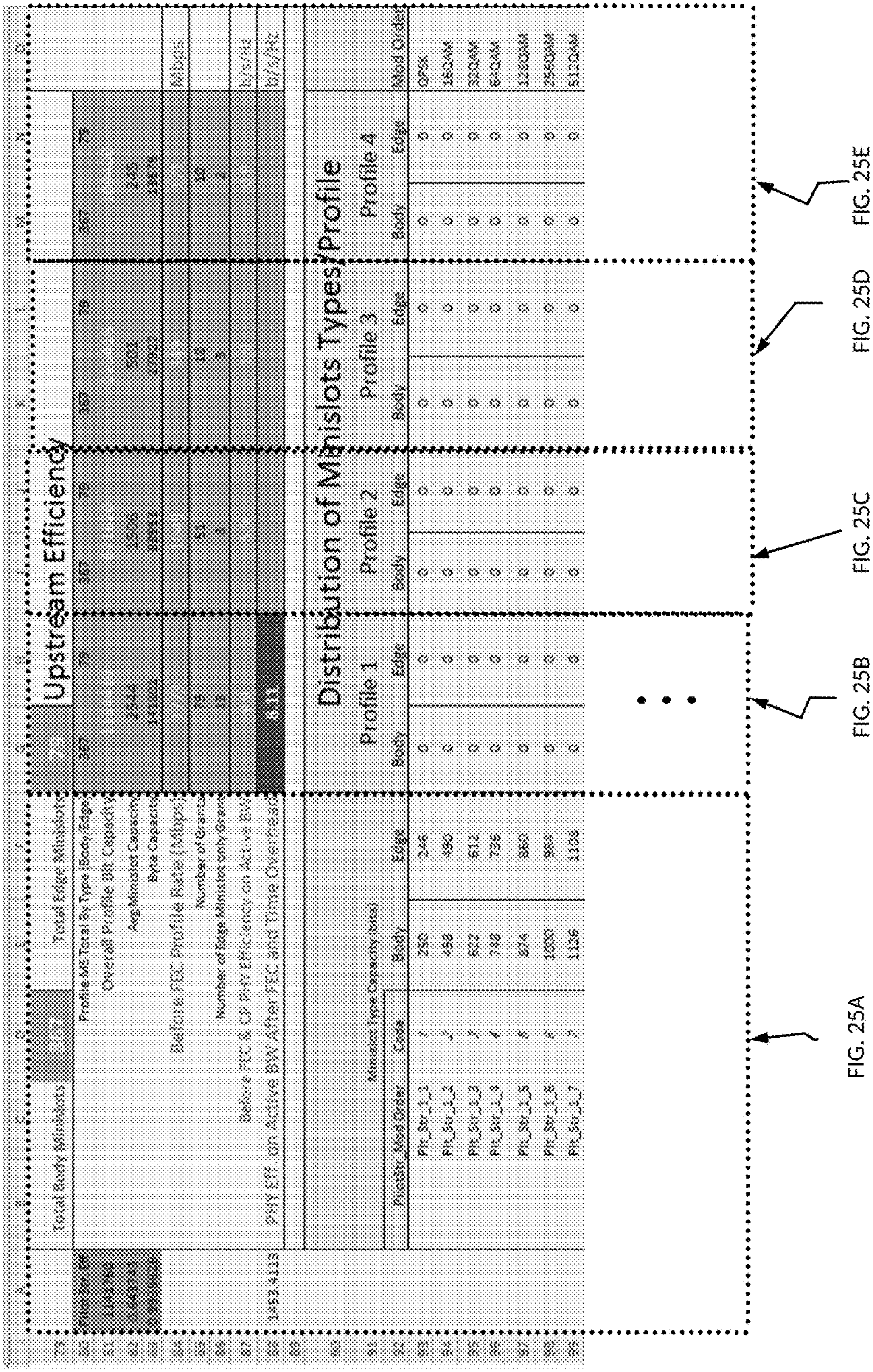
Figure 25A:
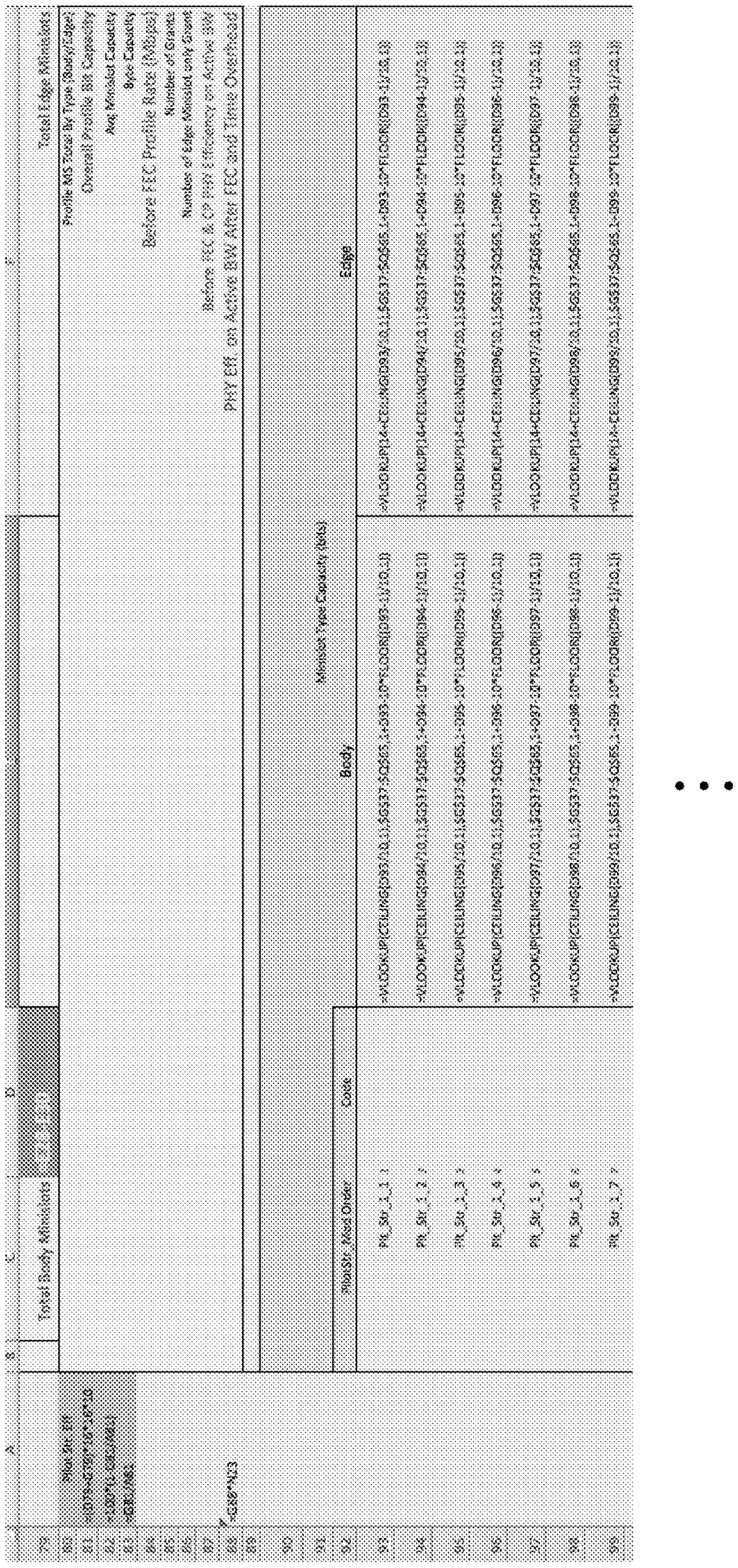
Figure 25B:
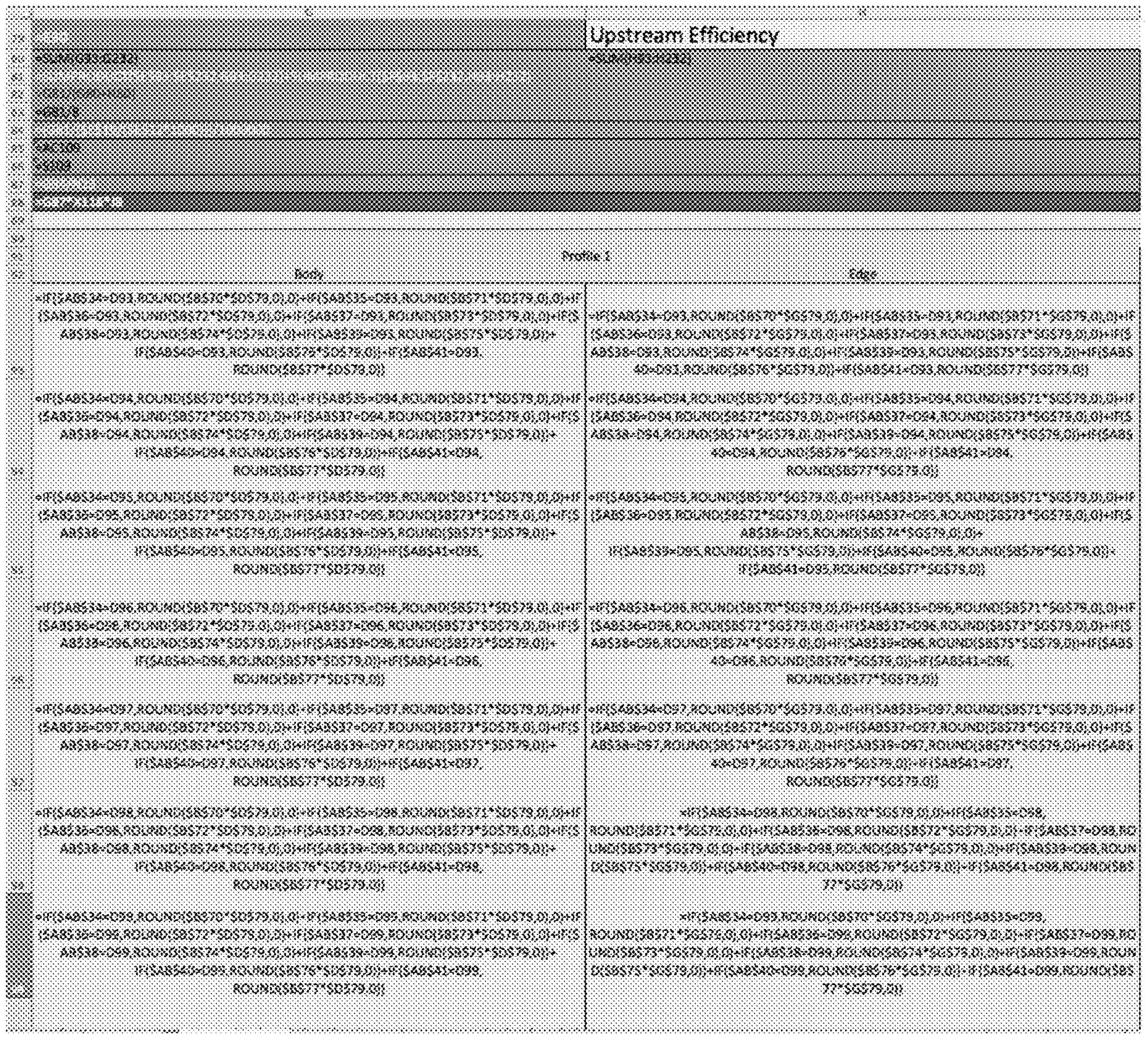
Figure 25C:
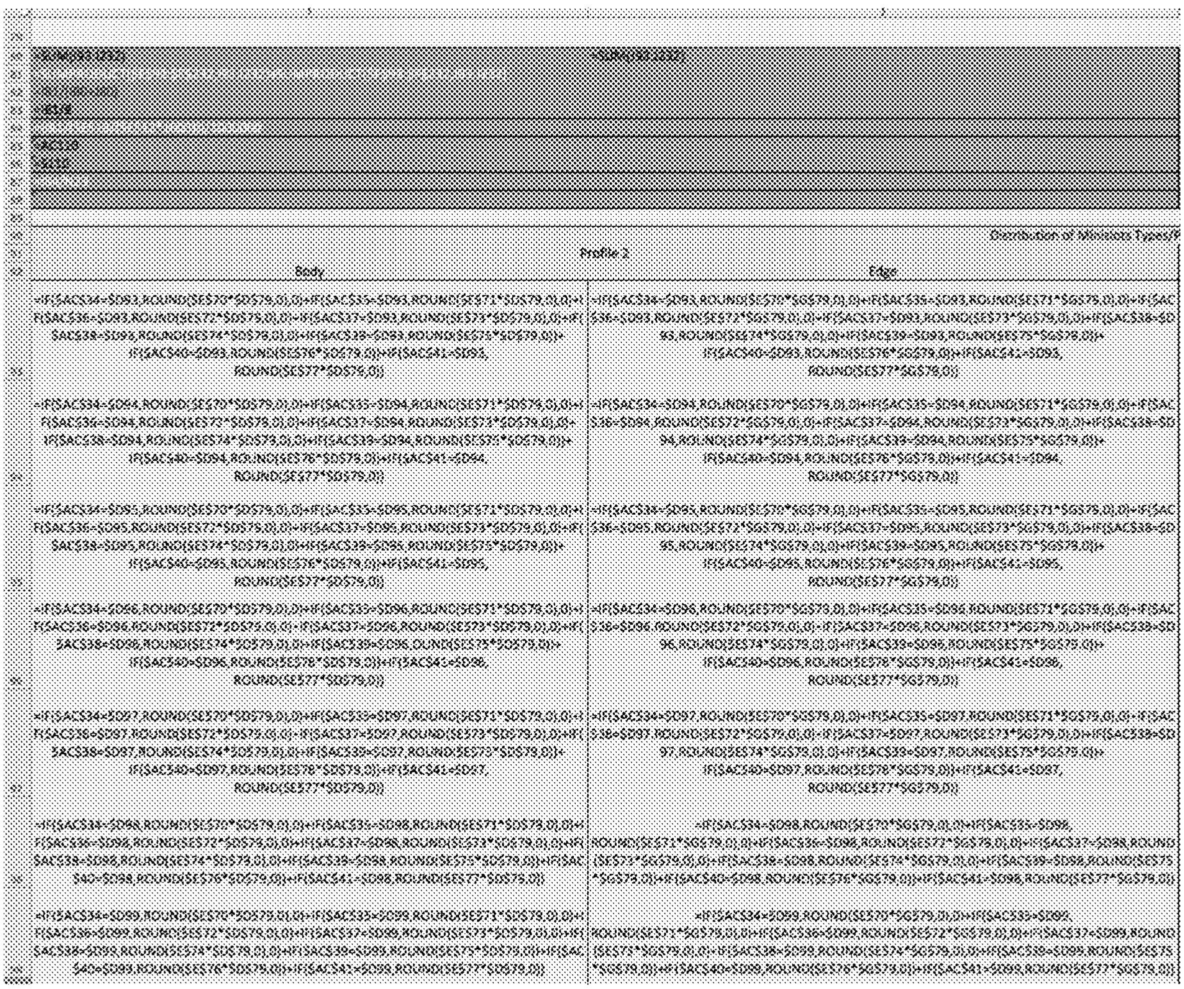
Figure 25D:
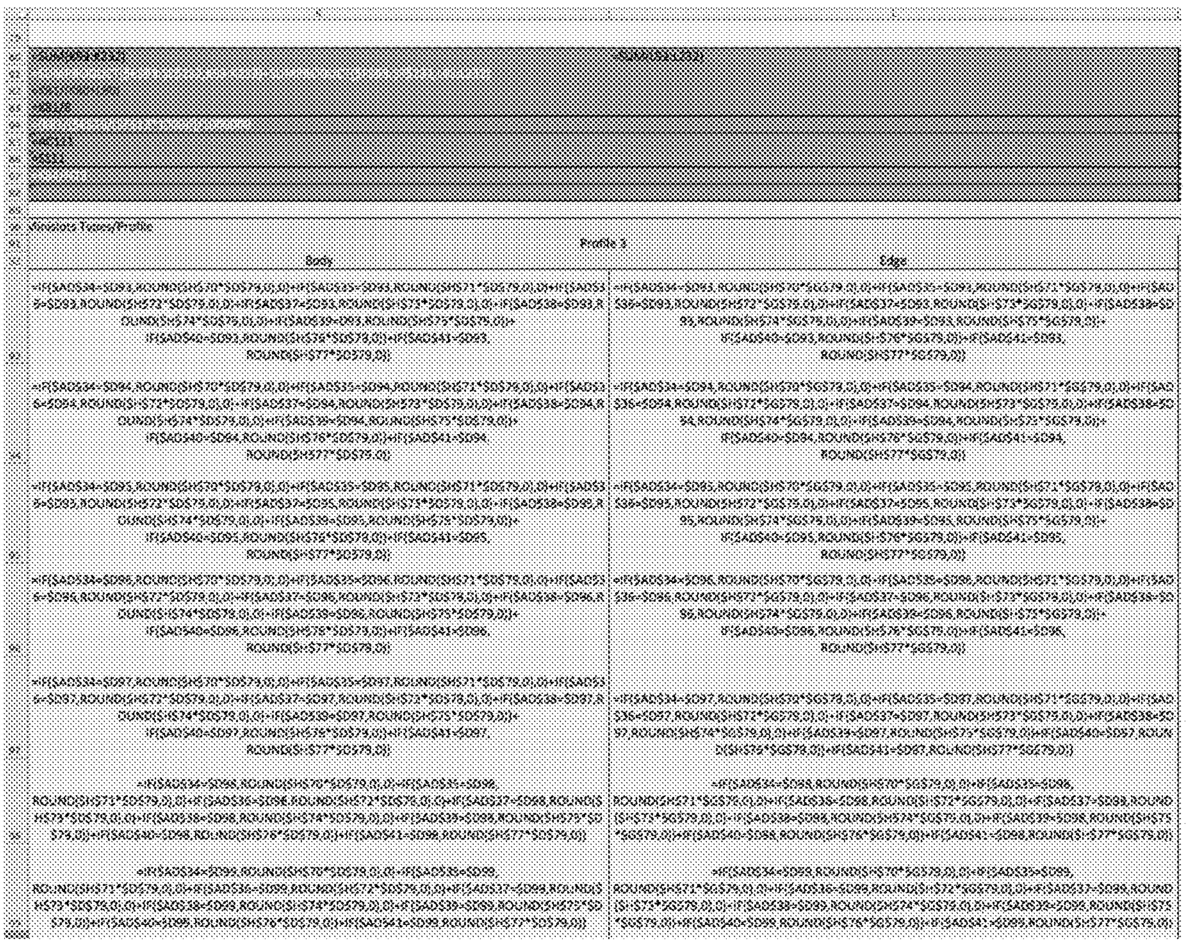

FIGS. 25 and 25A-25E show the same spread sheet, although FIGS. 25A-E show the functions that produce the results shown in FIG. 25.

Figure 26:
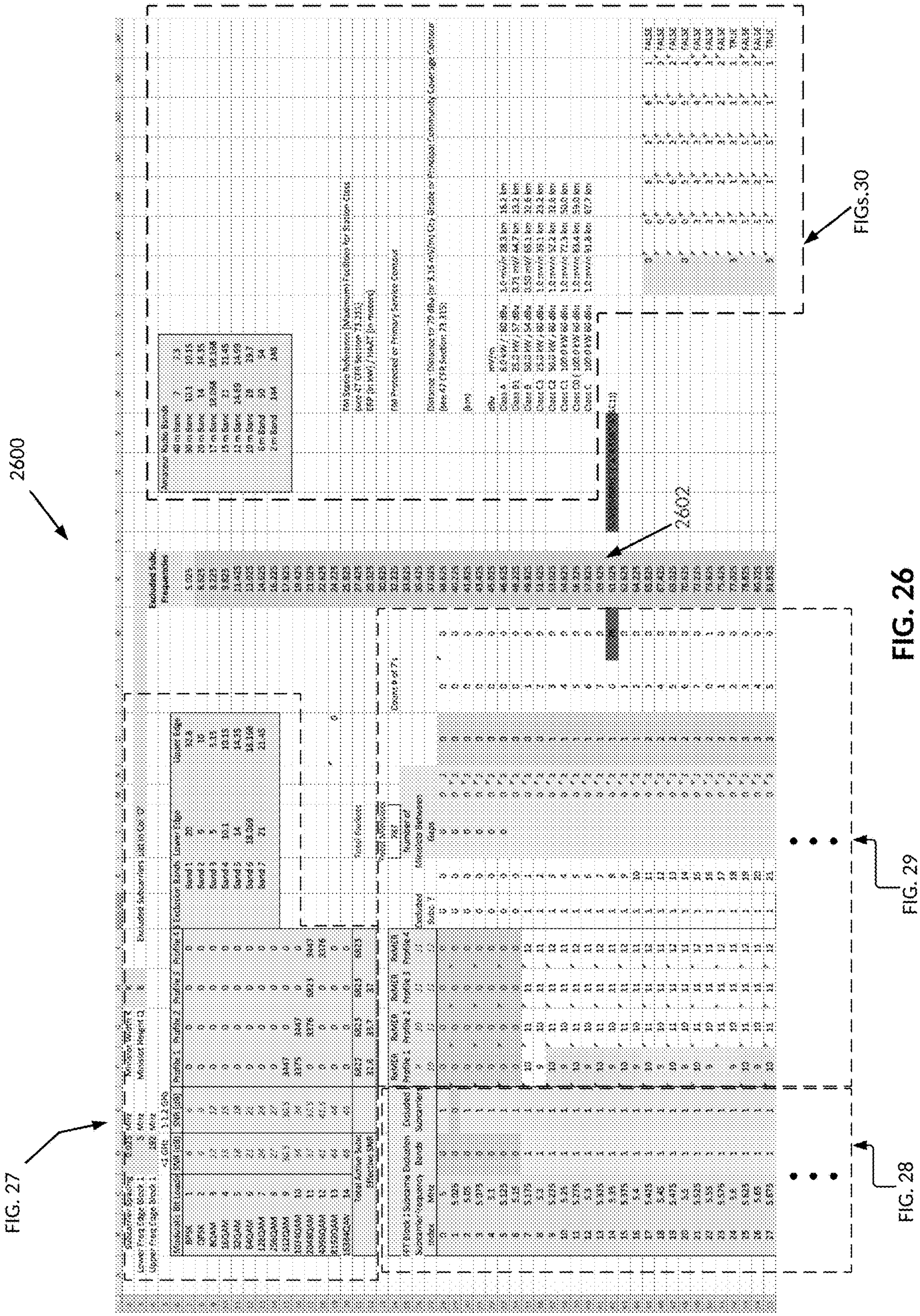
Figure 27:
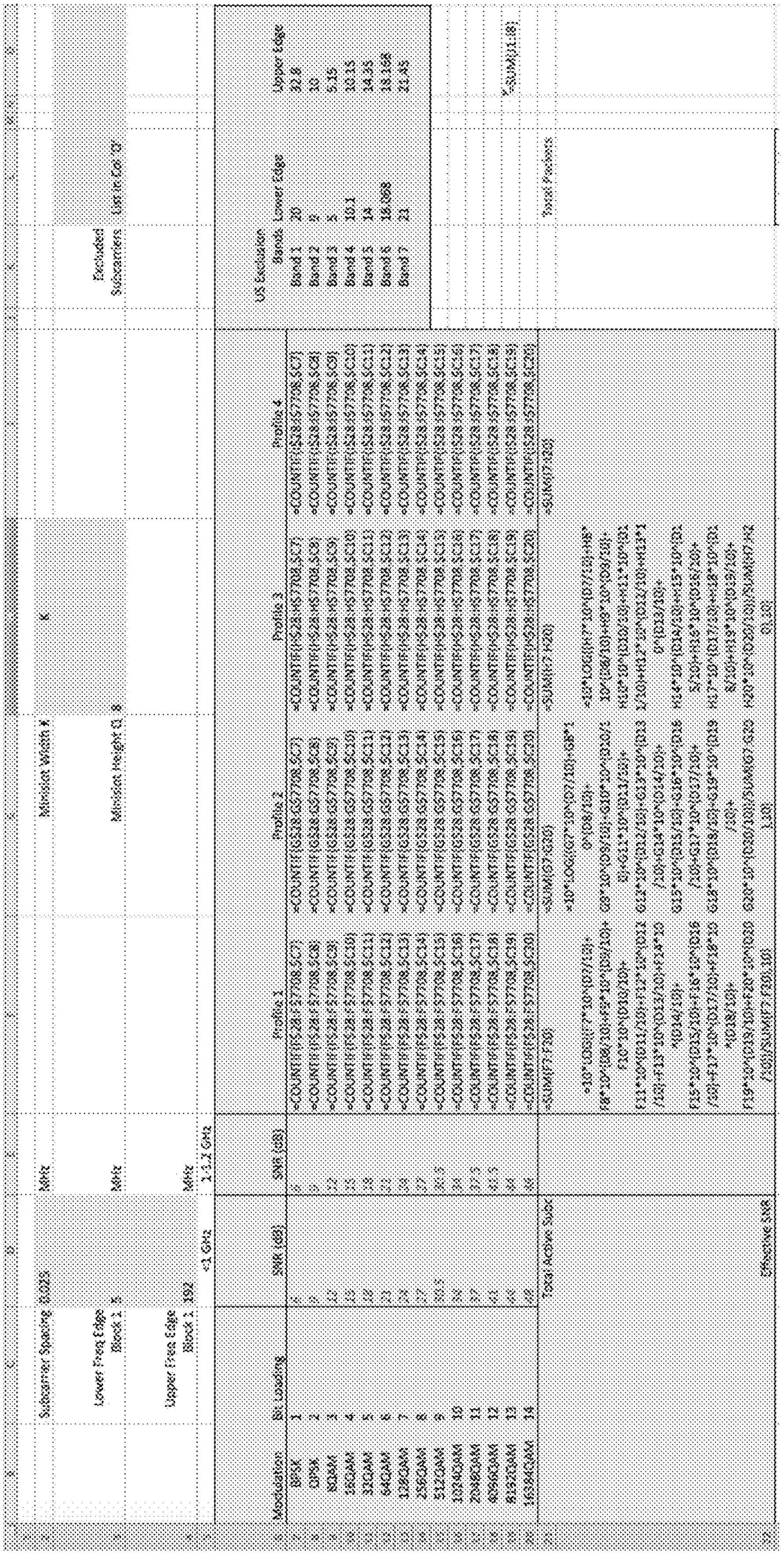
Figure 29:
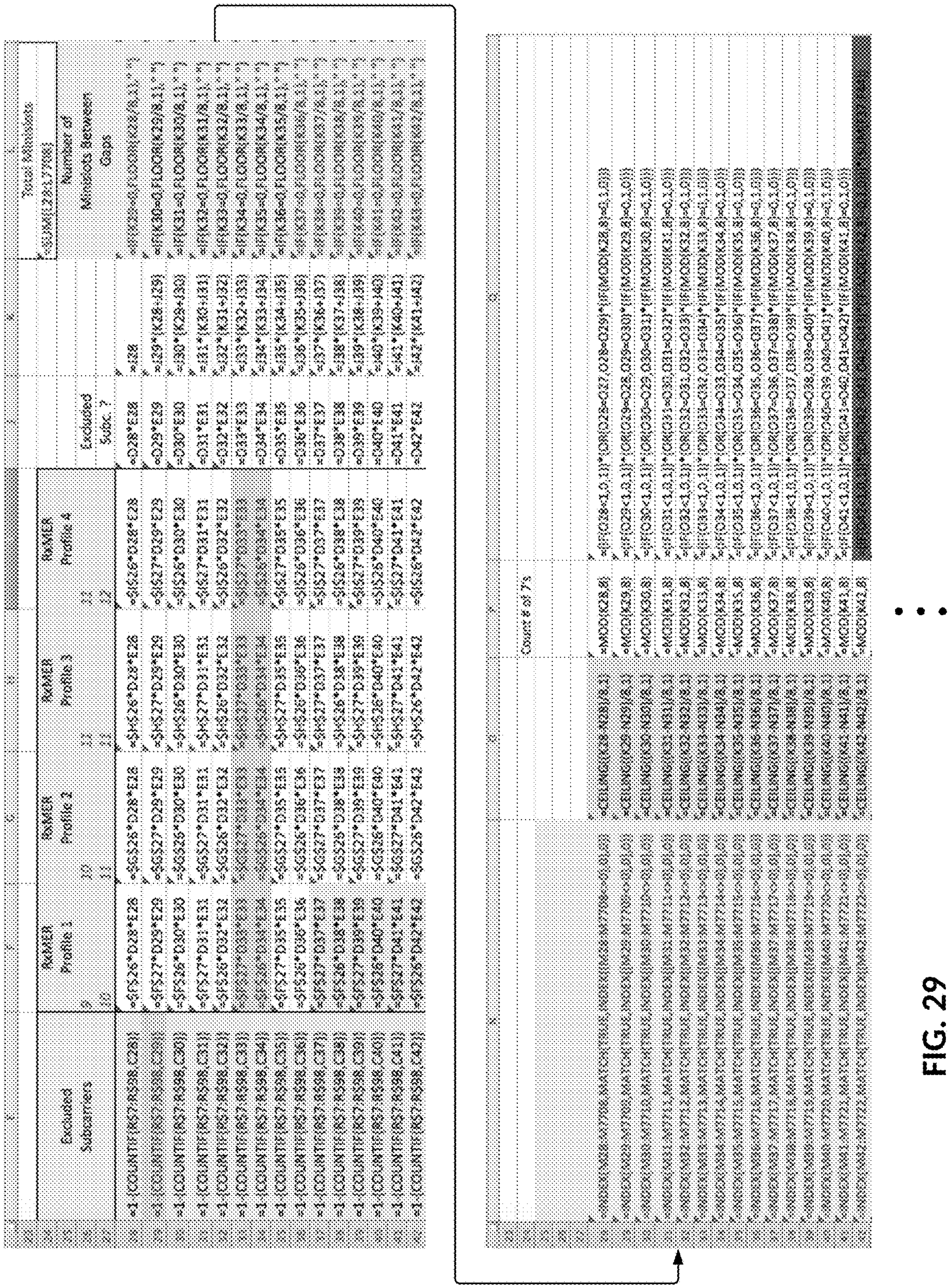

FIG. 26 is a spreadsheet for determining DOCSIS 3.1 upstream minislot and exclusions. For sake of clarity, portions of the spread sheet of FIG. 26 are represented in FIGS. 27-30. FIG. 26 shows results produced by the formulas shown in FIGS. 27-30. FIG. 26 also shows excluded subcarrier frequencies 2602.

FIG. 31 shows upstream use cases 1, 4*a*, and 4*a*+. The formulas that produce the results for use cases 1, 4*a*, and 4*a*+ are shown in FIG. 34. FIG. 32 shows use cases 4*b*, 4*b*+, and 5*a*. FIG. 33A shows uses cases 5*a*+, 5*b* and 5*b*+. FIG. 33B shows use cases 6*a* and 6*a*+. FIG. 33C shows use cases 6*b*, and 6*b*+. In addition, FIG. 33D also shows a mixing calculator, the formulas of which are shown in FIG. 35, which calculates transmission rates for each of the 4*a*-6*b*+ cases for mixing of DOCSIS 3.1 and 3.0 systems at a 5% mixing penalty.

Figure 36B:
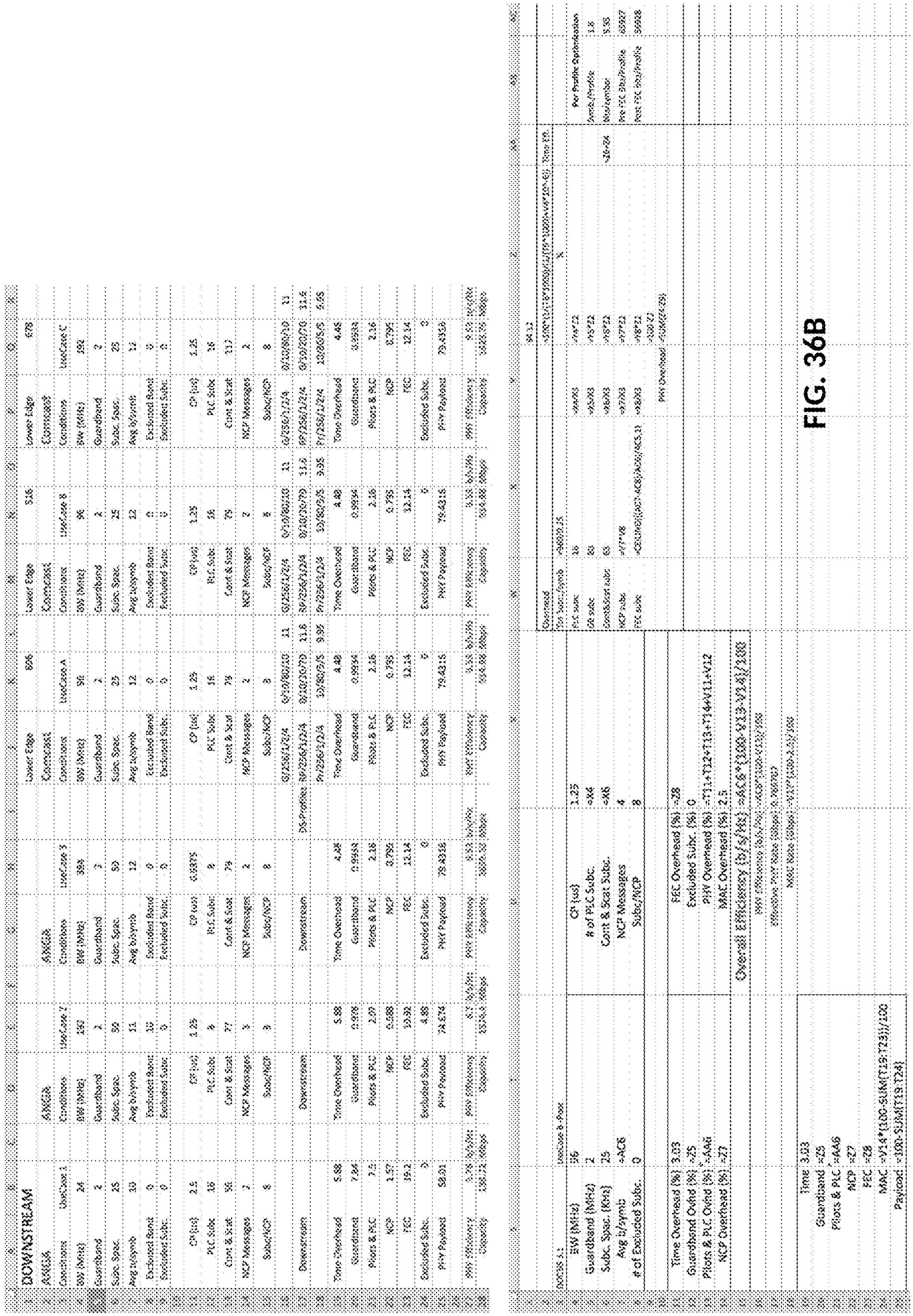

FIGS. 36A and B show 1-3 downstream use cases for ANGA and A-C downstream uses cases for Comcast. FIG. 36B shows the formulas that produce the results presented in FIG. 36A. FIG. 36A also shows a DOCSIS 3.1 uses case B-Poor, with a graphical representation for the time, guardband, Pilot & PLC, NCP, FEC, MAC, and Payload data. For sake of clarity, this graph has been removed from FIG. 36B.

FIGS. 37A and 37B show upstream use cases 1-3 with graphical representation of tie overhead data, legacy, exclusion band, and guardband data, pilot structure overhead, FEC, and PHY payload data. FIGS. 37A and B also show graphical representations of downstream time overhead, guardband, Pilot & PLC, NCP, FEC, excluded subcarriers, and PHY payload for ANGA use cases 1-3.

Figure 38A:
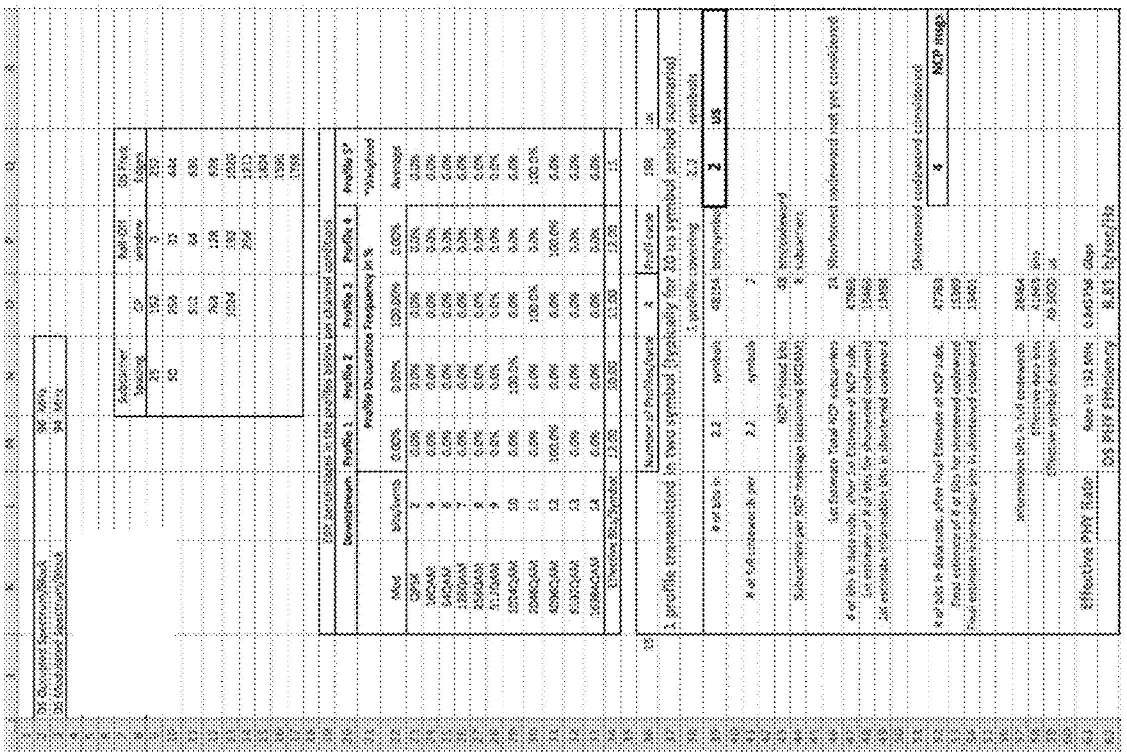
FIG. 38A shows formulas that produce the results shown in FIG. 38.
Figure 38B:
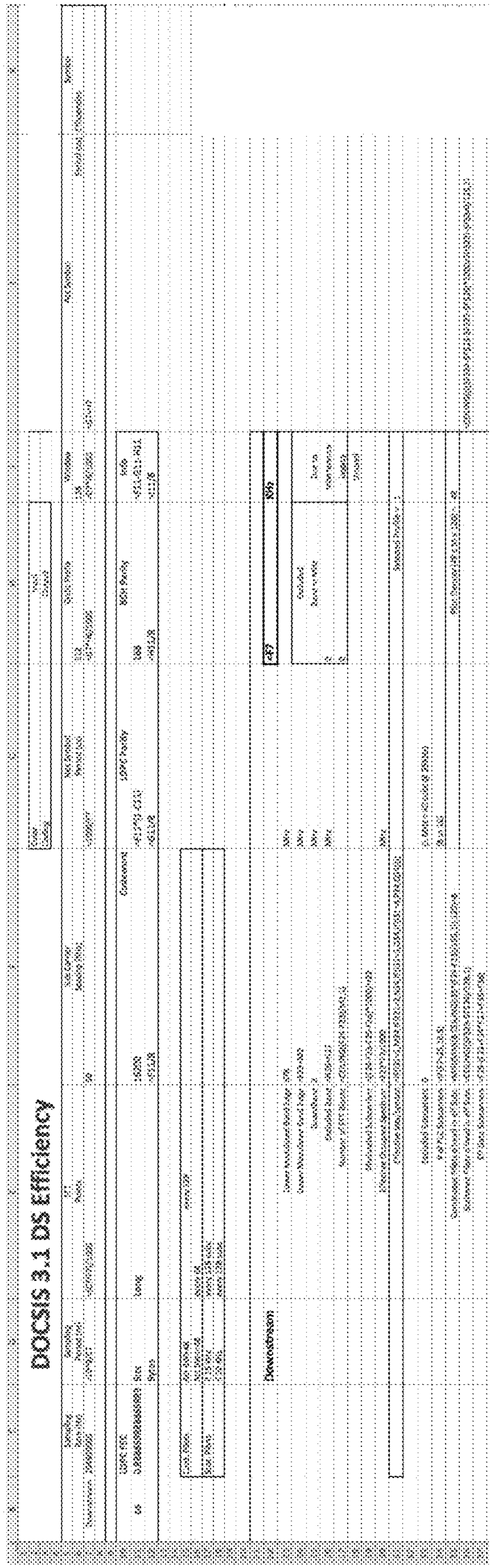
FIG. 38B is a portion of a DOCSIS 3.1 downstream efficiency calculator showing results of calculations, in an embodiment.
Figure 38C:
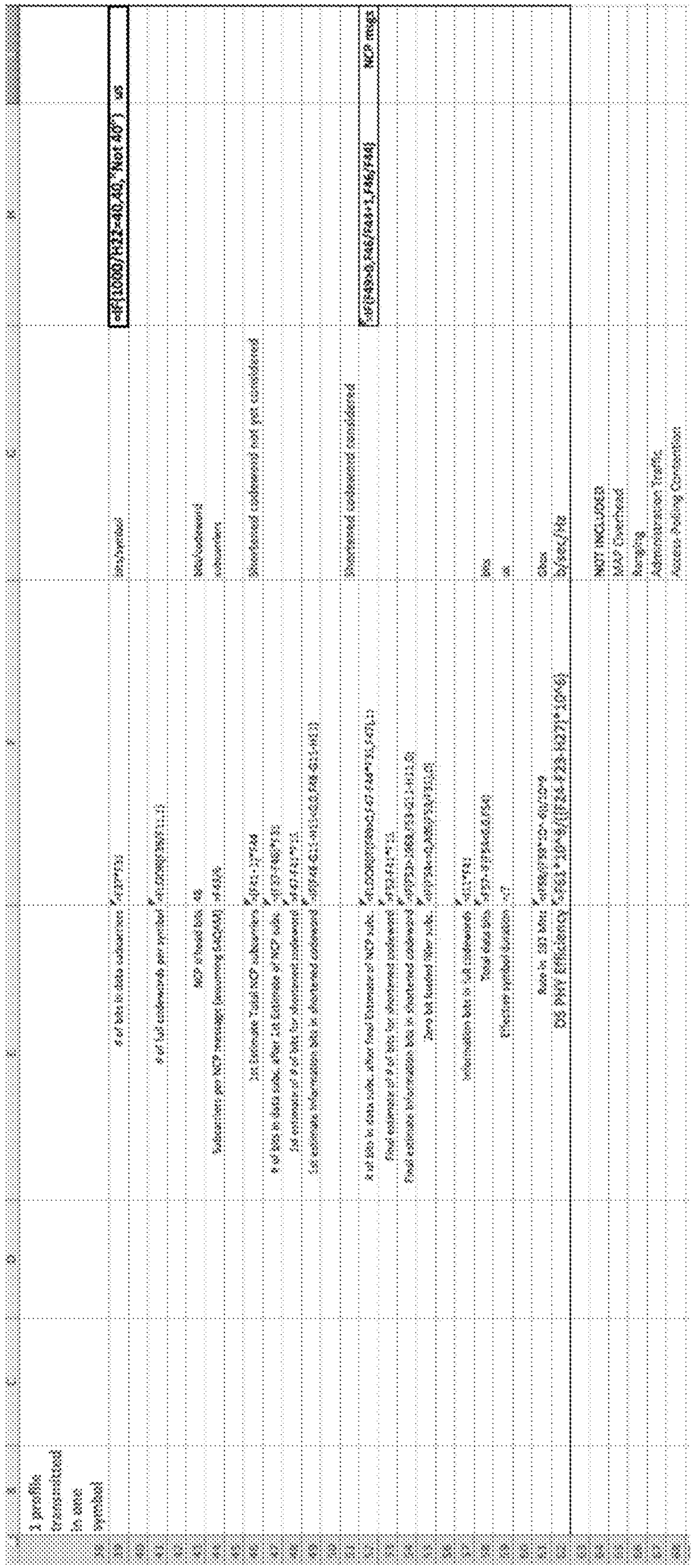
FIGS. 38C-D and 39 show formulas that produce the results shown in FIG. 38B.
Figure 38D:
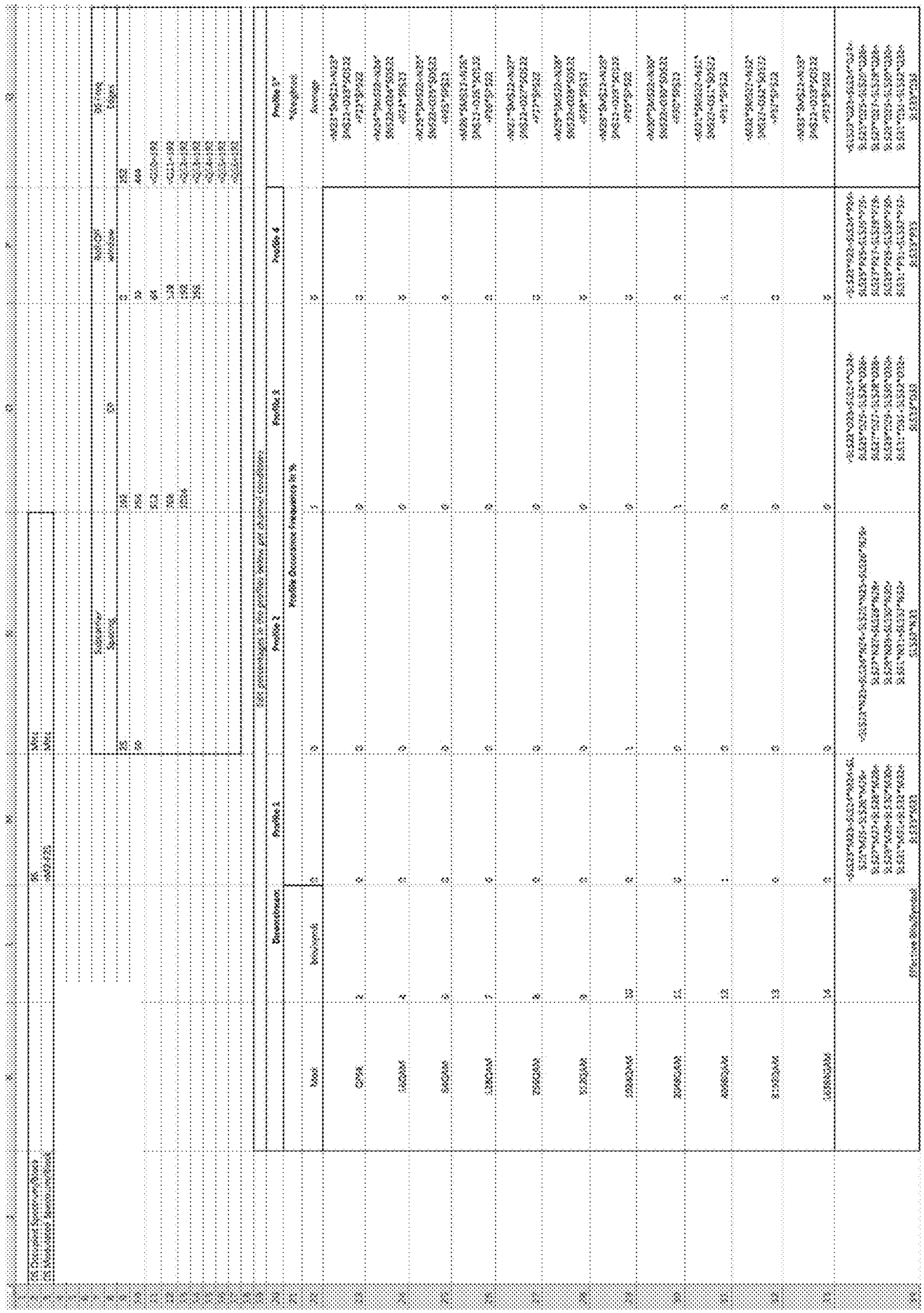

FIGS. 38 and 38A are portions of a DOCSIS 3.1 downstream efficiency calculator. The formulas that produce the results of FIGS. 38 and 38A are shown in FIGS. 38B-D and 39.

Figure 39:
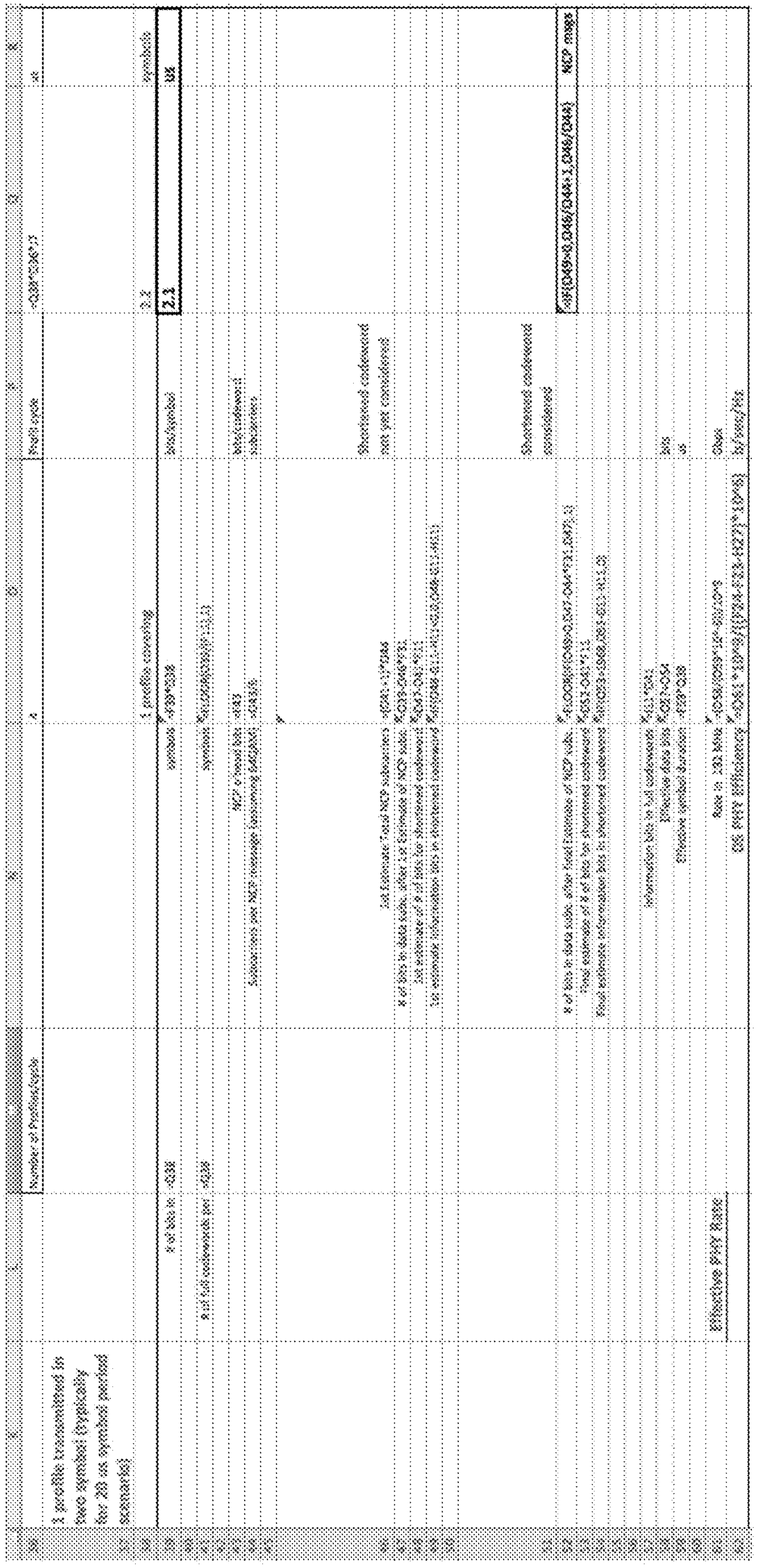
Figure 39B:
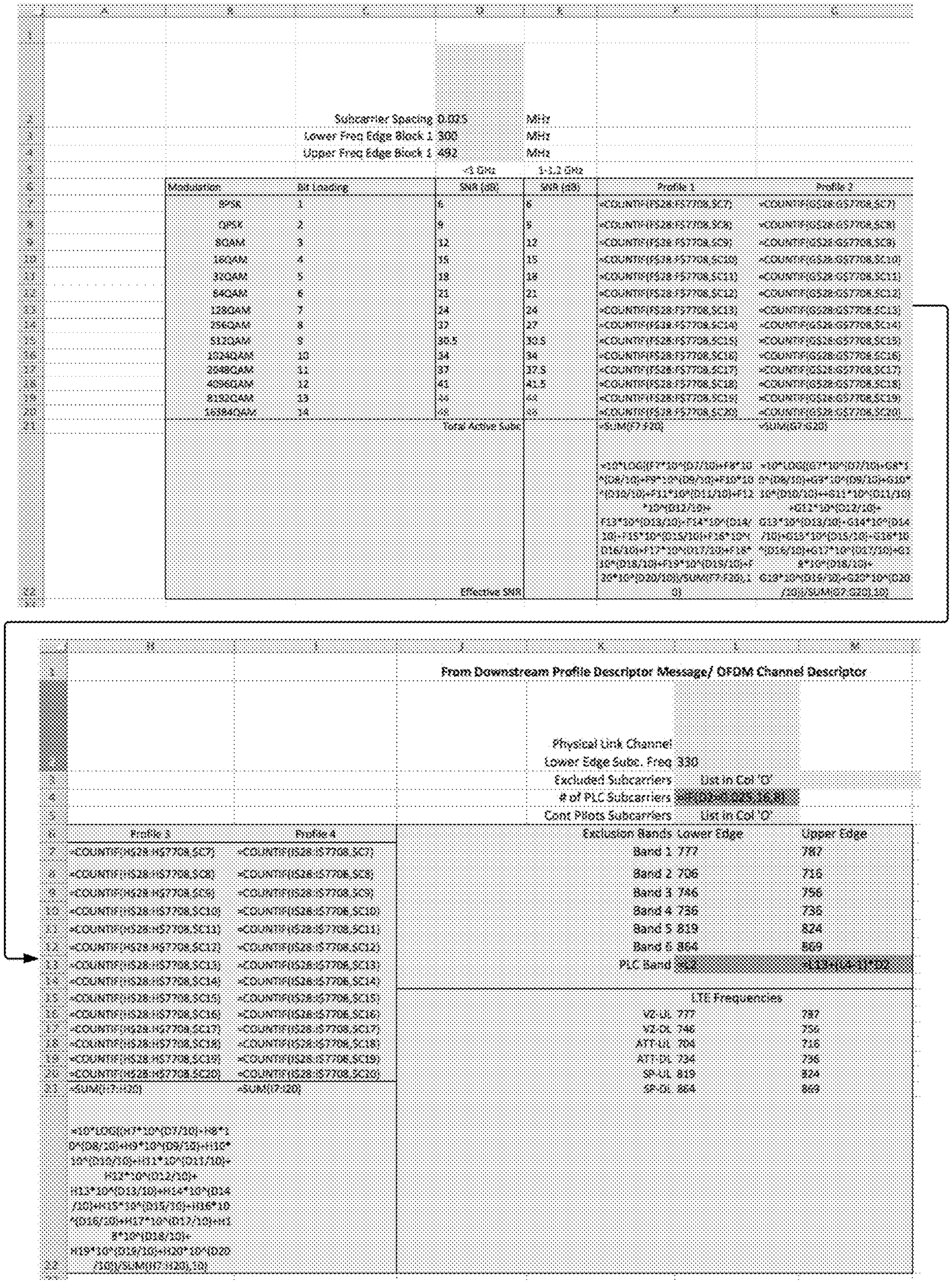
Figure 39H:
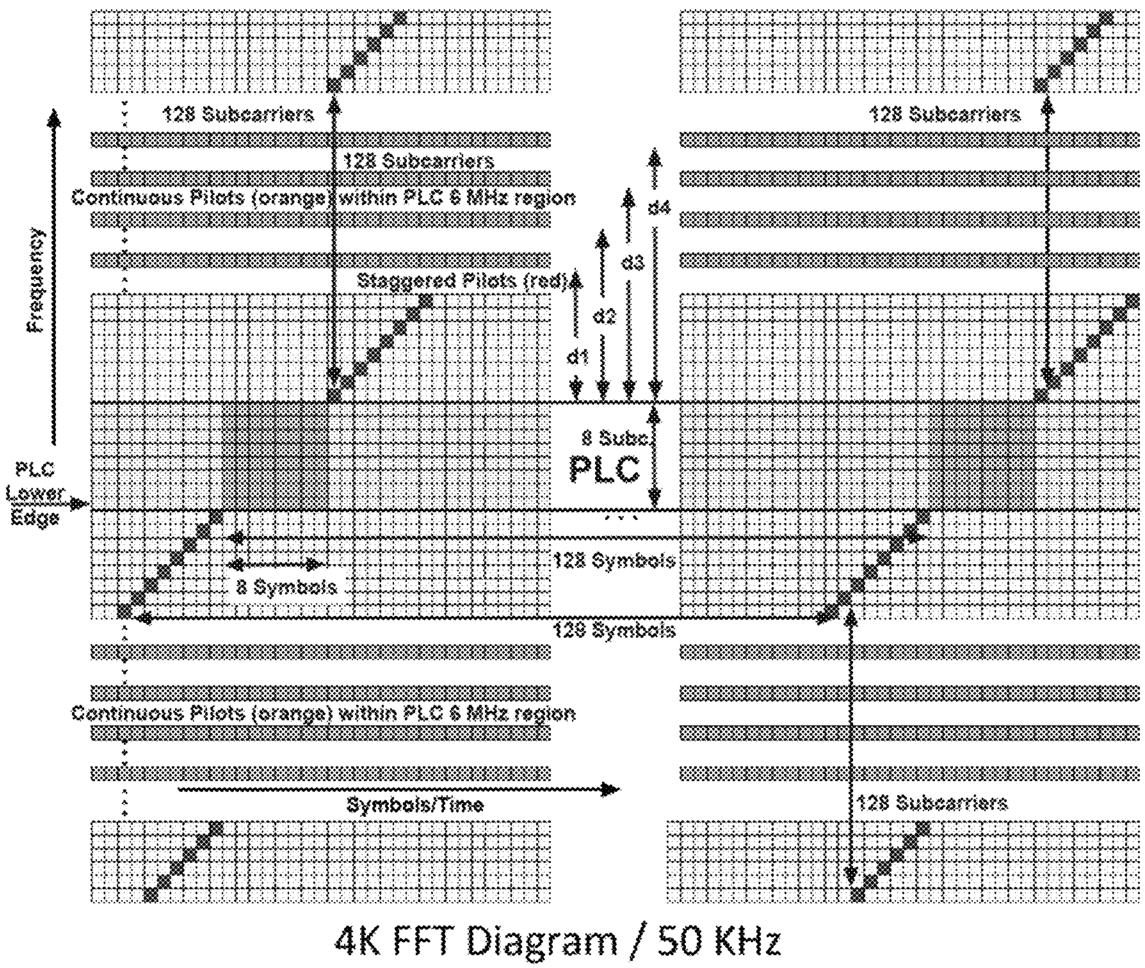
Figure 39I:
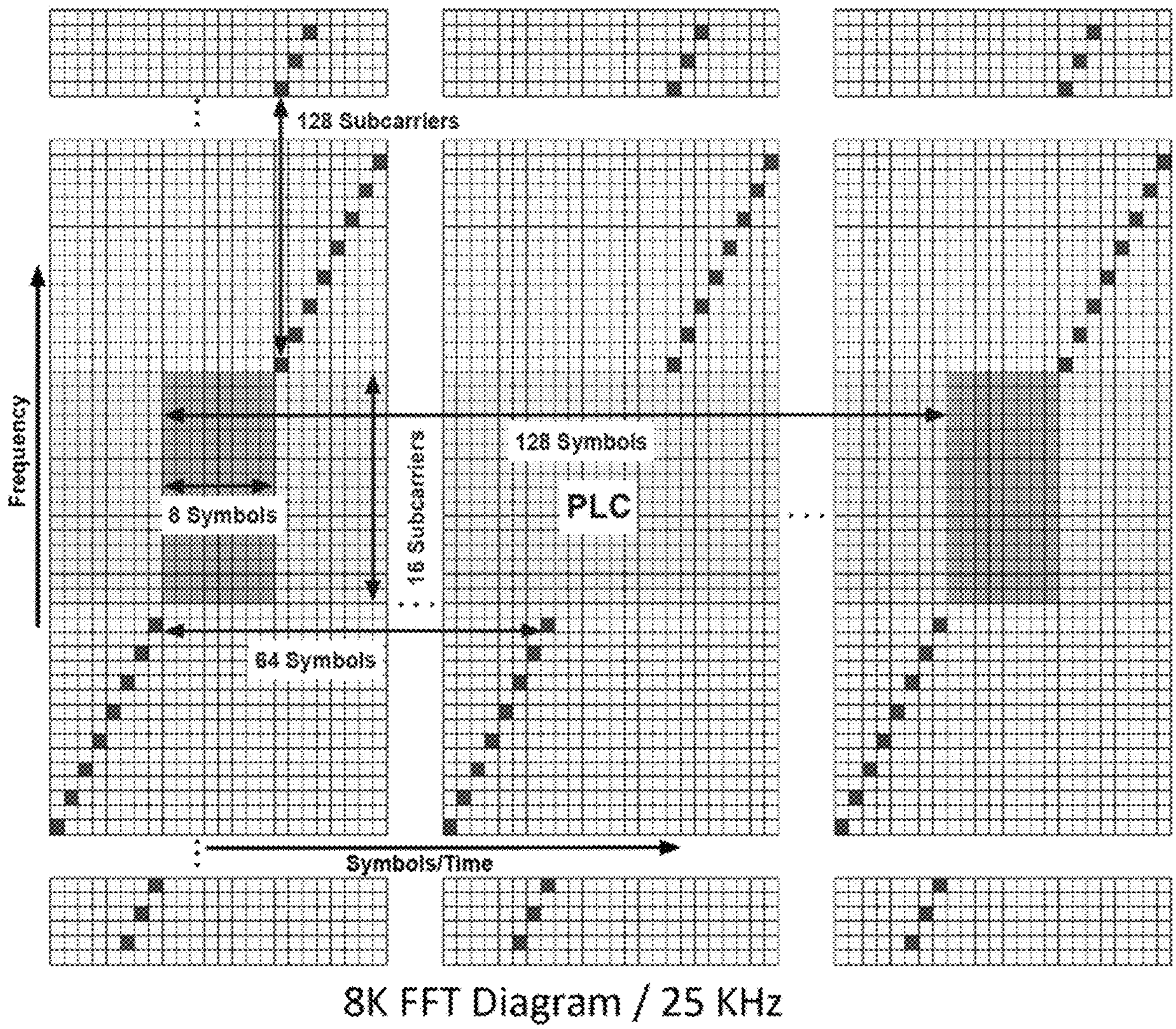
Figure 39J:
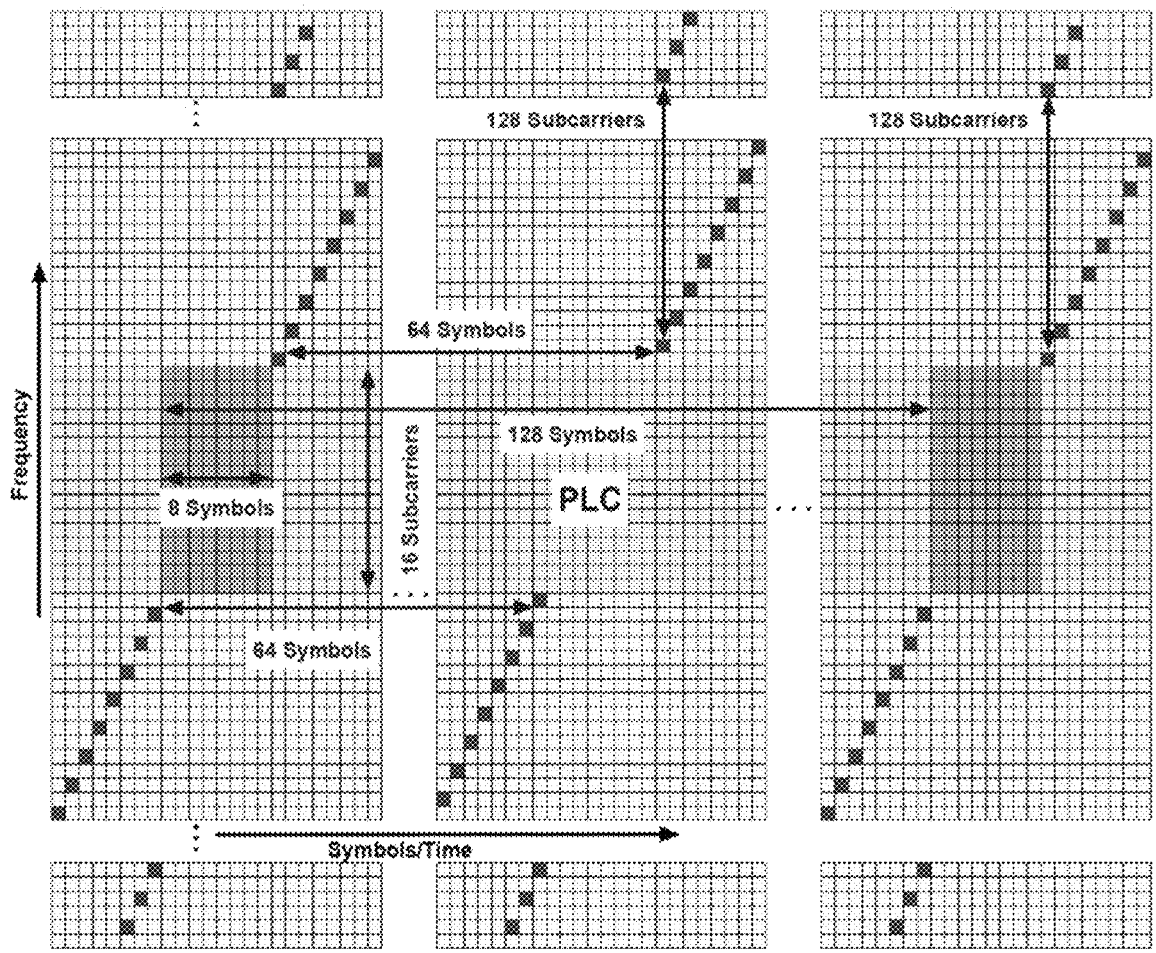

FIGS. 39A-G show aspects of a downstream bit loading, pilots, and exclusions calculator, in an embodiment. FIG. 39B shows the formulas that produce the results of FIG. 39A. FIG. 39D shows the formulas the produce the results shown in FIG. 39C. FIG. 39F shows the formulas that produce the results of FIG. 39E. FIG. 39G shows continuous pilots in PLC data. FIG. 39H shows a 4K FFT Diagram having a subcarrier spacing of 50 KHz, in an embodiment. FIG. 39I shows an 8K FFT Diagram having a subcarrier spacing of 25 KHz, in an embodiment. FIG. 39J shows an 8K FFT Diagram having a subcarrier spacing of 25 KHz with alternating pilots, in an embodiment.

Those skilled in the art will appreciate the use of legacy and DOCSIS 3.1 systems, methods and data in its application to the present dimensioning approach to data networks.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for dimensioning a downstream data network, comprising:

determining a total amount of downstream Data Over Cable Service Interface Specification version 3.1 (DOCSIS 3.1) occupied spectrum in a node;

determining unused spectrum and unusable spectrum within a total occupied spectrum of the downstream data network;

examining an i-th channel;

collecting physical link channel (PLC) data;

collecting traffic data;

determining time efficiency based on cyclic prefix, net symbol period, the collected PLC data and the collected traffic data;

determining a modulated bandwidth and storing an upper bound on a number of subcarriers in a temporary variable “S”;

determining an upper and a lower active subcarrier frequency based on one or more of an occupied bandwidth, a guardband and an encompassed bandwidth, which is an upper edge active subcarrier frequency minus a lower edge active subcarrier frequency;

updating the temporary variable “S” based on the upper and the lower active subcarrier frequencies and further by subtracting (1) excluded subcarriers, (2) excluded bands converted to subcarriers, (3) continuous pilots that are not in 6 MHz PLC, (4) 8 continuous pilots that are in 6 MHz PLC, (5) staggered/scattered pilots in the 6 MHz PLC;

determining a number of PLC subcarriers;

calculating a frequency efficiency by dividing the updated temporary variable “S” by the occupied bandwidth;

determining available raw bits for each profile/symbol using profile bit loading data;

determining a number of effective bits available for each profile/symbol based on the available raw bits for each profile/symbol adjusted by forward error correction (FEC) data;

determining an average number of symbols per profile cycle to estimate a number of full and shortened codewords for each profile based on a number of profiles, a volume traffic consumption per profile, and a profile cycle duration;

adjusting the number of effective bits available for each profile/symbol after including a normal cyclic prefix (NCP) overhead based on the number of full and shortened codewords, a number of NCP messages, and a number of subcarriers used for the NCP messages;

obtaining an effective efficiency in bits per second per Hertz (b/s/Hz) in each of the profiles based on the number of effective bits in a profile multiplied by the time efficiency and divided by a product of the occupied bandwidth and symbols/profile; and determining a profile throughput in bits per second by multiplying the effective efficiency in each profile by the occupied bandwidth.

* * * * *